(12) United States Patent  
Cramer et al.

(10) Patent No.: US 9,162,434 B2  
(45) Date of Patent: Oct. 20, 2015

(54) SYSTEM AND METHOD FOR MAKING ADVANCED COMPOSITE LAMINATES

(75) Inventors: David R. Cramer, Glenwood Springs, CO (US); Don O. Evans, New Castle, CO (US); Christina M. McClard, Glenwood Springs, CO (US); Dennis L. Weinman, Richmond, TX (US)

(73) Assignee: Dieffenbacher GMBH Maschinen-und Anlagenbau, Eppingen (DE)

( * ) Notice: Subject to any disclaimer, the term of this patent is extended or adjusted under 35 U.S.C. 154(b) by 430 days.

(21) Appl. No.: 13/557,621

(22) Filed: Jul. 25, 2012

(65) Prior Publication Data

US 2013/0186557 A1    Jul. 25, 2013

Related U.S. Application Data

(60) Provisional application No. 61/512,632, filed on Jul. 28, 2011.

(51) Int. Cl.
*B32B 38/00* (2006.01)
*B32B 5/12* (2006.01)
(Continued)

(52) U.S. Cl.
CPC .............. *B32B 38/0004* (2013.01); *B29C 65/00* (2013.01); *B29C 66/00145* (2013.01);
(Continued)

(58) Field of Classification Search
CPC ........ B29C 65/00; B29C 65/02; B29C 65/24; B29C 65/242; B29C 65/44; B29C 65/78; B29C 65/7802; B29C 65/7841; B29C 65/7844; B29C 65/7858; B29C 65/7867; B29C 66/00145; B32B 5/12; B32B 5/24; B32B 5/26; B32B 9/007; B32B 9/047; B32B 17/00; B32B 17/02; B65H 23/00; B65H 23/0208; B65H 23/032; B65H 29/003
USPC ........................ 156/1, 60, 250, 256, 264, 265, 156/285–286, 290, 297–303
See application file for complete search history.

(56) References Cited

U.S. PATENT DOCUMENTS 3,808,040 A    4/1974   Barnes et al.
4,028,158 A    6/1977   Hipchen et al.
(Continued)

FOREIGN PATENT DOCUMENTS

JP        482902       1/1973
JP     07-214714       8/1995
(Continued)

OTHER PUBLICATIONS

English translation of Korean Office Action dated Aug. 2, 2013, from the Korean Patent Office in Korean Patent Application No. 2010-7007753.
(Continued)

*Primary Examiner* — Michael N Orlando
*Assistant Examiner* — Matthew Hoover
(74) *Attorney, Agent, or Firm* — Plumsea Law Group, LLC

(57) ABSTRACT

A system and method for making advanced composite laminates includes a tape dispensing system, a tape placement head, and a tooling surface. Tape sections are formed and moved through a tape section guide using a gripping assembly. The tape section guide system is suspended over the tooling surface. Once the tape section is positioned over a desired location on the tooling surface, a tape tacking device tacks or otherwise attaches the tape section to the tooling surface or another underlying tape section.

22 Claims, 52 Drawing Sheets

(51) Int. Cl.
| | |
|---|---|
| *B29C 65/00* | (2006.01) |
| *B65H 23/00* | (2006.01) |
| *B65H 29/00* | (2006.01) |
| *B32B 17/00* | (2006.01) |
| *B29C 70/38* | (2006.01) |
| *B29C 65/78* | (2006.01) |
| *B29C 65/02* | (2006.01) |
| *B29C 65/24* | (2006.01) |
| *B32B 5/24* | (2006.01) |
| *B32B 5/26* | (2006.01) |
| *B29C 65/44* | (2006.01) |
| *B65H 23/032* | (2006.01) |
| *B32B 17/02* | (2006.01) |
| *B65H 23/02* | (2006.01) |
| *B32B 9/04* | (2006.01) |
| *B32B 9/00* | (2006.01) |
| *B29C 65/08* | (2006.01) |
| *B29C 70/54* | (2006.01) |

(52) U.S. Cl.
CPC ............... *B29C70/386* (2013.01); *B32B 5/12* (2013.01); *B32B 17/00* (2013.01); *B65H 23/00* (2013.01); *B65H 29/003* (2013.01); *B29C 65/02* (2013.01); *B29C 65/08* (2013.01); *B29C 65/24* (2013.01); *B29C 65/242* (2013.01); *B29C 65/44* (2013.01); *B29C 65/78* (2013.01); *B29C 65/7802* (2013.01); *B29C 65/7841* (2013.01); *B29C 65/7844* (2013.01); *B29C 65/7847* (2013.01); *B29C 65/7858* (2013.01); *B29C 65/7867* (2013.01); *B29C 66/21* (2013.01); *B29C 66/4722* (2013.01); *B29C 66/721* (2013.01); *B29C 66/81463* (2013.01); *B29C 66/836* (2013.01); *B29C 66/8322* (2013.01); *B29C 70/545* (2013.01); *B32B 5/24* (2013.01); *B32B 5/26* (2013.01); *B32B 9/007* (2013.01); *B32B 9/047* (2013.01); *B32B 17/02* (2013.01); *B65H 23/0208* (2013.01); *B65H 23/032* (2013.01); *Y10T 156/10* (2015.01); *Y10T 156/1062* (2015.01); *Y10T 156/12* (2015.01); *Y10T 156/1744* (2015.01)

(56) References Cited

U.S. PATENT DOCUMENTS

| | | |
|---|---|---|
| 4,092,453 A | 5/1978 | Jonda |
| 4,556,440 A | 12/1985 | Krueger |
| 4,567,738 A | 2/1986 | Hutson et al. |
| 4,600,456 A | 7/1986 | Oswald |
| 4,848,066 A | 7/1989 | Luhman |
| 5,269,863 A | 12/1993 | Middelman |
| 5,308,424 A | 5/1994 | Sasaki et al. |
| 5,368,913 A | 11/1994 | Ortega |
| 5,445,693 A | 8/1995 | Vane |
| 6,607,626 B2 | 8/2003 | Taggart |
| 6,939,423 B2 | 9/2005 | Taggart |
| 7,008,495 B2 | 3/2006 | Mancini |
| 7,094,310 B2 | 8/2006 | Yamaguchi et al. |
| 7,235,149 B2 | 6/2007 | Taggart |
| 8,007,894 B2 | 8/2011 | Taggart |
| 8,048,253 B2 | 11/2011 | Cramer et al. |
| 8,168,029 B2 | 5/2012 | Cramer et al. |
| 8,414,729 B2 | 4/2013 | Cramer et al. |
| 2003/0104746 A1 | 6/2003 | Menzies et al. |
| 2003/0209317 A1 | 11/2003 | Koehler et al. |
| 2005/0178507 A1 | 8/2005 | Hajny et al. |
| 2009/0101277 A1* | 4/2009 | Cramer et al. ............... 156/265 |
| 2011/0152051 A1 | 6/2011 | Murray |
| 2012/0186749 A1 | 7/2012 | Cramer et al. |
| 2013/0276954 A1 | 10/2013 | Cramer et al. |

FOREIGN PATENT DOCUMENTS

| | | |
|---|---|---|
| JP | 2004042277 | 2/2004 |
| JP | 2004218133 | 8/2004 |
| WO | 8504838 | 11/1985 |

OTHER PUBLICATIONS

Invitation to Pay Additional Fees and, Where Applicable, Protest Fee mailed Oct. 5, 2012 in International Application No. PCT/US2012/048252.
Amendment filed Oct. 1, 2012 in U.S. Appl. No. 13/435,006.
Notice of Allowance mailed Dec. 12, 2012 in U.S. Appl. No. 13/435,006.
Office Action mailed Sep. 25, 2013 in U.S. Appl. No. 13/851,242.
Amendment filed Jan. 16, 2014 in U.S. Appl. No. 13/851,242.
Final Office Action mailed Sep. 9, 2014 in U.S. Appl. No. 13/851,242.
International Search Report and Written Opinion dated Dec. 19, 2012 in International Application No. PCT/US2012/048252.
Japanese Office Action mailed Jan. 29, 2013, from the Japanese Patent Office in Japanese Patent Application No. 2010-526965, and English translation thereof.
International Search Report and Written Opinion dated Mar. 23, 2009 in International Application No. PCT/US2008/011231.
International Search Report dated Nov. 16, 2001 in International Application No. PCT/US2001/23757.
European Office Action dated Dec. 22, 2006 in European Application No. 01959289.8-2124.
Extended European Search Report dated Apr. 8, 2011 in European Application No. 10185499.0-2124.
Japanese Office Action mailed Dec. 15, 2009, from the Japanese Patent Office in Patent Application No. 2002-516088, and English translation thereof.
International Preliminary Report on Patentability mailed Apr. 8, 2010 in PCT Application No. PCT/US2008/011231.
Office Action mailed Feb. 18, 2009 in U.S. Appl. No. 11/798,823.
Response to Office Action filed Mar. 18, 2009 in U.S. Appl. No. 11/798,823.
Office Action mailed Jul. 8, 2009 in U.S. Appl. No. 11/798,823.
Response to Office Action filed Nov. 9, 2009 in U.S. Appl. No. 11/798,823.
Final Office Action mailed Jan. 25, 2010 in U.S. Appl. No. 11/798,823.
Response to Final Office Action filed Apr. 26, 2010 in U.S. Appl. No. 11/798,823.
Office Action mailed May 27, 2010 in U.S. Appl. No. 11/798,823.
Response to Office Action filed Sep. 24, 2010 in U.S. Appl. No. 11/798,823.
Final Office Action mailed Dec. 22, 2010 in U.S. Appl. No. 11/798,823.
Response to Final Office Action filed Jan. 31, 2011 in U.S. Appl. No. 11/798,823.
Notice of Allowance dated Apr. 20, 2011 in U.S. Appl. No. 11/798,823.
Office Action mailed Jun. 1, 2012 in U.S. Appl. No. 13/435,006.

* cited by examiner

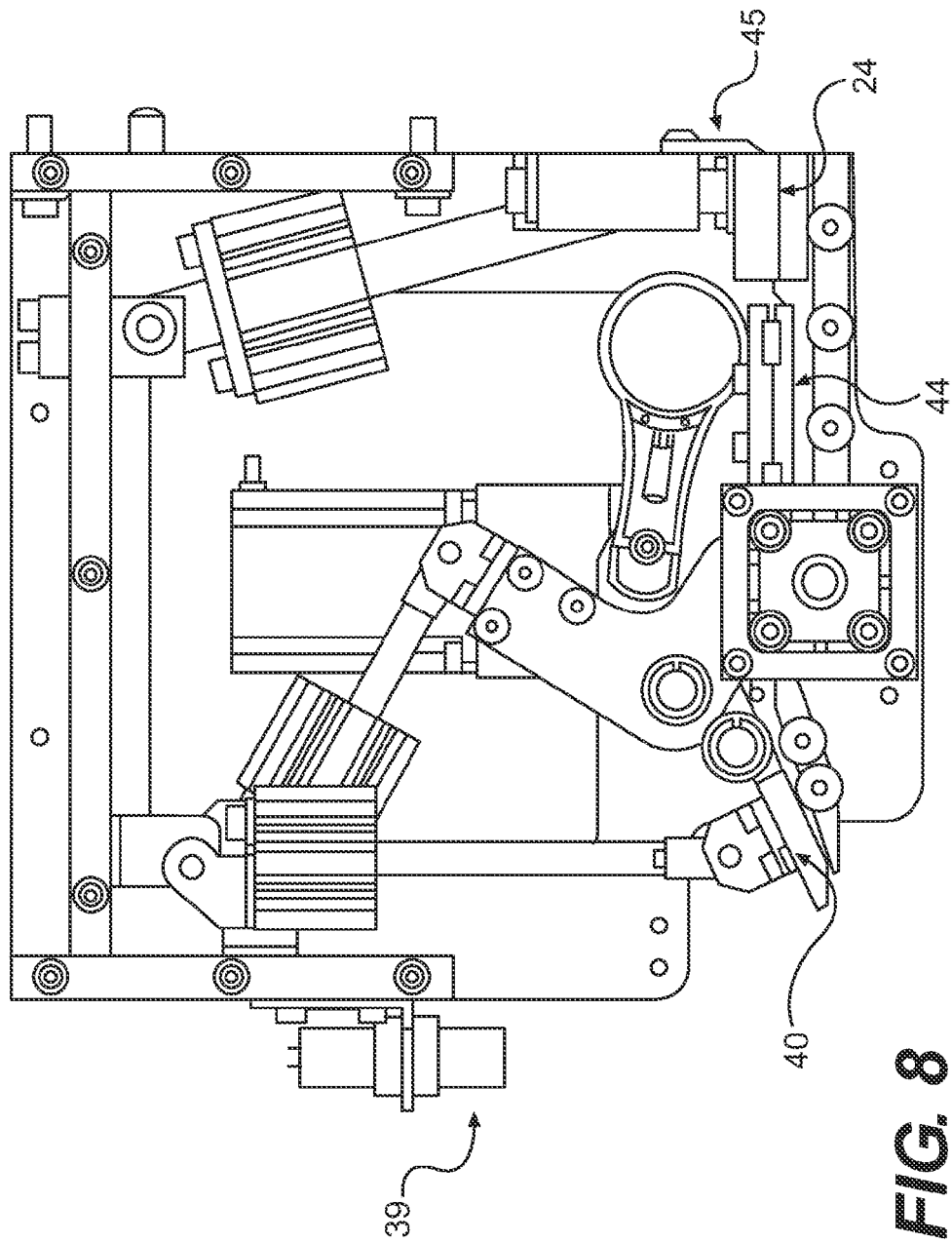

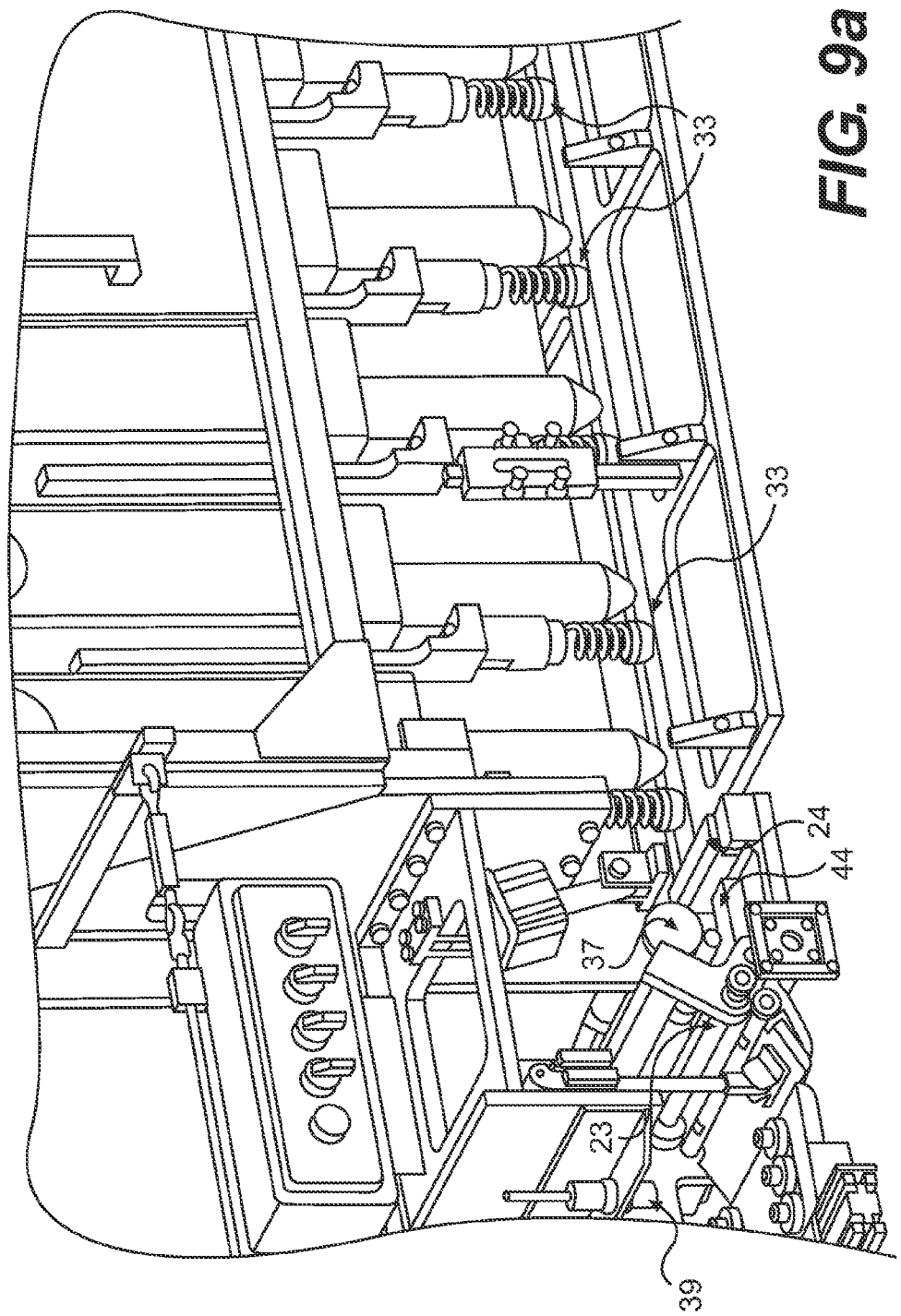

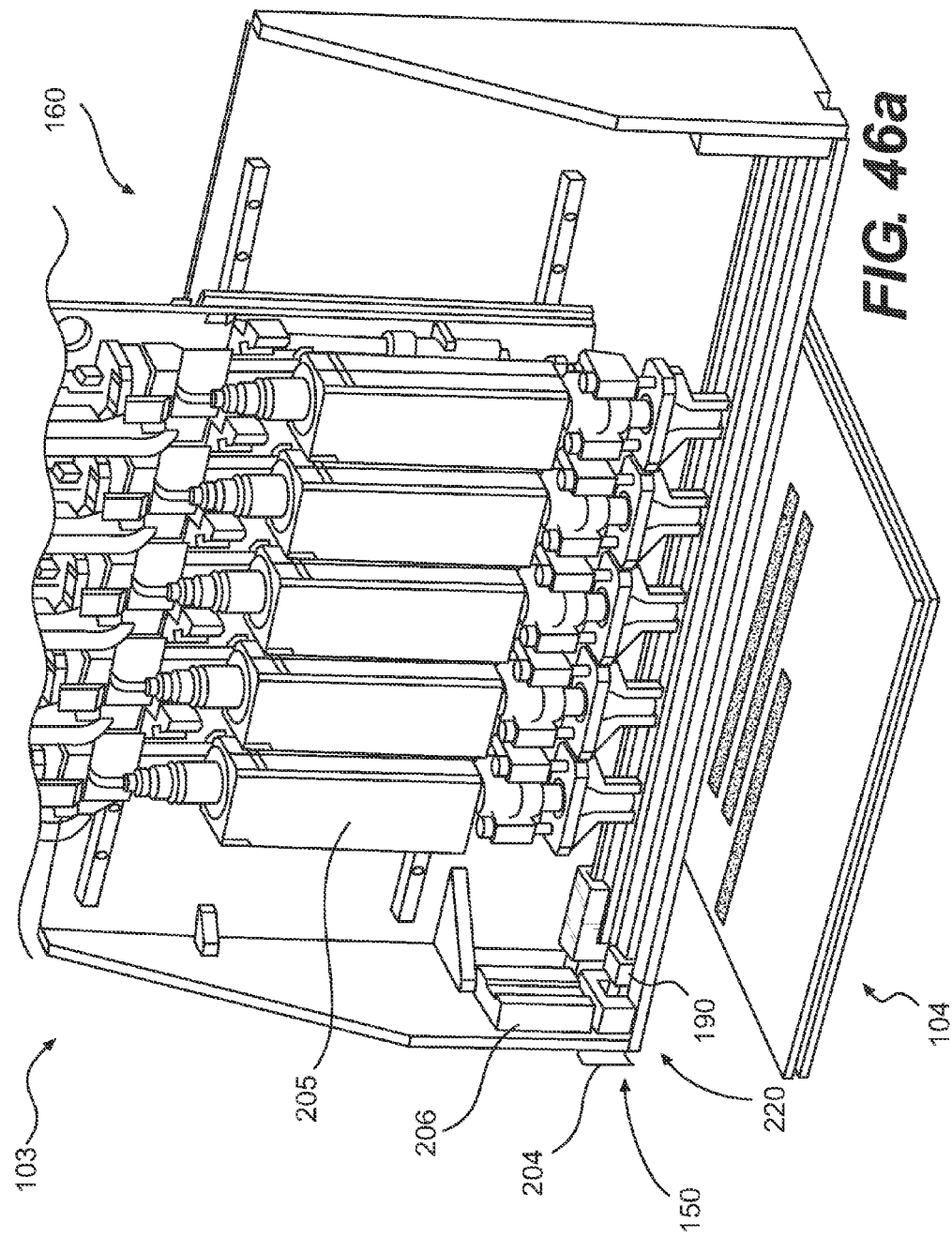

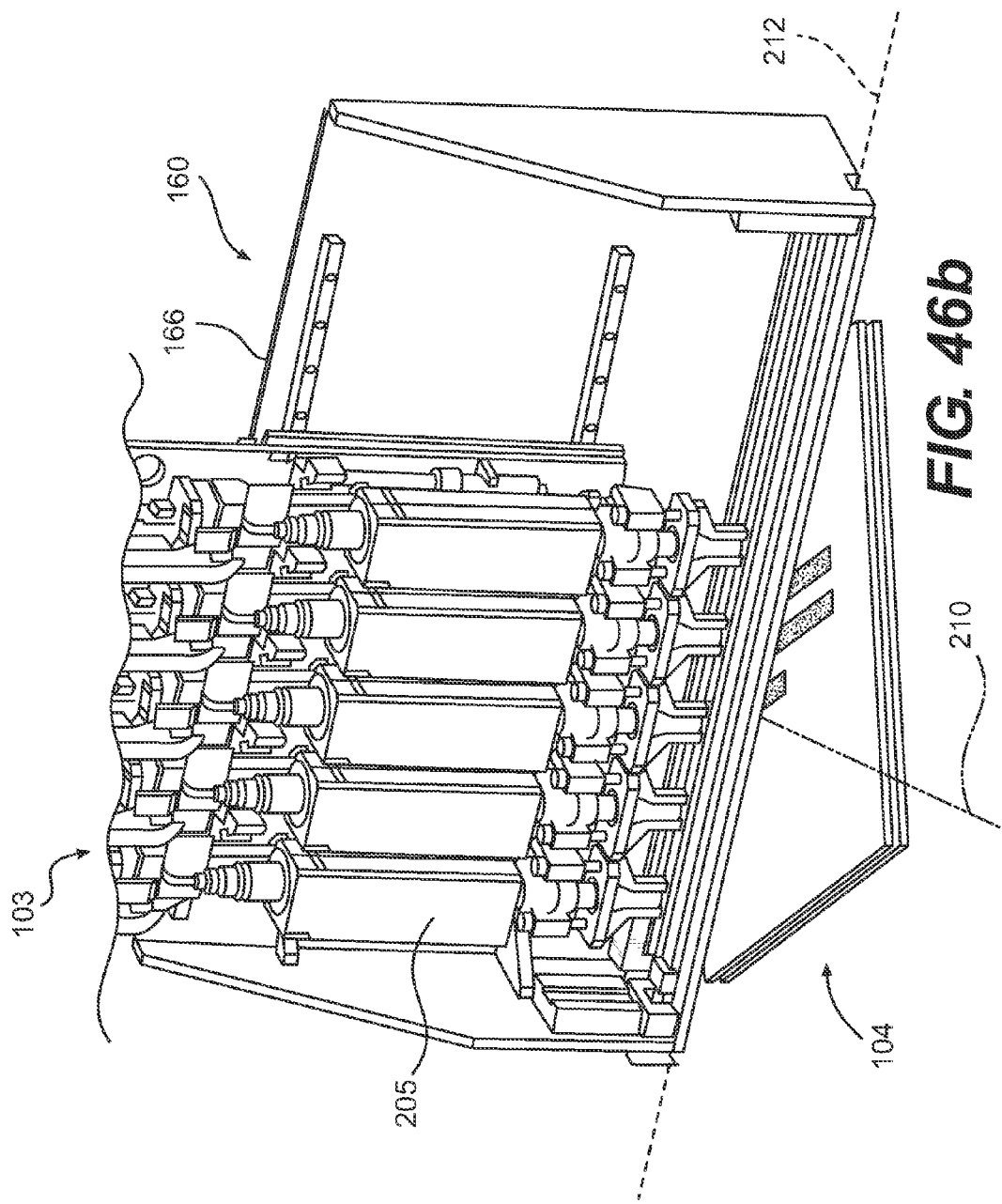

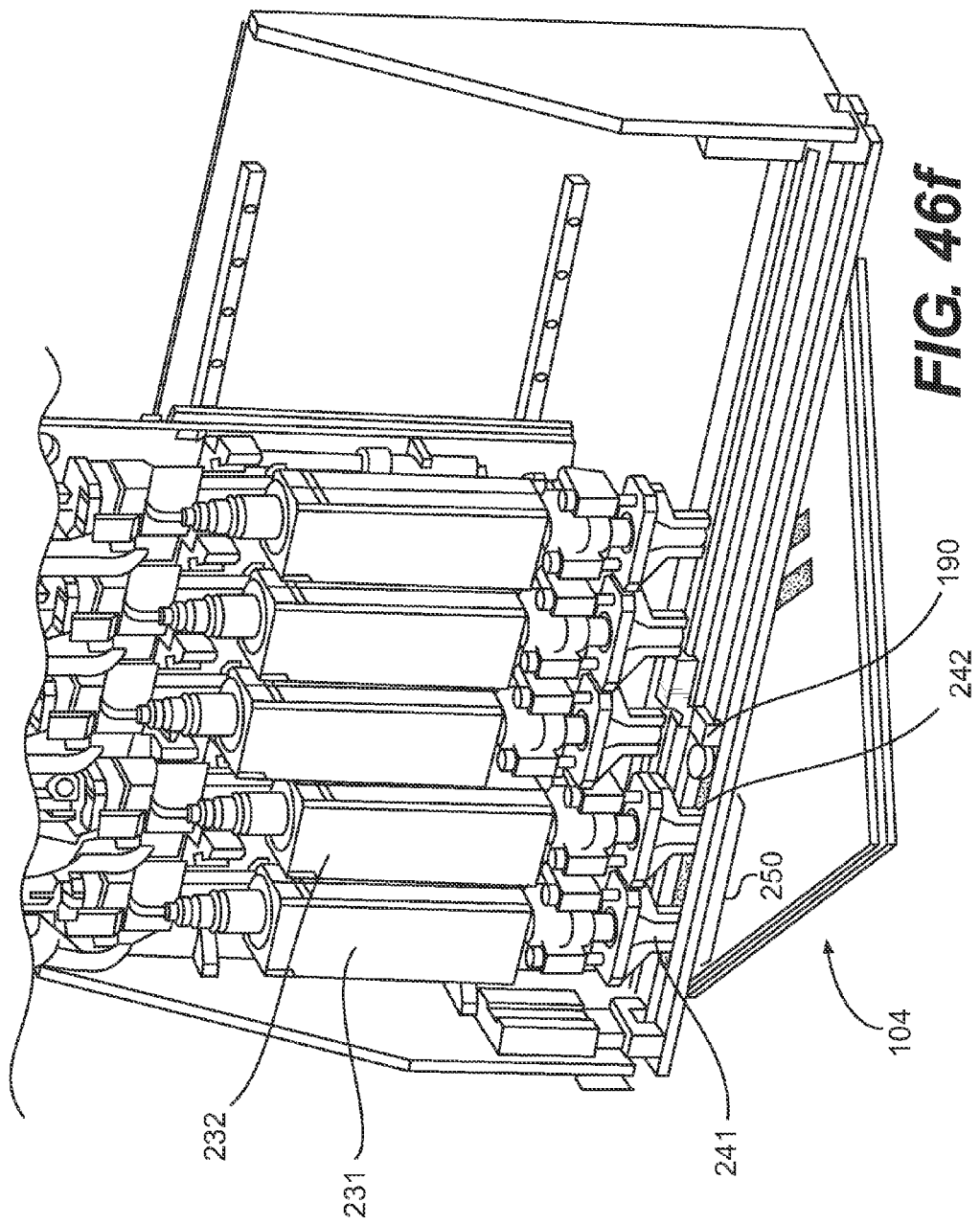

SYSTEM AND METHOD FOR MAKING ADVANCED COMPOSITE LAMINATES

This application claims the benefit of U.S. Provisional Patent Application No. 61/512,632, filed Jul. 28, 2011, which is herein incorporated by reference in its entirety. This application is also related to U.S. Pat. No. 8,048,253, issued Nov. 1, 2011 (U.S. patent application Ser. No. 12/237,077, filed Sep. 24, 2008), U.S. Pat. No. 8,168,029, issued May 1, 2012 (U.S. patent application Ser. No. 13/251,360, filed Oct. 3, 2011), and U.S. patent application Ser. No. 13/435,006, filed Mar. 30, 2012, all of which are herein incorporated by reference in its entirety.

BACKGROUND

The present embodiments relate generally to advanced composites and, more particularly, to a system and method for rapidly fabricating advanced composite laminates with minimal scrap, using automated equipment.

Advanced composite materials are increasingly used in high-performance structural products that require low weight and high strength and/or stiffness. Composite materials are engineered materials that comprise two or more components. The embodiments relate to polymer composites that combine reinforcing fibers such as carbon fiber, glass fiber, or other reinforcing fibers with a thermosetting or thermoplastic polymer resin, such as epoxy, nylon, polyester, polypropylene, or other resins. The fibers typically provide the stiffness and strength along the direction of the fiber length, and the resin provides shape and toughness and also acts to transfer load between and among the fibers. The structural performance of an advanced composite part increases with increased fiber-to-resin ratio (also called fiber volume fraction), increased fiber length, closer alignment between the fiber orientation and the load path through the part (in contrast to random fiber orientation), and the straightness of the fibers. The weight of an advanced composite part can also be optimized by selectively adding or subtracting material according to where it is highly and lightly stressed.

Typically, the manufacture of high-performance, advanced composite parts is a slow and labor-intensive process. Thus, several approaches for automating the fabrication of advanced composite parts have been developed to reduce hand labor, decrease cycle time, and improve part quality and repeatability. Such machines are used to fabricate small and large parts ranging from aircraft fuselages and internal structural members to pressure vessels, pipes, blades for wind turbines, and wing skins. These machines typically place tape material directly on a mandrel or a mold using a material placement head mounted on a multi-axis, CNC manipulator. As the material is laid up, it is consolidated with any underlying layers. This is called "in situ" consolidation.

A different approach, described in U.S. Pat. Nos. 6,607,626 and 6,939,423, which are herein incorporated by reference, is to lay up a substantially flat "tailored blank" where all the plies of the composite laminate are only tacked together. Once the tailored blank has been made, subsequent processing steps are used to consolidate the plies together and form the blank into its final shape.

One characteristic typical to tape and fiber placement machines is the overall technique used to apply material to a tooling surface: such machines progressively unroll a tape or tow material onto a tooling surface that is configured to match the near net shape of the part and tack it in place using one or more compaction rollers or shoes as the material is fed onto the surface. While this technique yields high quality parts, one main limitation is that increasing the material placement rate requires larger, higher power machines, which has a compounding effect on system size, energy consumption, cost, and precision. In many systems, speed is also constrained by the heat transfer rate, especially for thermoplastic composites, which are typically melted and then refrozen during placement.

Another limitation of fiber placement and tape laying machines is that they most typically produce parts very near to the final net shape and thus the attainable part complexity and contour is governed by the size and dexterity of the manipulator to which the layup head is attached. Such systems typically require five or six degrees of freedom to produce the types of parts noted above.

SUMMARY

Embodiments provide a system and method for applying composite tape material onto a tooling surface. Instead of progressively applying tape to a tooling surface, which is configured in the net shape of the part and consolidated in-situ, embodiments place courses of tape in a substantially flat configuration suitable for post consolidation and forming operations by feeding tape material of a predetermined length and locating it above the tooling surface. The tape can be pre-cut into a tape section or can be fed (e.g., pulled) from a tape supply and cut into a tape section (or "course") of the desired length. The tape section may be moved toward the tooling surface. Once near or on the tooling surface, the entire tape section can be tacked to the underlying material in one operation. The tacking can comprise, for example, the fusing of the tape section to the underlying material at isolated locations using a spot welder or other fusing process. Separating the tape feed operation from the tacking operation may allow the system to run automatically, faster, and more reliably.

One embodiment comprises a system and method for making high-performance, advanced composite laminates by positioning one or more tape sections over a multi-axis motion table, then lowering the tape sections onto the table and tacking them to previously laid material using an array of spot welding units.

In one aspect, a method for manufacturing a composite preform from tape material includes feeding a tape section into a tape section guide that suspends the tape section across a tooling surface so that a first end of the tape section is initially disposed at a first position in the tape section guide and a second end of the tape section is initially disposed at a second position in the tape section guide. The method also includes providing relative movement between the tape section guide and the tooling surface to position the tape section at a desired location and orientation relative to the tooling surface. The method also includes moving the tape section so that the first end is moved to a third position and the second end is moved to a fourth position in the tape section guide. The method also includes securing the tape section to at least one of the tooling surface and a pre-existing tape section.

In another aspect, a method for manufacturing a composite preform from tape material includes feeding a portion of tape into a tape section guide and gripping an end of the portion of tape and pulling the portion of tape along the tape section guide. The method also includes cutting the portion of tape to form a tape section when the end of the portion of tape has been pulled to a predetermined location. The method also includes securing the tape section to at least one of a tooling surface and a pre-existing tape section.

In another aspect, an apparatus for manufacturing composite preforms from composite tape includes a tape section guide that receives a tape section and a tape gripping assembly configured to grip the tape section in the tape section guide. The apparatus also includes a tape tacking device configured to tack the tape section to other like tape sections. The tape gripping assembly includes a gripping member, where the gripping member is configured to grip a portion of the tape section and to move along an axis associated with a length of the tape section guide. The gripping member moves from a first position of the tape section guide to a second position of the tape section guide and thereby moves the portion of the tape section from the first position to the second position.

Other systems, methods, features, and advantages of the embodiments will be, or will become, apparent to one of ordinary skill in the art upon examination of the following figures and detailed description. It is intended that all such additional systems, methods, features, and advantages be included within this description and this summary, be within the scope of the embodiments, and be protected by the claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 8 is a schematic diagram illustrating a side view of an embodiment of a feed and cutter unit with the front frame plate removed.

FIGS. 9a and 9b are schematic diagrams illustrating a detail view of an embodiment of a tape placement head.

FIGS. 46a-46g illustrate a sequence of steps in a process for applying tape sections to a tooling surface according to one embodiment.

DETAILED DESCRIPTION

Figure 1:
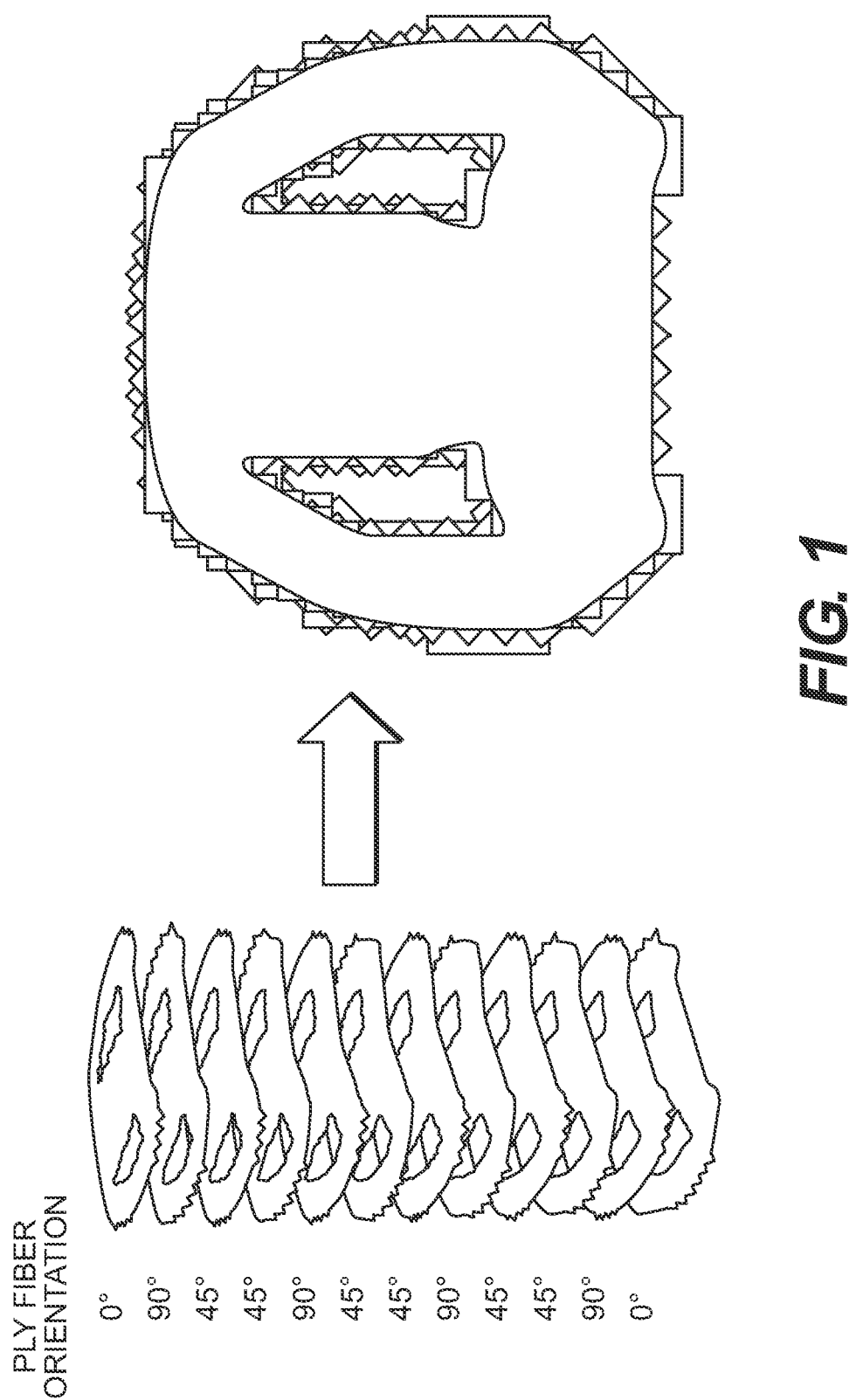
FIG. 1 is a schematic diagram illustrating an embodiment of a tailored blank.

Embodiments provide a tape placement method. As described in detail below, the tape placement method involves locating a material placement head above a tooling surface, feeding tape into a guide that holds the tape above the tooling surface, cutting the tape from the feedstock into a tape section, moving the tape section near or onto the tooling surface, and then tacking the tape section to any underlying tape layers or securing the tape section to the tooling surface.

Material

The present embodiments can be used to create advanced composite preforms from tape material, such as preimpregnated fiber and polymer tape and pure polymer tape. Advanced composite materials contain reinforcing fibers, a polymer resin, and sometimes a core material such as foam or honeycomb. The part is made by stacking layers of material in one or more orientations, or ply angles. The ply angles are determined by the part's load requirements. Typically, the material that comprises the laminate will be a preimpregnated tape containing reinforcing fiber and a polymer resin. However, unreinforced polymer tape, core material, or other materials such as a metallic film could be included in the laminate based on the requirements of the application.

The reinforcing fibers can be made from, for example, carbon, glass, basalt, aramid, polyethylene, or any other reinforcement. Like string, rope, hair, or other fibers, reinforcing fibers used in polymer composites add strength and stiffness to a part along the direction of the fiber length. The fibers are preferably continuous or near continuous in length and aligned parallel with the tape length (or longitudinal axis of the tape), but no specific reinforcement format within the tape is required. Additionally, tape comprising resin and continuous or discontinuous fibers that are not substantially aligned parallel to the edge of the tape could be used. The polymer resin can be thermoplastic (for example, polyamide, polyphenylene sulfide) or thermosetting (for example, epoxy, vinyl ester, or polyester). As with most polymer composite applications, the specific resin and fibers used and their proportion and format within the composite are determined by the specific requirements of the part to be manufactured.

Process

The present embodiments can be used to create a laminate comprising multiple plies of tape material. Each ply contains one or more sections of tape (also called courses) placed parallel to each other, and each ply is fused to one or more underlying plies. The shape of each ply and the orientation, or angle, of the fibers in the ply relative to fibers in other plies in the laminate are chosen such that the final produced part will have the desired structural characteristics. The first step of the method used to fabricate a tailored blank is to feed tape material of a specified length from a spool into a tape section positioning system that suspends the tape above the tooling surface upon which the tape will be placed. The second step, which could occur concurrently with step one, involves positioning the tape section relative to the tool such that when the tape section is lowered onto the tool, it is in the correct position and orientation for the part. In the third step, the guide lowers the tape section and the section is either tacked to underlying material or secured to the tool surface. Any material that directly touches the tooling surface can be secured to the tool using techniques (e.g., vacuum) that may differ from the methods used to tack tape layers to each other. Once the section of material has been secured to underlying material or to the tooling surface, the tape section locating system and tacking system return to their starting positions and a new section of material is fed into the guide. The preceding steps in the process may then be repeated until the blank is complete.

Several variations or embodiments of this overall processing method could be employed. Though the process is described here as a series of sequential steps, embodiments of this method could execute these steps simultaneously to reduce overall processing time. For example, moving the tape section locating system and/or the tool into position could occur while the guide is raising and/or lowering and/or while the tape is being fed into the guide. Also, embodiments of this method could place more than one section at a time by incorporating additional placement heads into the machine. Therefore, nothing in this description should imply that sections necessarily be placed one at a time. Specific embodiments of the method could also include the capability to place varying widths or multiple materials in a single blank.

In addition, alternate embodiments could involve placing tape sections that have been pre-cut rather than cutting the tape after it has been fed into the guide rails. Staging pre-cut tape before the guide rails could speed up the operation of the machine since the cut operation would be removed from the critical path in the order of machine operation. Additionally, the use of pre-cut tape sections could eliminate the requirement for dynamic tension control from the tape placement portion of the process. The tape sections could be pre-cut in line with the feed and placement, or the tape sections could be pre-cut off-line and staged as a kit to be fed into the guide rails.

The method used to tack plies together and the degree to which they are tacked is another parameter that could vary in different embodiments. Methods for tacking the courses to underlying plies could include contact heating, ultrasonic welding, induction welding, laser heating, hot gasses, or other methods of adhering plies to each other. Also, the method could be used with an articulating head or a moving tooling surface, or a combination of the two positioning approaches. Although an embodiment described herein uses a fixed material placement head that is positioned over a substantially flat tooling surface that can move in the x and y directions as well as rotate, the relative motion between the placement head and the tooling surface could also be achieved by moving the placement head or a combination of the two.

Implementation

A specific implementation is depicted in FIGS. 2-16. This exemplary system comprises a material dispensing system 1, tape transport rails 2, a placement head 3, a vacuum table 4 that serves as the blank tooling surface, a 3-axis motion table 5, and a structural beam 6. The placement head 3 and tape transport rails 2 are affixed to the structural beam and positioned over the motion table 5 and vacuum table 4. Additional support systems are depicted and include an operator interface computer 7, electronics control cabinets 8, a vacuum pump 9, and perimeter safety guarding 10.

As shown, for example, in FIGS. 5, 6, 16, and 17, the material dispensing system 1, also called a creel rack, contains one or more creel boxes 35 that contain tape unspooler mechanisms 11. In this system, a roll of tape 47 is loaded onto a spindle 12 and secured in place. Spool guards 13 are put in place to keep the edges of the tape aligned. The leading edge of the tape is fed around a first guide roller 48 between feed rollers 15 in a creel feed mechanism 14 and past a second guide roller 49. One coil of the tape is then looped around the outside of the entire spool, fed around an additional set of guide rollers 16 within the creel feed mechanism, and out to the auto feeder unit 17. Once the tape is fed into the autofeeder unit, the autofeeder pinch rollers 18 engage and feed the tape through a feed guide 19 (see, for example, FIG. 17) and across the tape transport rails and into the tape placement head 3. Once the tape passes through feed rollers 23 in the tape placement head (see FIGS. 9a and 9b), these rollers 23 engage and the rollers 18 in the autofeeder disengage.

Figure 7:
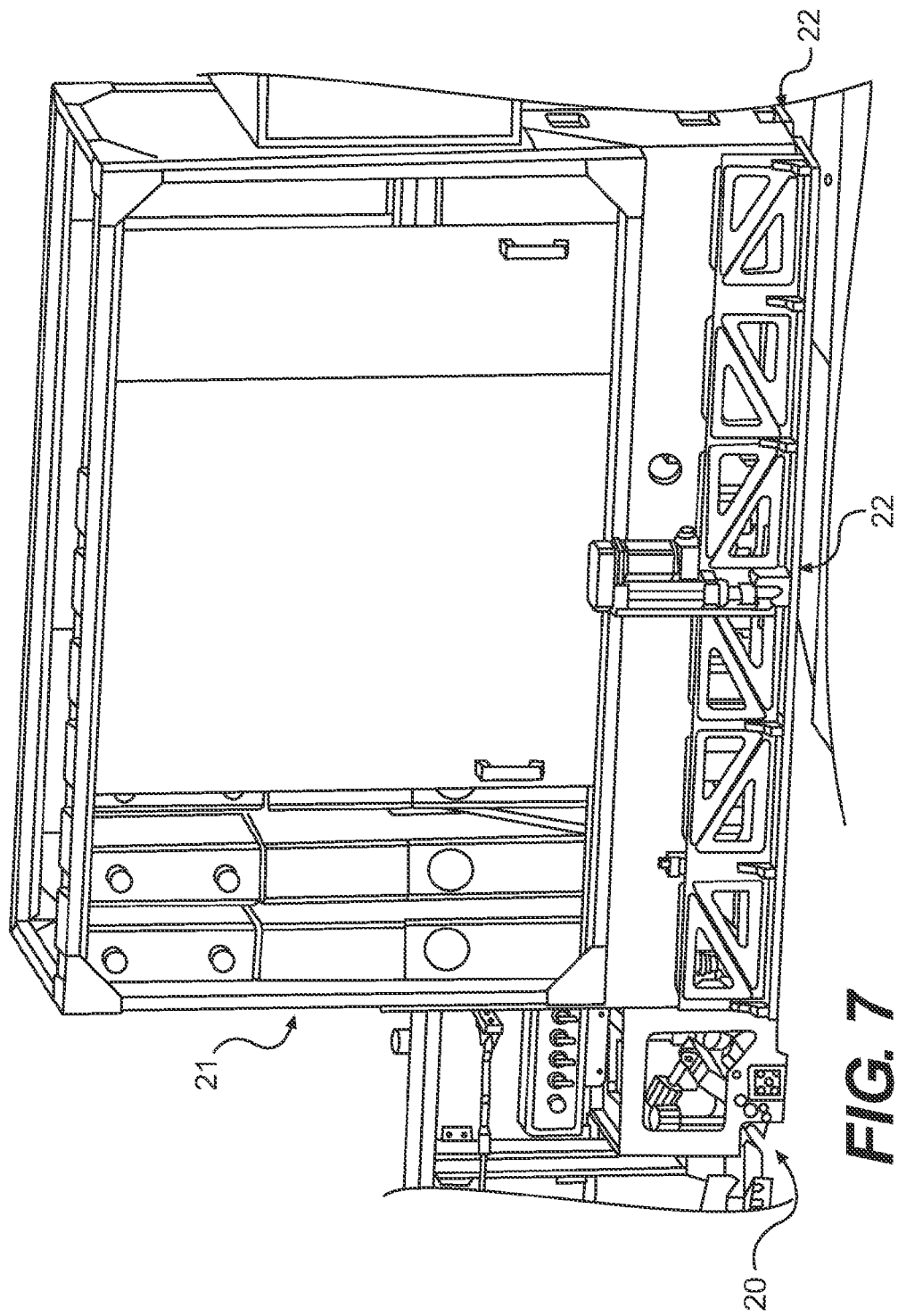
FIG. 7 is a schematic diagram illustrating an embodiment of a placement head.
Figure 9B:
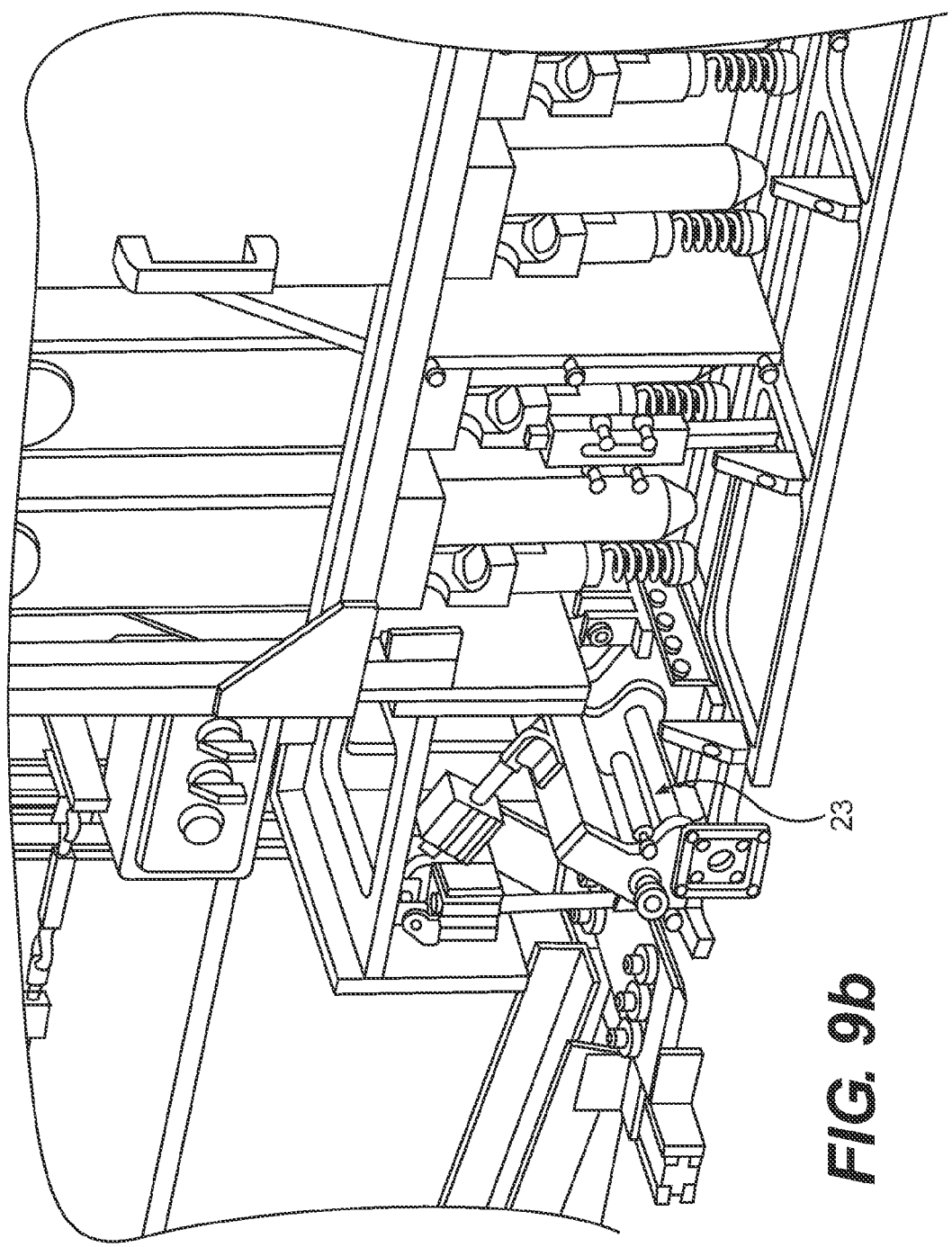
Figure 13:
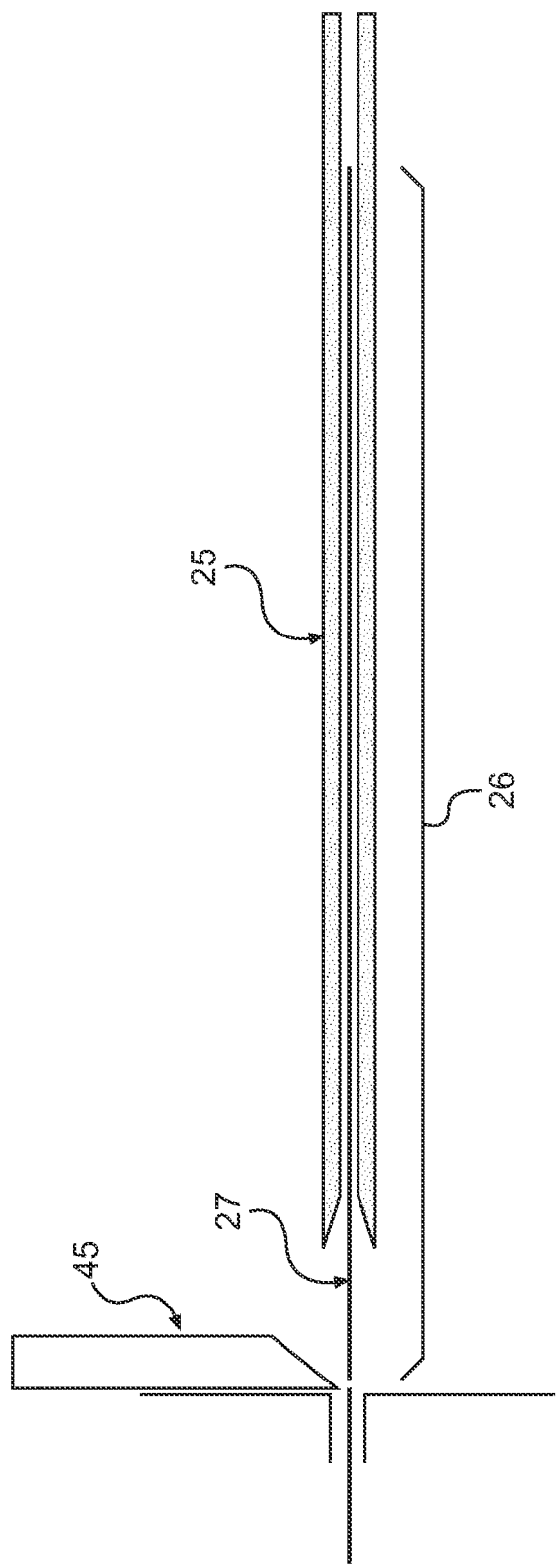
FIG. 13 is a schematic diagram illustrating a side view of an embodiment of tape passing through the exit of the feed and cutter unit and entering the guide rails of the carriage frame.
Figure 14:
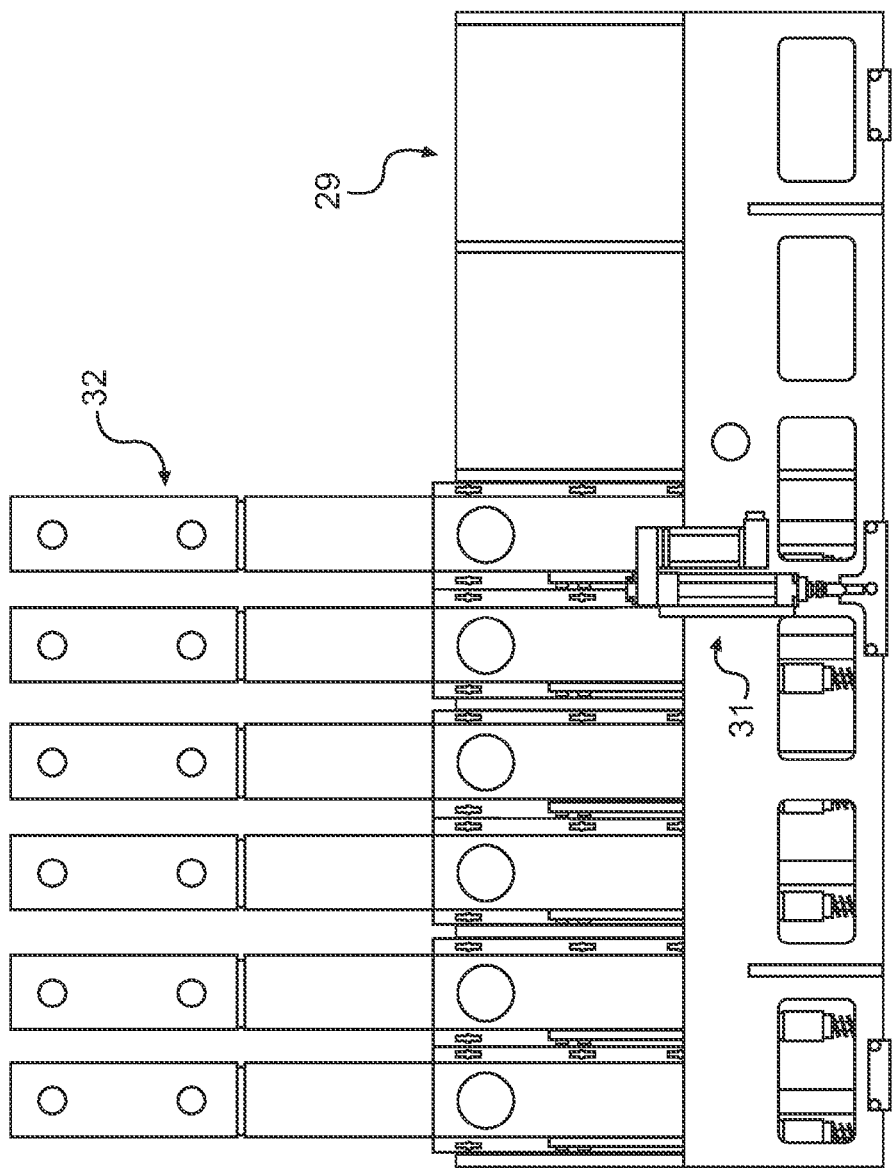
FIG. 14 is a schematic diagram illustrating a front view of an embodiment of a welder frame unit.
Figure 15:
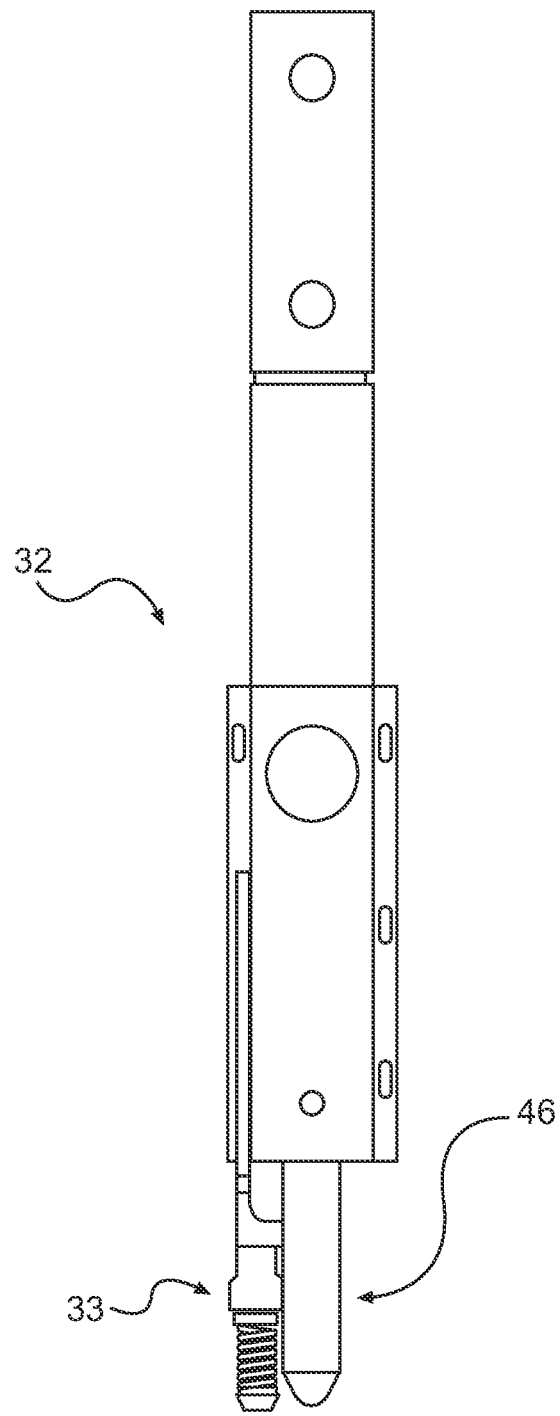
FIG. 15 is a schematic diagram illustrating a front view of an embodiment of a single welder unit with a pressure foot attached.

As shown in FIG. 7, the tape placement head 3 has three subsystems: a tape feed and cutter unit 20, a welding unit 21, and a tape carriage unit 22. Tape enters through the tape feed and cutter unit 20 and through a set of driven feed rollers 23. As shown, for example, in FIGS. 9a and 9b, the feed rollers 23 pinch the tape and push it past an adjustable tape alignment plate 44, through a tape-cutting unit 24, and into guide rails 25 (see FIG. 10) that are part of the tape carriage unit 22. As shown in FIG. 13, tape is fed through the guide rails 25 until the distance between the tape end and the cutter blade 45 equals the desired strip length 26. Once this point has been reached, the pinch roller stops feeding tape and the cutter unit cuts the tape. This leaves a section of tape 27 of a known length suspended between the guide rails 25.

In the feed and cutter unit depicted in FIG. 8, the cutter unit 24 comprises a blade and anvil between which the feed unit feeds the tape and whose movement is controlled such that when the blade shears past the anvil, the tape is cut into a tape section. Alternate cutter embodiments could also be used, including, for example, a rotary knife cutter, an ultrasonic knife, or a laser that could traverse a path across the width of the tape to cut it. With a traversing cutter, or similar device, the cut line could also be nonlinear, for example, curved, jagged, or serrated.

Figure 10:
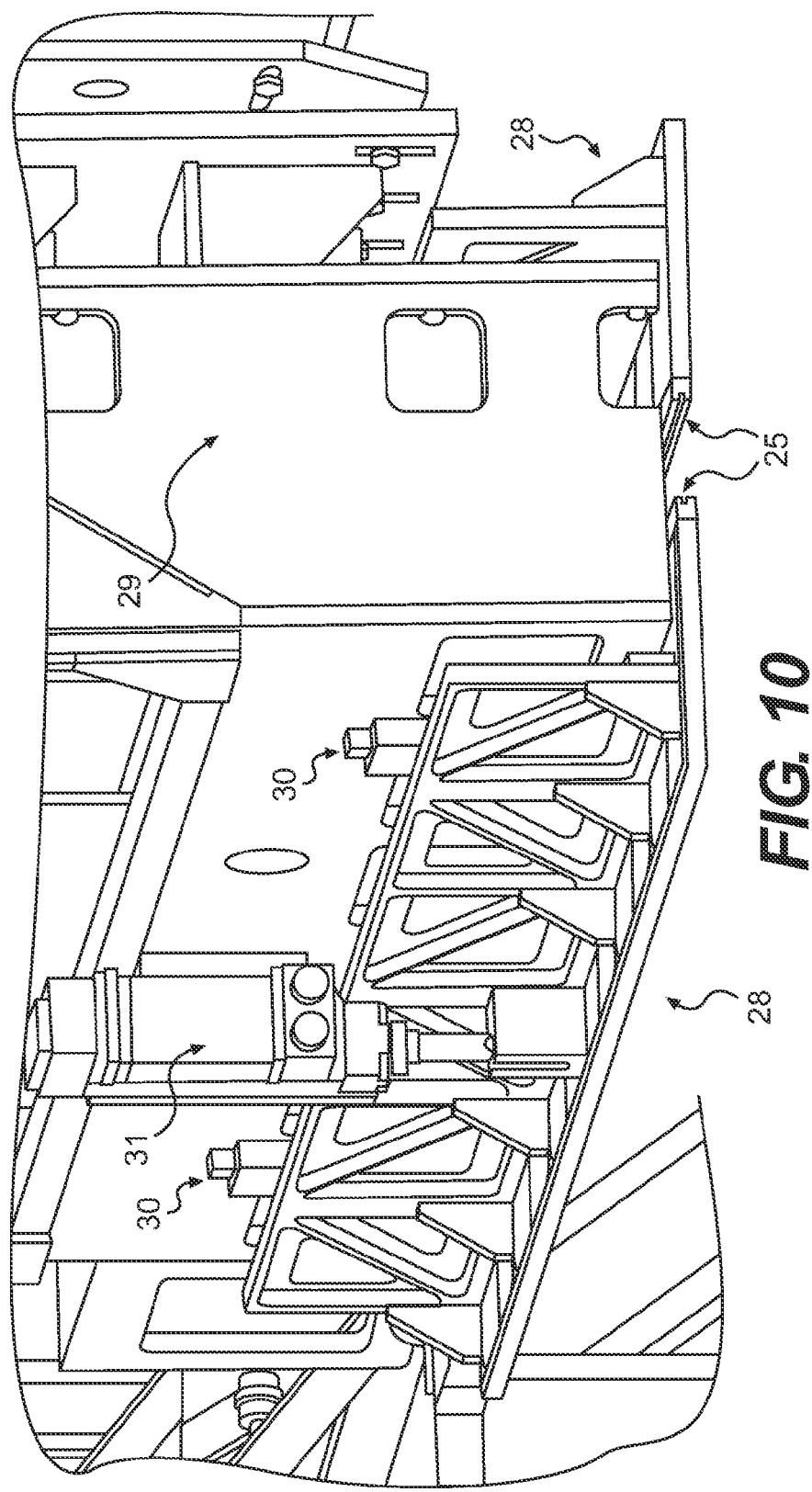
FIG. 10 is a schematic diagram illustrating a detail view of an embodiment of a tape carriage.
Figure 11:
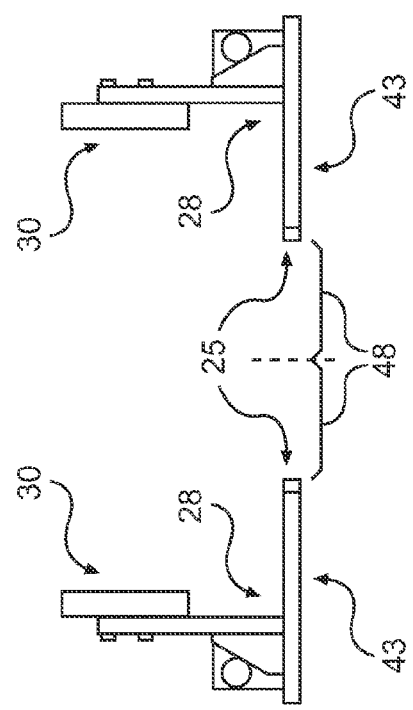
FIG. 11 is a schematic diagram illustrating an end view of an embodiment of a carriage frame.
Figure 12:
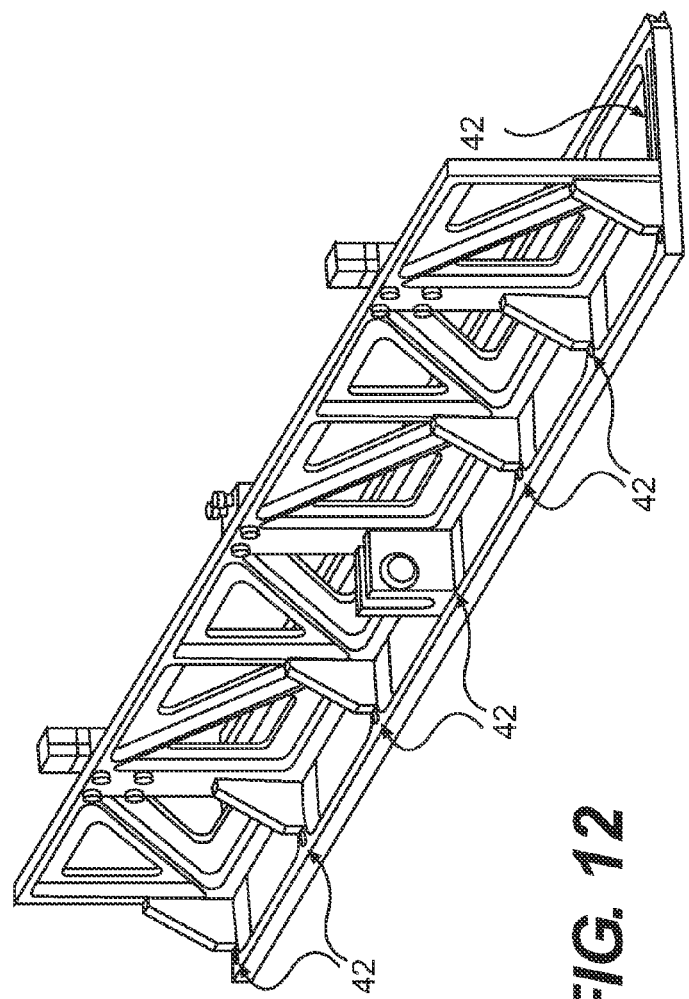
FIG. 12 is a schematic diagram illustrating slotted holes in an embodiment of a carriage frame.

The guide rails 25 are part of the tape carriage unit 22 (see FIGS. 7 and 10). In this embodiment, the system comprises two substantially parallel guide rails 25 that are each attached to a set of carriage frames 28. There is one guide rail and one carriage frame for each edge of the tape. Each carriage frame is affixed to the main welder frame 29 via linear slides 30 and a linear actuator 31. As shown in FIGS. 11 and 12, slotted attachment holes 42 in the horizontal portion 43 of the carriage frame allow the distance of the guides from centerline of the tape 48 to be adjusted.

In this embodiment, the tape section is held between the guide rails by grooves in the guide rails in which the edges of the tape rest. Tape that has a certain degree of transverse stiffness (i.e., stiffness across the width of the tape section) stays in place just by resting on the grooves. For tape with insufficient transverse stiffness to stay in the grooves, the guide rails can be moved closer together such that the tape is squeezed and becomes cupped with the center of the tape higher than its edges. The cupped shape provides additional transverse stiffness to the tape section, allowing it to be held by the guide.

Figure 18:
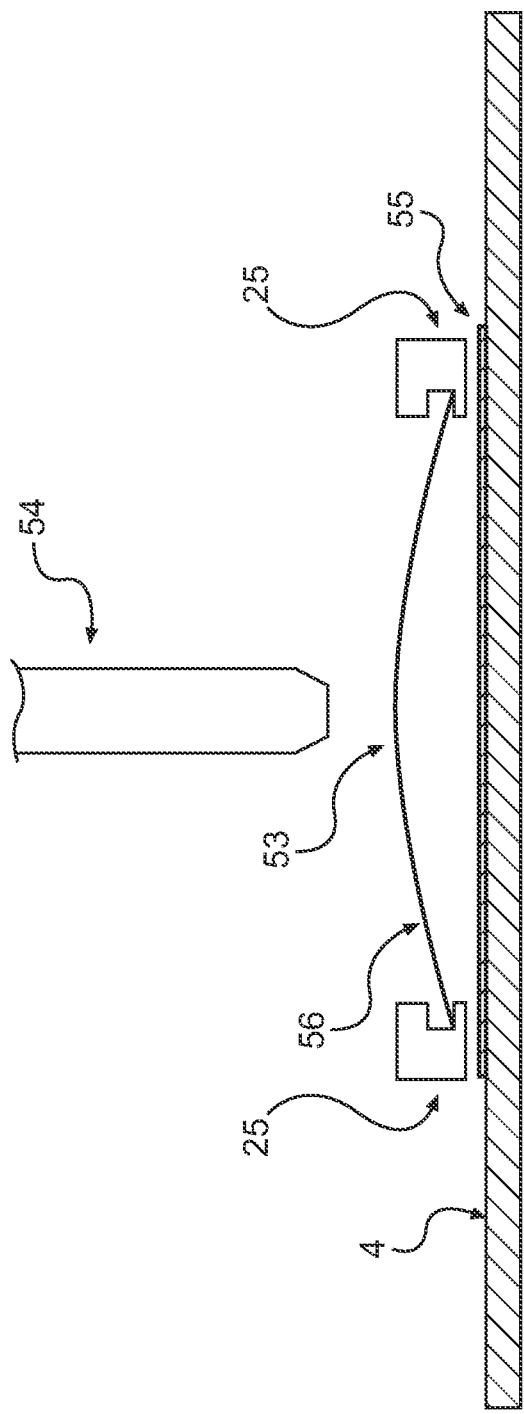
FIG. 18 is a schematic diagram illustrating an end view of an embodiment of a tape section cupping between guide rails and a lowered guide rail vertical location relative to a tooling surface.

FIGS. 18-21 illustrate an exemplary system and method for handling, placing, and tacking a tape section 56 to an underlying tape section. In this example, the tape section 56 has insufficient transverse stiffness to remain in the grooves simply by resting on top of the lower surface of the grooves in the guide rails 25. Therefore, the guide rails 25 are adjusted to be closer together such that the edges of the tape section 56 are squeezed by the vertical walls of the grooves, causing the tape section 56 to become cupped with the center of the tape section higher than its edges 53, as illustrated in FIG. 18. In other words, the width of the tape section 56 is convex with respect to horizontal in FIG. 18. The cupped shape provides additional transverse stiffness to the tape section, allowing it to be adequately supported by the grooves in the guide rails 25.

Figure 19:
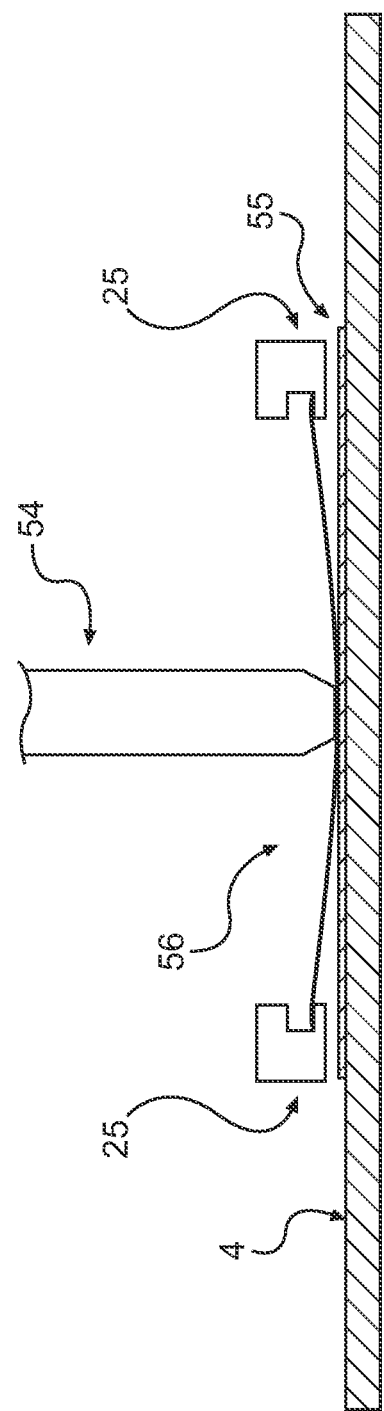
FIG. 19 is a schematic diagram illustrating an end view of an embodiment of a tape section being tacked to an underlying tape section.

With the tape section 56 within the guide rails 25, the guide rails 25 lower to a point just above the tooling surface 4, as illustrated in FIG. 18. Next, as illustrated in FIG. 19, one or more pressure feet 54 lower to press the tape section 56 into contact with the underlying material. In the present embodiment, the welder tips 46 themselves (see FIG. 15) serve as pressure feet, in addition to the dedicated pressure feet 33 that have also been described. Alternatively, the welder tips and pressure feet can be a single integrated device. With the tape in place and the welder tips lowered, the tape section is then tack welded to any underlying material. In some cases, the tape section will directly contact the tooling surface 4 and in other cases it will contact previously placed tape sections 55. If the tape section underneath a welder tip is directly touching the tooling surface, then that particular welder does not energize, since that portion of the tape section is secured to the table, for example, with vacuum.

Figure 20:
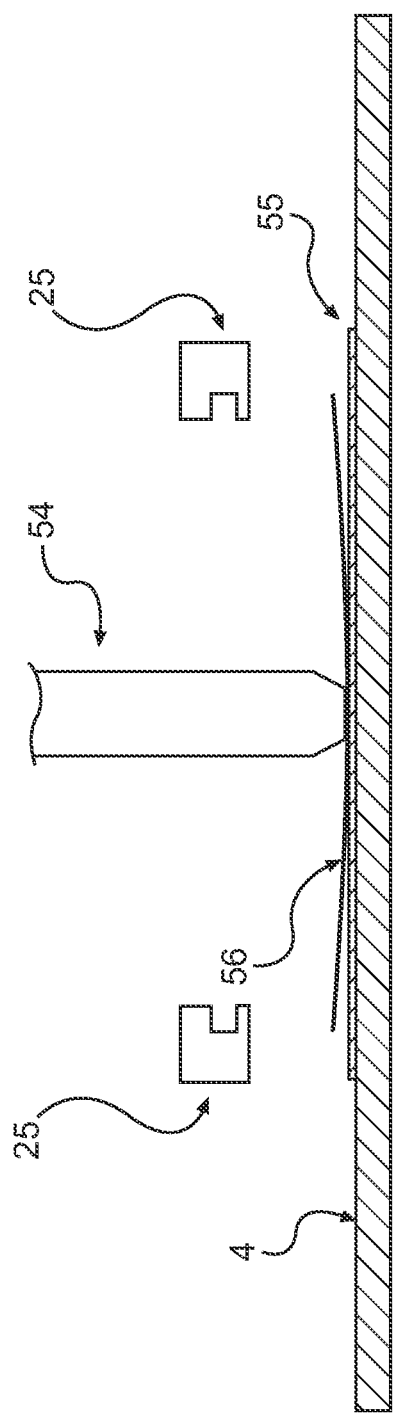
FIG. 20 is a schematic diagram illustrating an end view of an embodiment of a tape section being removed from guide rails as the guide rails retract and the pressure foot holds the tape section in place.
Figure 21:
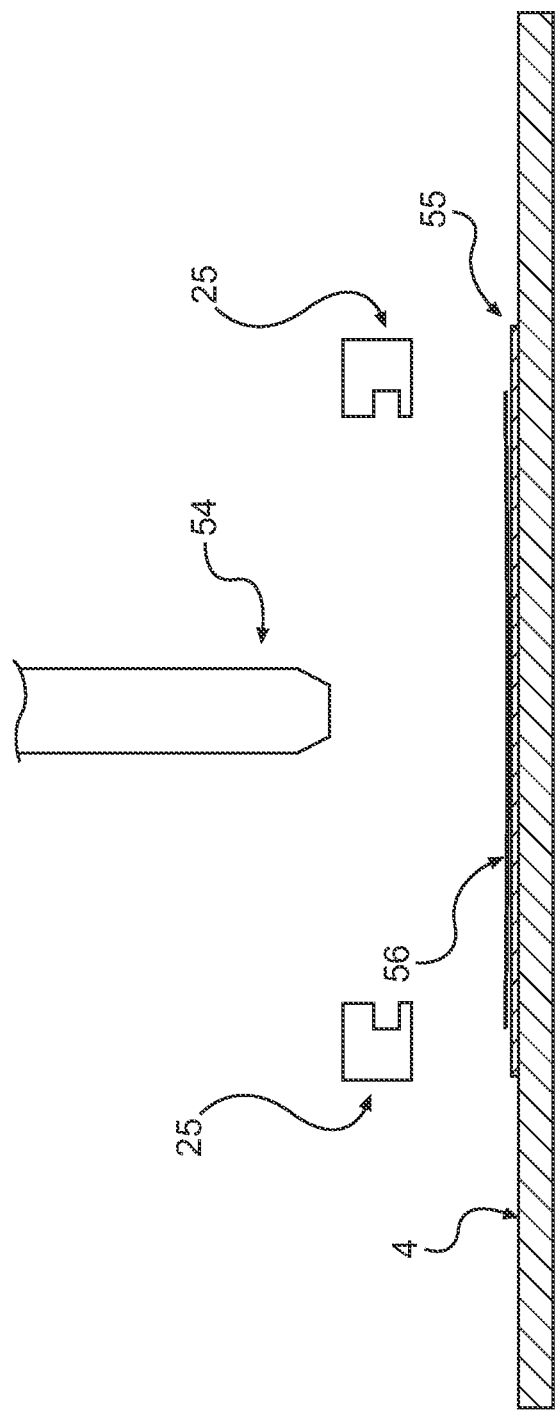
FIG. 21 is a schematic diagram illustrating an embodiment of an end view of guide rails retracted and pressure foot retracted.
Figure 22:
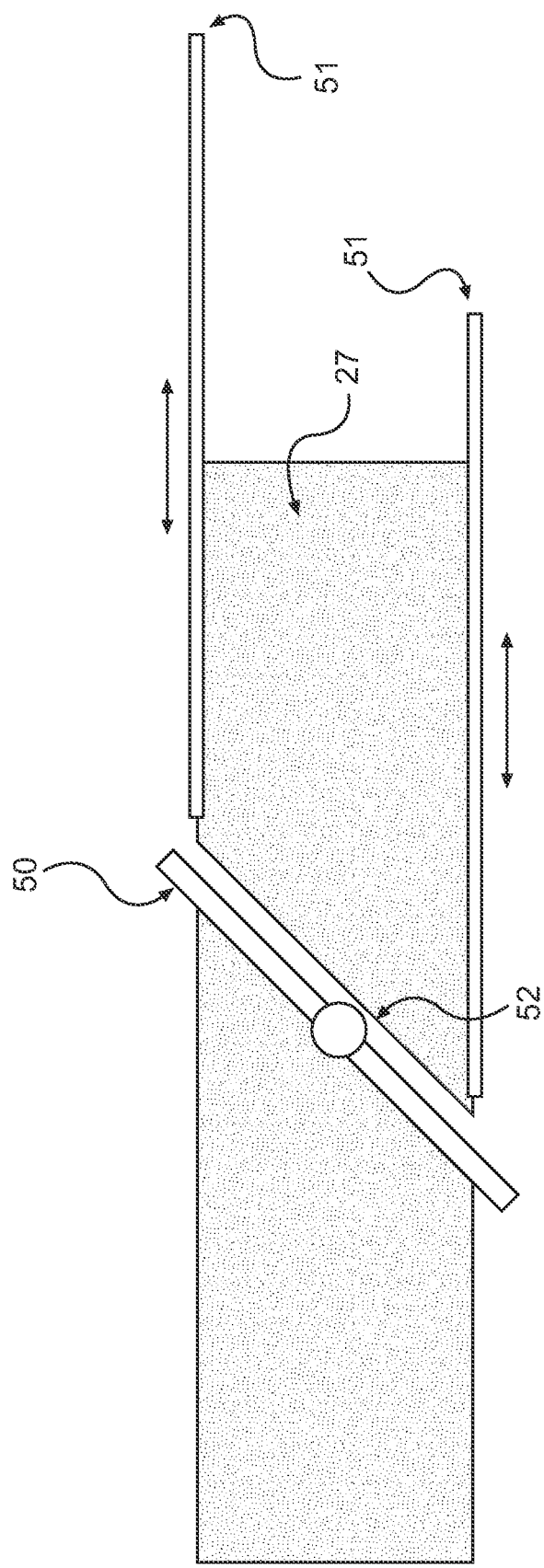
FIG. 22 is a schematic diagram illustrating an embodiment of lateral movement of guide rails with an angled cutter.
Figure 23:
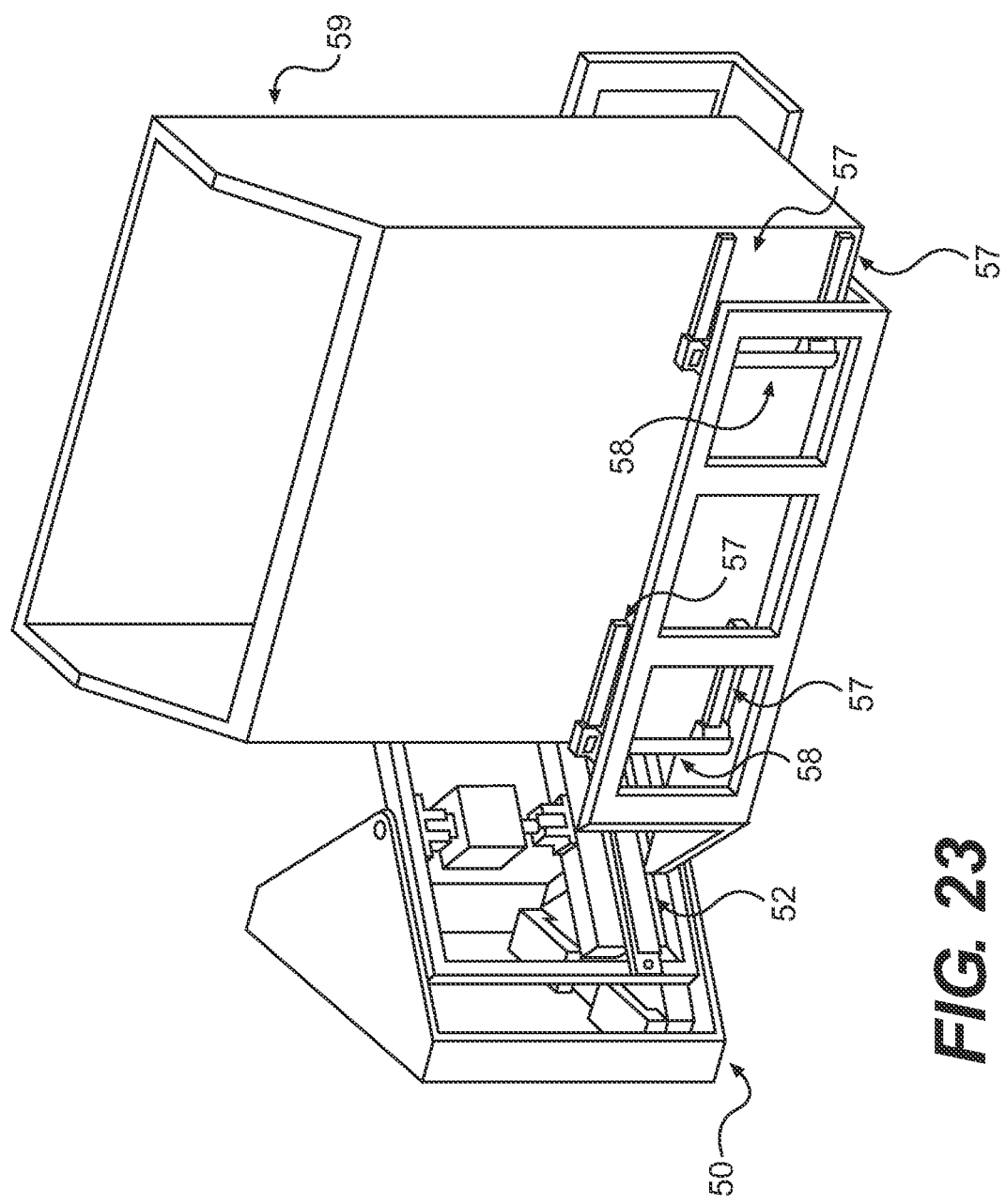
FIG. 23 is a schematic diagram illustrating an embodiment of an angled cutter and horizontally actuating guide rail mechanism with the cut angle in the +45° cut position.

Once the welds have been made, as illustrated in FIG. 20, the guide rails 25 rise up with the pressure feet still pressing on the tape. This causes the tape edges to be pulled out of the grooves of the guide rails 25, thus releasing the tape section 56 from the guide rails 25. Then, as illustrated in FIG. 21, the pressure feet retract, leaving the tape section 56 secured in place on the tooling surface 4.

In this embodiment, the vacuum table 4 serves as the tooling surface upon which the part is built up. The vacuum table is attached to a three-axis motion platform 5 (see FIGS. 2, 3, and 4) that precisely positions the vacuum table beneath the placement head. Instructions from an off-line program determine the required length of tape and its position and orientation on the table. While the tape is being fed into the guide rails 25, the motion platform 5 moves the vacuum table 4 under the placement head to the desired x-axis, y-axis, and rotary angle coordinates. In other embodiments, the tooling surface may not be a vacuum table. In some cases, for example, an electrostatic charge could be used to hold tape sections or other parts to a tooling surface. Moreover, any methods known in the art for holding material to a tooling surface could be used in still other embodiments.

Figure 2:
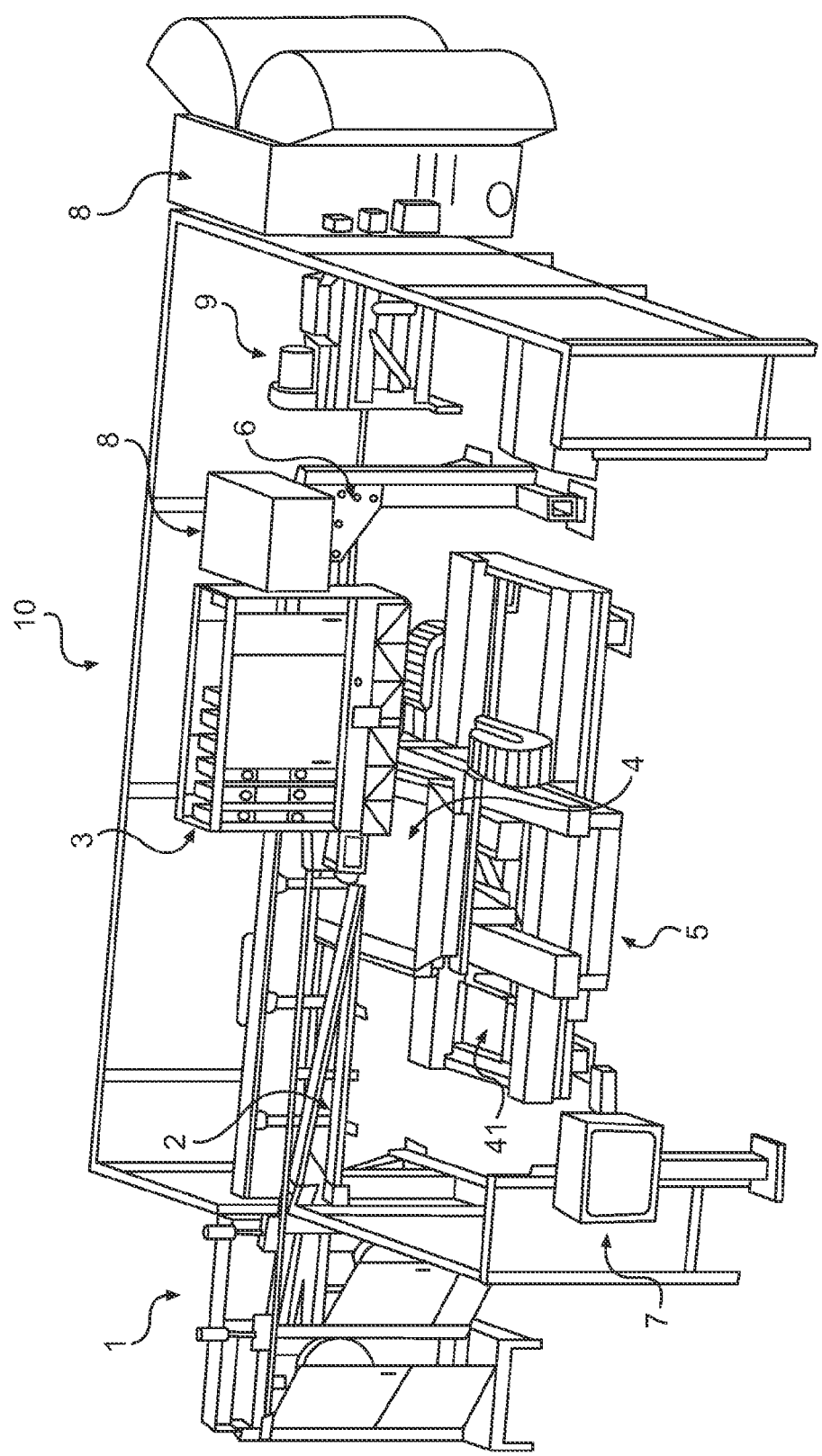
FIG. 2 is a schematic diagram illustrating an isometric view of an embodiment of a system for applying composite tape.
Figure 3:
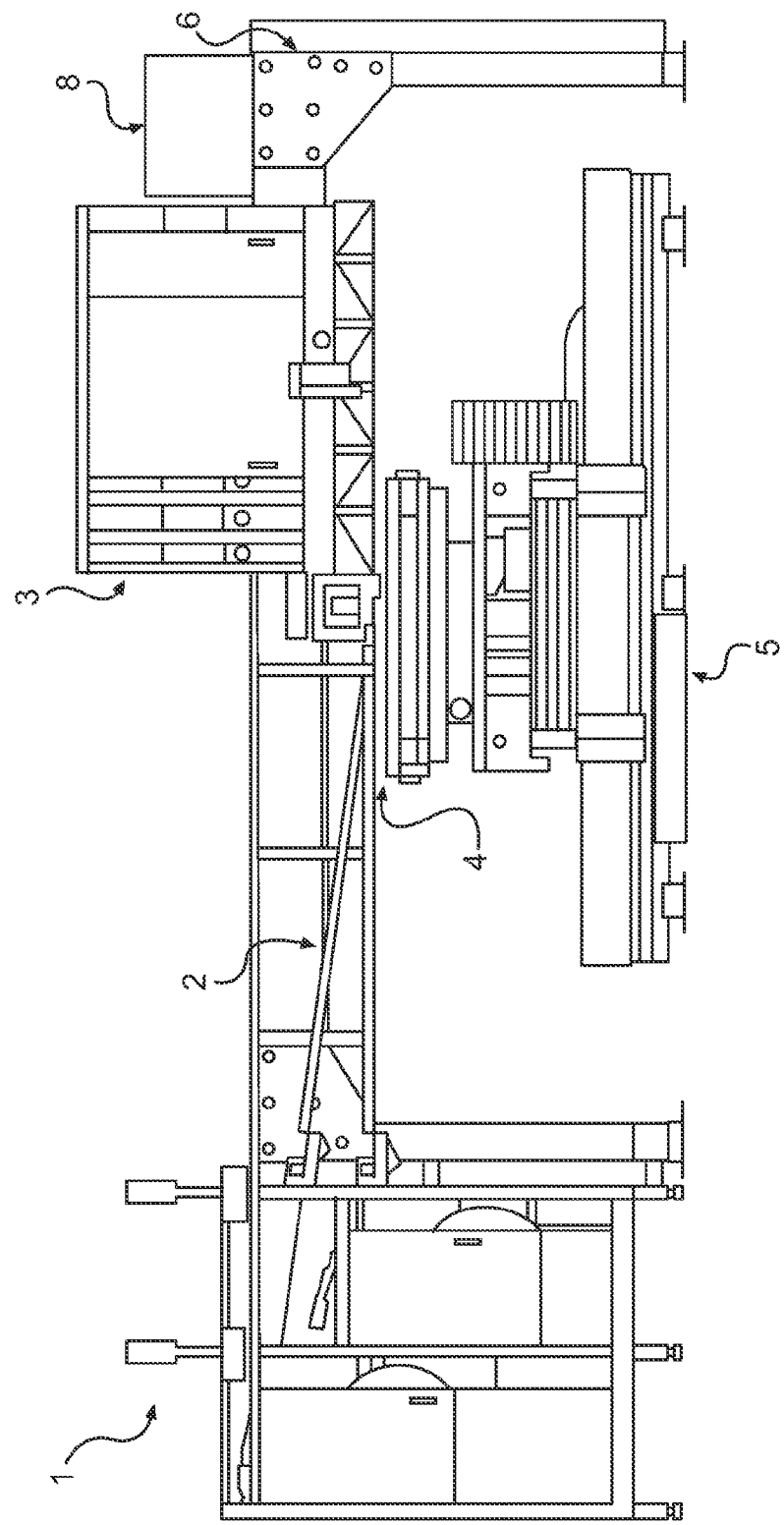
FIG. 3 is a schematic diagram illustrating a front view of the system shown in FIG. 2.
Figure 4:
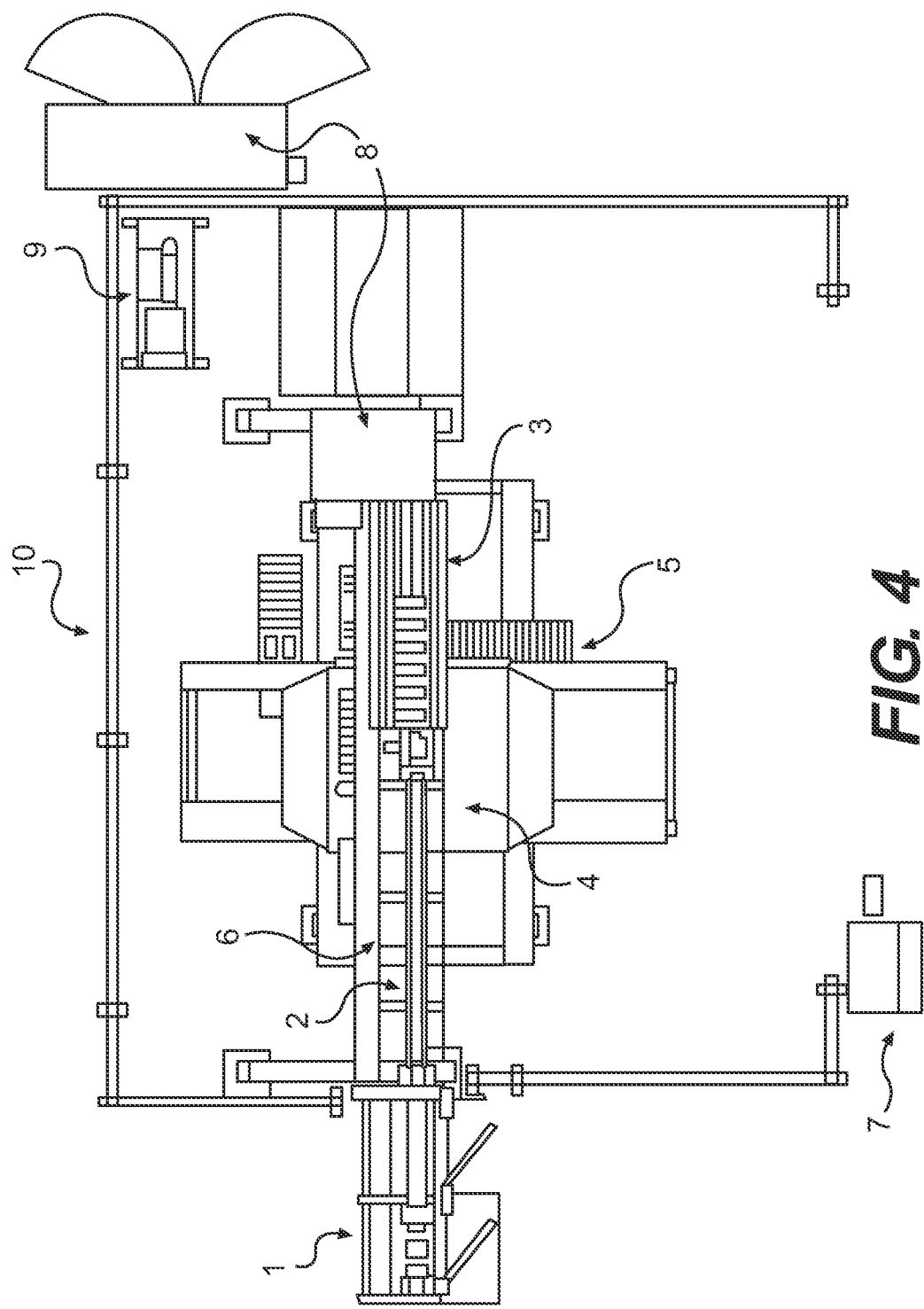
FIG. 4 is a schematic diagram illustrating a top view of the system shown in FIG. 2.
Figure 5:
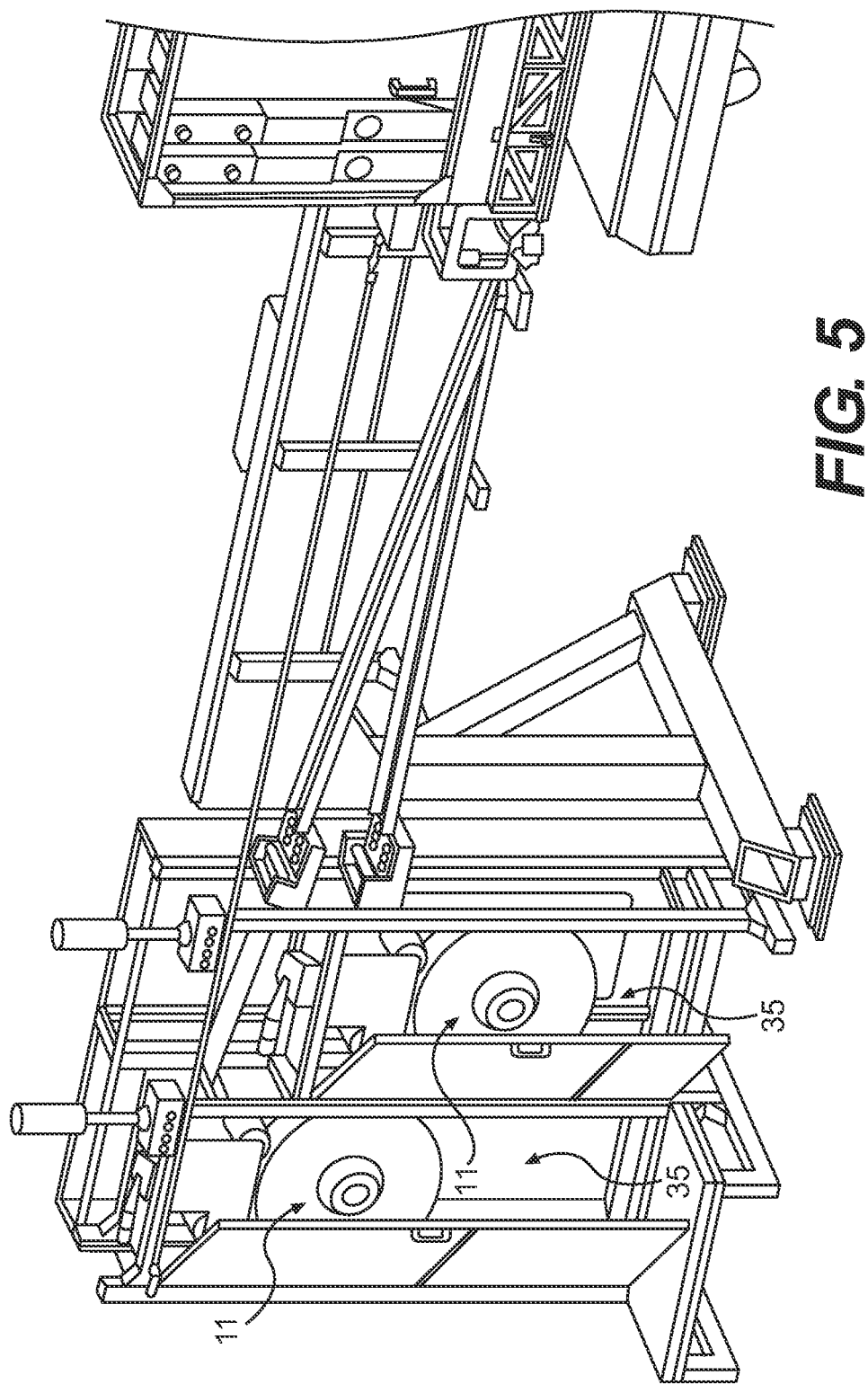
FIG. 5 is a schematic diagram illustrating a detail view of an embodiment of a material dispensing system and tape transport rail.
Figure 6:
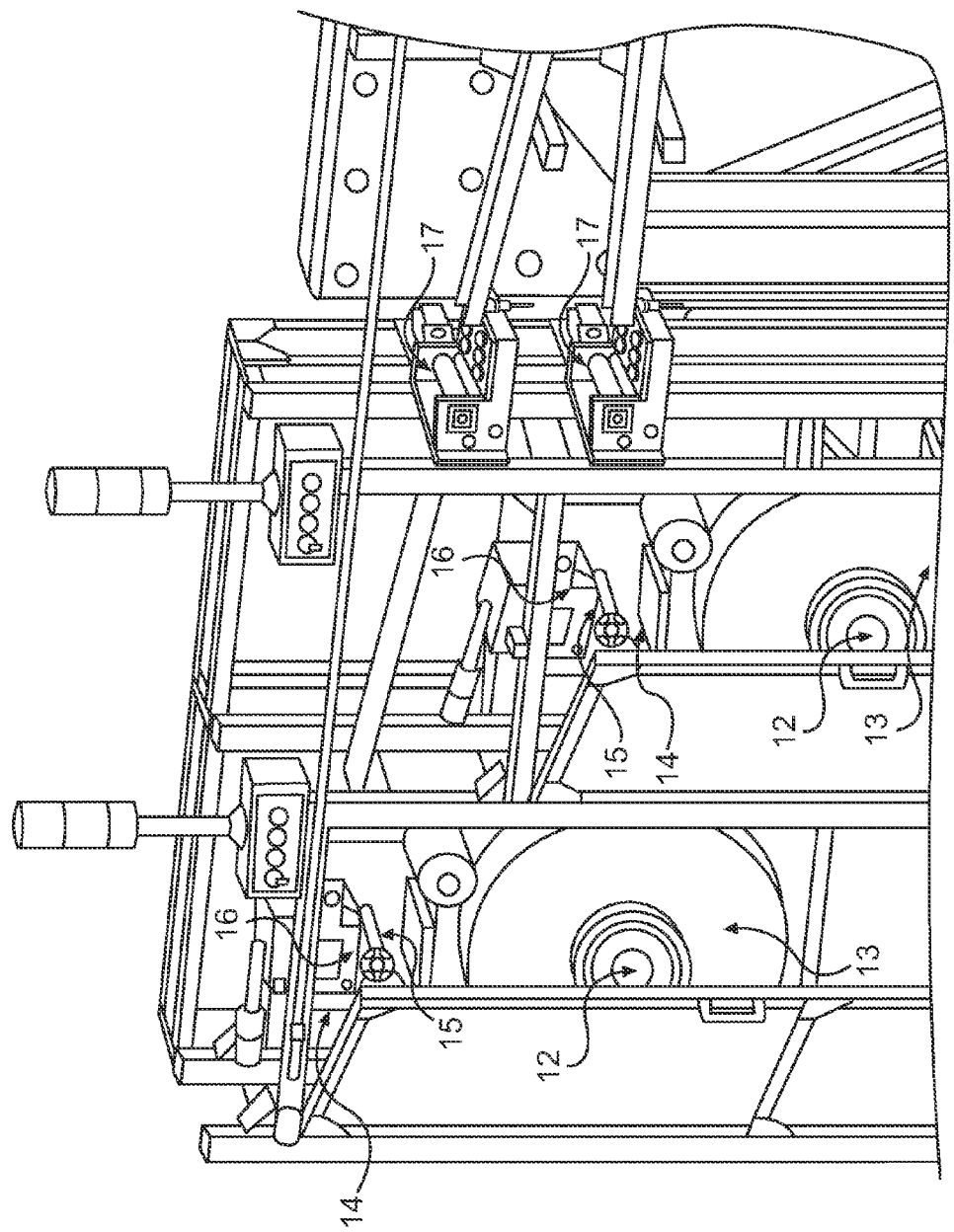
FIG. 6 is a schematic diagram illustrating a detail view of an embodiment of a material dispensing system and autofeeder unit.

Having described the configuration and function of each of the subsystems above, the entire tape placement process operates as follows:

Once the tape has been fed into the guide rails 25 and cut from the roll into a tape section, and the vacuum table 4 has been positioned at the desired location and orientation, the carriage frames 28 lower until the tape section is nearly touching either a previously laid ply or the tooling surface. An array of one or more welder units then lowers from the welding unit 21 and presses the section of tape onto the tool (or previously laid ply). For reference, three six-welder units are illustrated in FIGS. 2, 4, and 7. In addition to the welder tip 46, a pressure foot 33 is attached to each welder actuator (see, for example, FIGS. 14 and 15). This pressure foot also serves to press down on the tape to hold it in contact with either the tooling surface 4 or a previously laid ply.

For the condition where the tape section is placed in direct contact with the tooling surface 4, it may be held in place by the table's vacuum. For the condition where the tape section is placed on top of a previously laid ply, the welder may turn on and tack the top layer of tape to the underlying material. In one embodiment, the welders may use an ultrasonic impulse to create these welds.

When the welding/tacking step is complete, the welder units remain in contact with the tape while the carriage frame begins to lift up and return to its load position. Since the center of the tape remains secured to the tool and is pinned down by the welder units, the relative motion between the stationary tape section and the rising guide rails 25 causes the edges of the tape to be pulled out of the guide rails 25. Once the tape edges are free of the guide rails 25, the welder units retract, leaving the tape section in place on the tooling surface 4.

This procedure is repeated for each section of material that will comprise the blank. After the final tape section has been placed, the table vacuum is turned off, which allows the part to be removed easily from the table.

Figure 16:
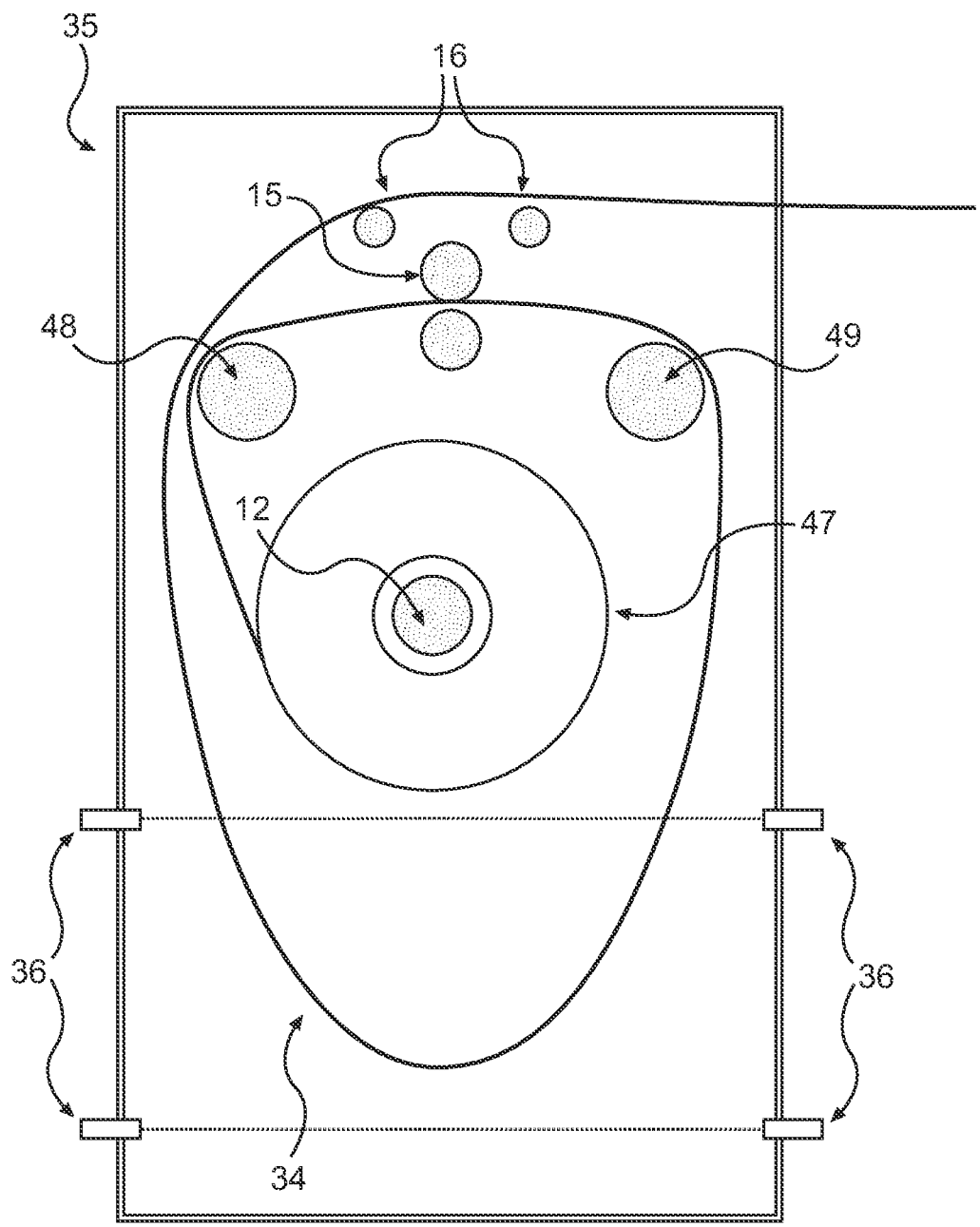
FIG. 16 is a schematic diagram illustrating an embodiment of a configuration of an unwind and slack system.
Figure 17:
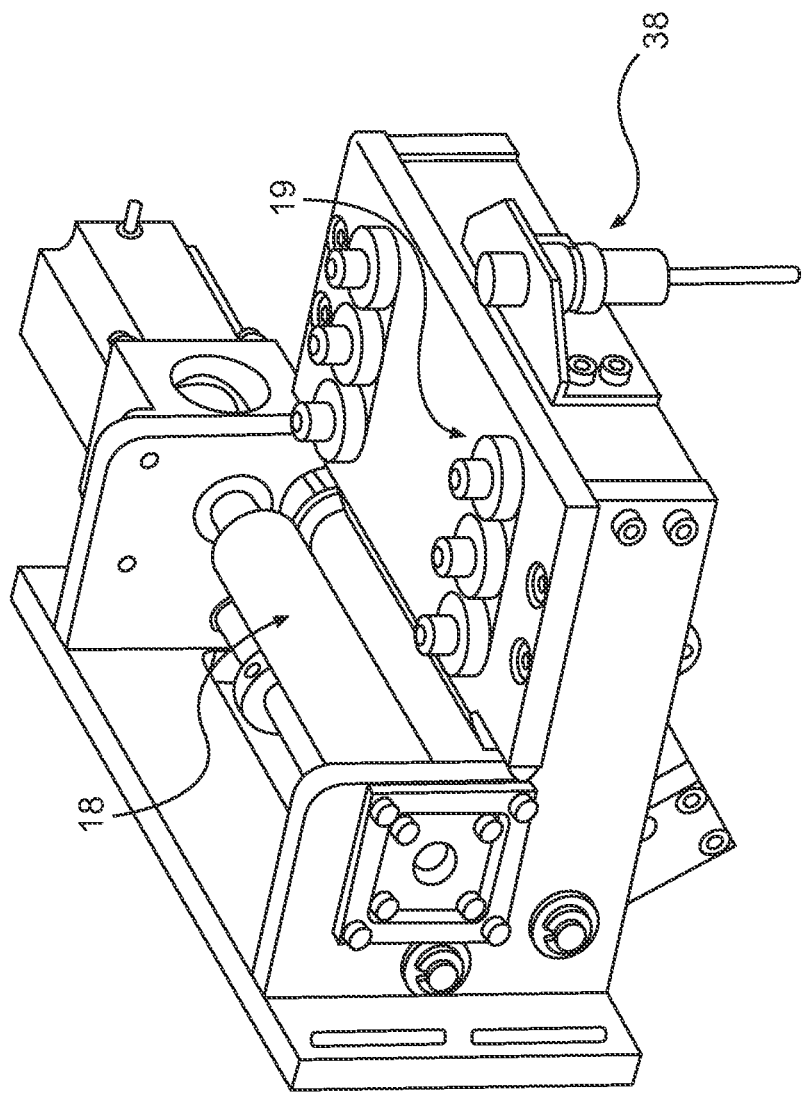
FIG. 17 is a schematic diagram illustrating a detail view of an embodiment of a single autofeeder unit.

For the placement head 3 to feed tape quickly into the guide rails 25, the tape may be configured to have very low back tension. If the tension is too high, the inertia of the spool of material could resist the rapid acceleration and deceleration of the tape as the feed rollers push tape into position. Thus, as shown in FIG. 16, the material dispensing system 1 actively unspools the material roll so that it puts slack in the final loop of material 34 within the creel box 35. The amount of slack is determined by the length of the tape section to be placed. This slack loop leaves very little back tension in the tape and allows the placement head to feed material very quickly. Sensors within the creel box 36 inform the control system if the slack loop is getting too small or too large.

The pinch roller can feed tape from a spool into a slack coil of tape within a creel box and can be configured to maintain the slack loop size to within a determined range using feedback by one or more slack loop position sensors. Maintaining slack at the end of a tape spool reduces back tension in the tape as the tape feeds. Actively uncoiling the tape spools of the tape supply unit minimizes tape tension between the tape feed unit and the tape spools.

During operation, several events can interrupt the normal sequence of actions. Several sensors are put in place to flag such events and to manage them. One such event is the feed roller failing to feed the correct amount of tape. This has been addressed by incorporating an encoder wheel 37 (FIG. 9a) that measures the length of tape being fed. If the measured feed length does not agree within a certain tolerance to the desired feed length, then corrective action is taken.

The system also senses when the end of the roll of material has been reached. When the end of the roll is reached, a sensor 38 (FIG. 17) in the autofeeder unit 17 detects the end of the tape. The system continues to feed the tape until a second material detection sensor 39 (FIG. 8) at the entrance to the placement head 3 detects the tape end. When the tape end passes this point, the feed roller stops and a redirect plate 40 within the placement head is engaged, deflecting the tape end downward. The motion platform then moves the vacuum table 4 out from under the placement head and the feed roller 23 reverses its motion, thereby feeding the final strip of tape into a catch basin 41 (see FIG. 2). If the second creel box is loaded with the same type and size of tape, the system can then run the autofeeder to load the placement head with new material and operation can continue without further delay.

The second creel box can be used for more than one purpose. If the tailored blank includes more than one type of tape material (for example, glass fiber tape and carbon fiber tape), then the creel boxes could be loaded with different materials. The placement head would then be able to lay up two types of material without having to be reloaded manually. The pinch rollers in the autofeeder unit of one creel box would retract tape a sufficient distance so that tape from the other creel box could be fed into the placement head.

In the embodiment described herein, the machine can be set up to process different tape widths. To change widths of tape to process, adjustment is made to the creel boxes so that the centerline of the tape roll is aligned with the centerline of the welder tips. The distances between the guide edges of the feed guides, tape transport rails, and carriage frame are then widened or narrowed to accommodate the desired tape width. In one embodiment, the adjustments are made manually. Another embodiment employs automatic width adjustment. This automatic adjustment can reduce the time required to set the equipment up to run different widths of material. Additionally, the automatic adjustment mechanism can allow multiple tape widths to be laid up in a single blank without interrupting production to adjust the equipment.

Figure 24:
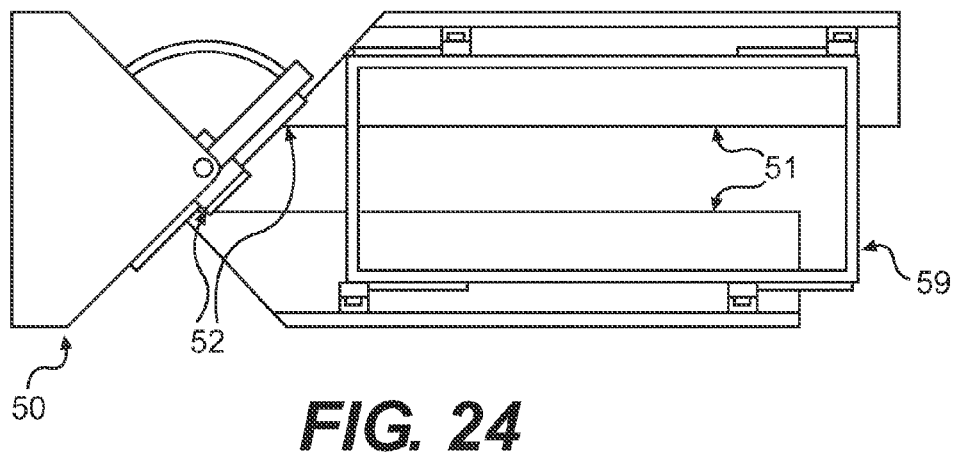
FIG. 24 is a schematic diagram illustrating a top view of the angled cutter and horizontally actuating guide rail mechanism of FIG. 23, with the cut angle in the +45° cut position.
Figure 25:
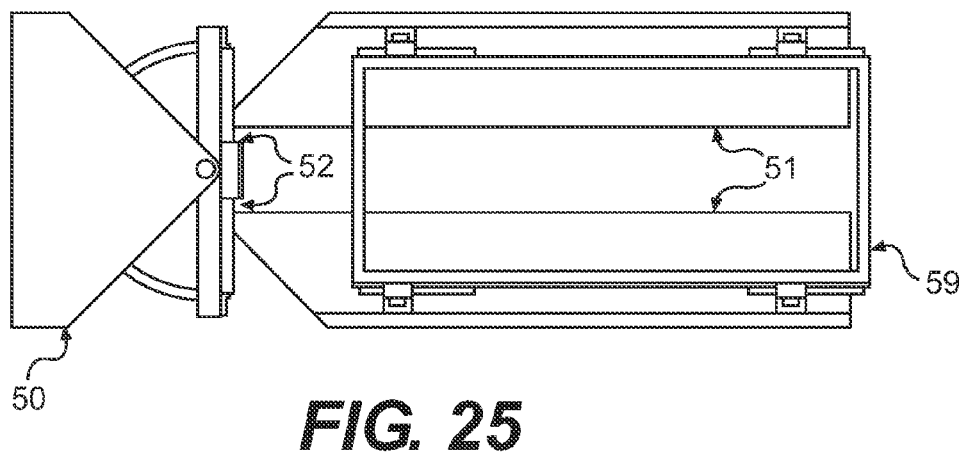
FIG. 25 is a schematic diagram illustrating a top view of the angled cutter and horizontally actuating guide rail mechanism of FIG. 23, with the cut angle in the 0° cut position.
Figure 26:
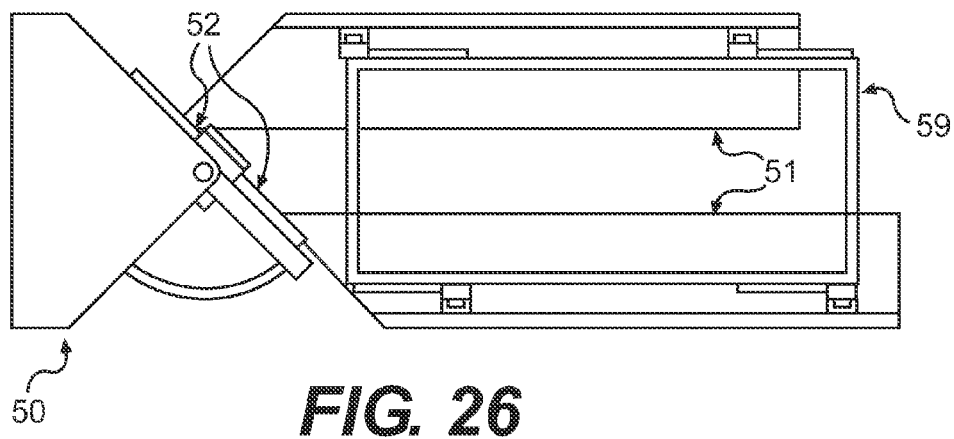
FIG. 26 is a schematic diagram illustrating a top view of the angled cutter and horizontally actuating guide rail mechanism of FIG. 23, with the cut angle in the −45° cut position.

An alternative embodiment adds the ability to cut tape so that the cut edge is not always perpendicular to the sides of the tape. Adding the ability to vary the cut angle can give tailored blanks more degrees of freedom, which can in turn lead to improved blank performance, as well as reduce the amount of scrap to be trimmed. An exemplary angled cutting system is illustrated in FIGS. 22-26, according to an embodiment. In this system, cutter unit 50 rotates about its center and guide rails 51 each move forward and backward to maintain a close distance between the cut edge 52 of the tape section 27 and the guide rails 51. In the embodiment depicted, the horizontal movement is achieved by adding horizontally-oriented linear slides 57 and actuators to the welder frame 59 upon which the vertically oriented linear slides 58 and actuators are mounted. When the cutter unit rotates to a specified angle (the system configuration at three different angles are depicted in FIGS. 24-26), one side of the cutter moves toward the guide rails and the other side moves away from the guide rails. This movement can be matched by the guide rails to maintain a minimum gap between the cutter and the rails. Maintaining a minimal gap ensures that only a small portion of the tape section overhangs the guide rails, and prevents the end of the tape section from sagging off the end of the guide rails and hindering the handling of the tape section.

Another variant of the system described includes a carriage system that moves the guide rails not only vertically, but also horizontally along the tape feed direction. This movement allows more precise positioning of the tape relative to the welder heads, and it allows for courses to be placed that are shorter than the distance between the cutter blade and the first welder head. After the cutter cuts a tape section, and the tape is within the guide rails, the carriage moves horizontally away from the cutter and lowers toward the tooling surface to deposit the tape section. Lateral guide rail movement is thus included as an independent concept, though it may also be a feature of the angled cutting system.

In an embodiment, either or both of the tooling surface and guide rails move to provide relative displacement with respect to each other. Such movement can be in any direction, such us horizontal, vertical, or combinations thereof, and can include movements such as translational, rotational, or pivotal movements.

As one of ordinary skill in the art would appreciate, the guide rails described herein are only one of many means that could be used for suspending the tape above the tooling surface and positioning the tape once it has been fed and cut. Other methods that use vacuum to suspend the tape above the tooling surface, trays that release the tape by increasing the distance between the guide rails, retractable trays, or other mechanisms may also be employed.

Alternative Implementation

A method and system for creating advanced composite tailored blanks using tape can include provisions for automatically adapting to different kinds of tape material characteristics and/or sizes. For example, a method and system can include provisions to guide tape sections over a tooling surface that can be used with tapes of varying degrees of stiffness. In some embodiments, a method and system may include tape spools that are unwound using a direct-drive motor. In such cases, back tensioning of the tape could be managed using various types of rollers, including dancer rollers.

In some embodiments, a method and system can include a tape gripping assembly that grips tape supplied to a tape tacking device. The tape gripping assembly may grip an end portion of a tape and pull the tape from a tape supply to a desired length at which the tape is cut into a tape section. This "pull configuration" contrasts with "push configurations," such as embodiments described above that push tape from tape supplies into tape section guides using, for example, pinch rollers. In some embodiments of the pull configuration, tape may be pushed (e.g., by a pinch roller) far enough through the cutter so that the gripper assembly can grab an end portion of the tape, at which point the tape is no longer pushed (e.g., released by the pinch roller) and gripper assembly pulls the tape the rest of the way. The pull configuration may enable more accurate and reliable feeding of the tape and faster through-put speeds for the system.

FIGS. 27-49 illustrate different views of additional embodiments of a system for creating advanced composite tailored blanks. Some provisions of these additional embodiments may be similar to provisions disclosed with reference to the embodiments shown in FIGS. 1-26. For purposes of clarity, like numerals are used to denote like parts. However, the embodiments illustrated in FIGS. 27-49 may include additional provisions not used in the previous embodiments. Likewise, the present embodiments may exclude some provisions used in the previous embodiments shown in FIGS. 1-26. It will also be understood that still other embodiments could include combinations of provisions from the embodiments shown in FIGS. 1-26 and the embodiments shown in FIGS. 27-49.

The process of creating a laminate comprising multiple plies of tape material may generally proceed in a similar manner as described above with some variations. In particular, during a first step the tape material may be fed from spools to a tape placement head. In the current embodiment, the tape may be unwound from the spools using a motor drive and driven pinch rollers and back tension may be controlled using dancer rollers. Tape may be fed through a tape cutting system and gripped at an end portion by a tape gripping assembly. A mechanism used to feed the tape through the tape cutting system (e.g., pinch rollers that push the tape) may release the tape after the tape gripping assembly grips the tape. Next, the tape gripping assembly may pull the tape from the tape supply to a desired length at which the tape may be cut by the cutting system to create a tape section. Next, with respect to the tooling surface, a tape gripping assembly may be used to move the tape section along the length of a tape tacking device, such as a welding system. In addition, the tooling surface can be moved along a first axis that is perpendicular to the length of the tape tacking device, as well as rotated. In some cases, the tape tacking device may also be configured to move in the direction parallel with the length of the tape tacking device. In some cases, the tape tacking device can be lowered towards the tooling surface as the tape section is positioned. At this point, the tape section may be either tacked to underlying material or secured to the tooling surface.

Figure 27:
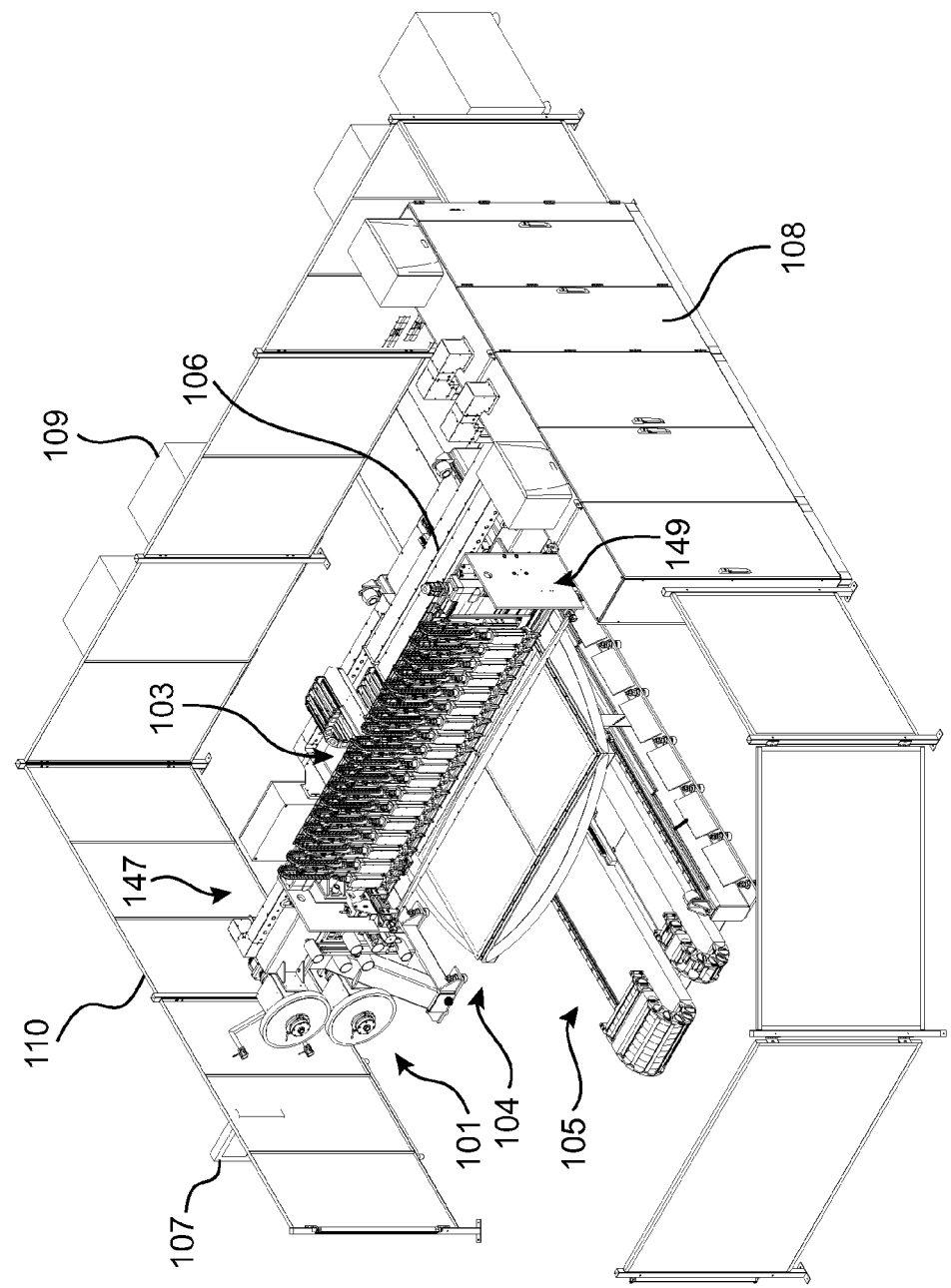
FIG. 27 is a schematic diagram illustrating another embodiment of a system for applying composite tape.
Figure 28:
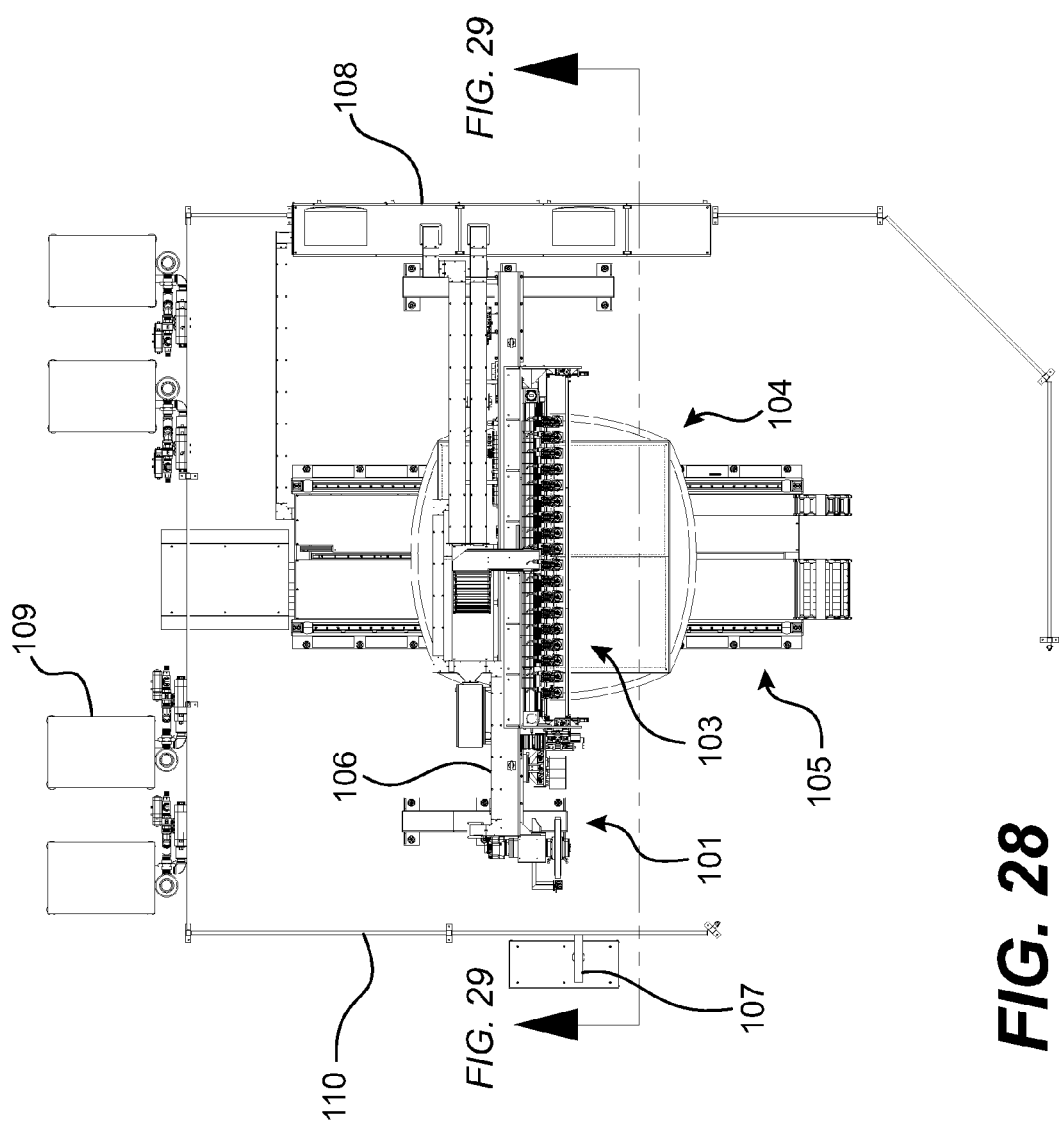
FIG. 28 is a schematic diagram illustrating a top view of the system shown in FIG. 27.
Figure 29:
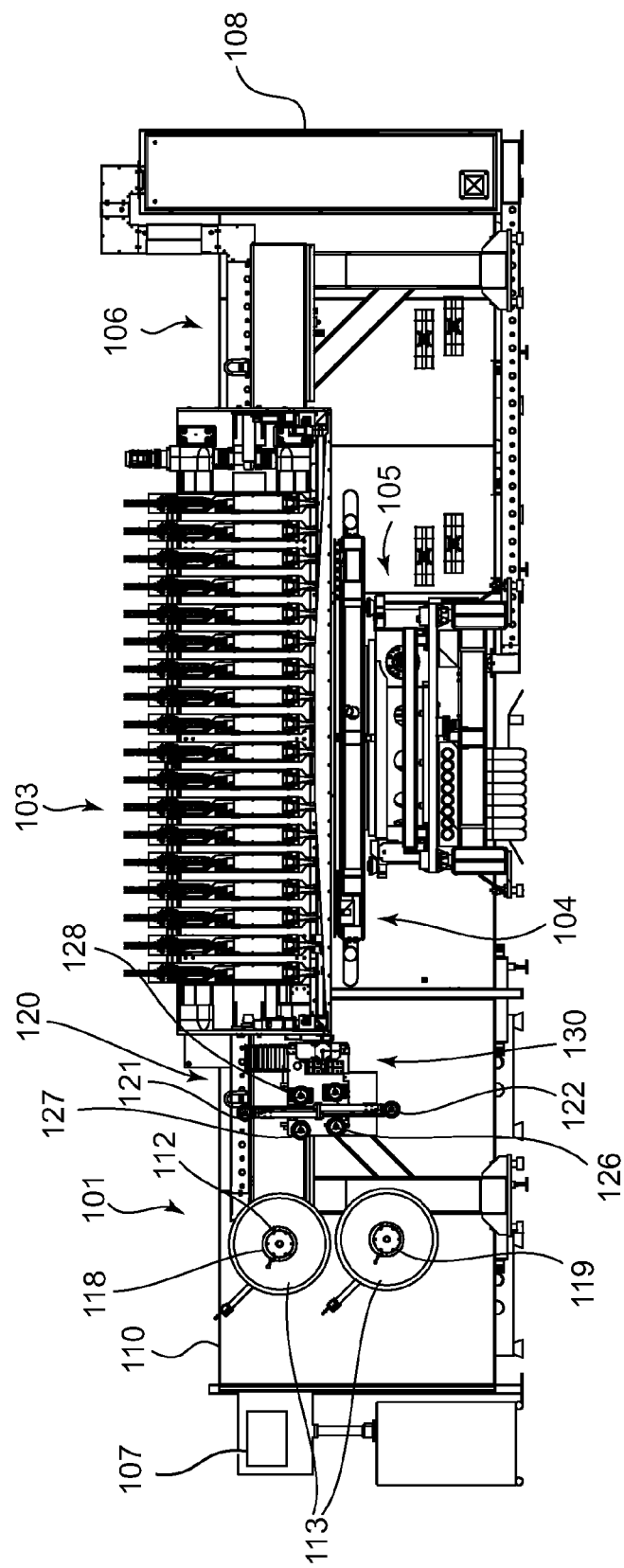
FIG. 29 is a schematic diagram illustrating a partial cross sectional view of the system shown in FIG. 27, as taken along the section line shown in FIG. 28.

Referring to FIGS. 27-29, one embodiment of the system may comprise material dispensing system 101, tape placement head 103, vacuum table 104 that serves as the blank tooling surface, motion table 105, and structural beam 106. The material dispensing system 101 and tape placement head 103 may be affixed to the structural beam 106 and positioned over the motion table 105 and vacuum table 104. As shown, additional support systems may include an operator interface computer 107, an electronic control cabinet 108, vacuum system 109, and perimeter safety guarding 110.

In the current embodiment, material dispensing system 101 may provide an alternative dispensing configuration to the material dispensing system 1 shown in FIGS. 2 through 5. It will be understood however, that material dispensing system 101 is only intended to be exemplary and in other embodiments any other type of material dispensing system could be used. In particular, any system configured to store and/or deliver tape to tape placement head 103 could be used. A material dispensing system could be configured to dispense tape from rollers or to dispense pre-cut tape sections.

Figure 30:
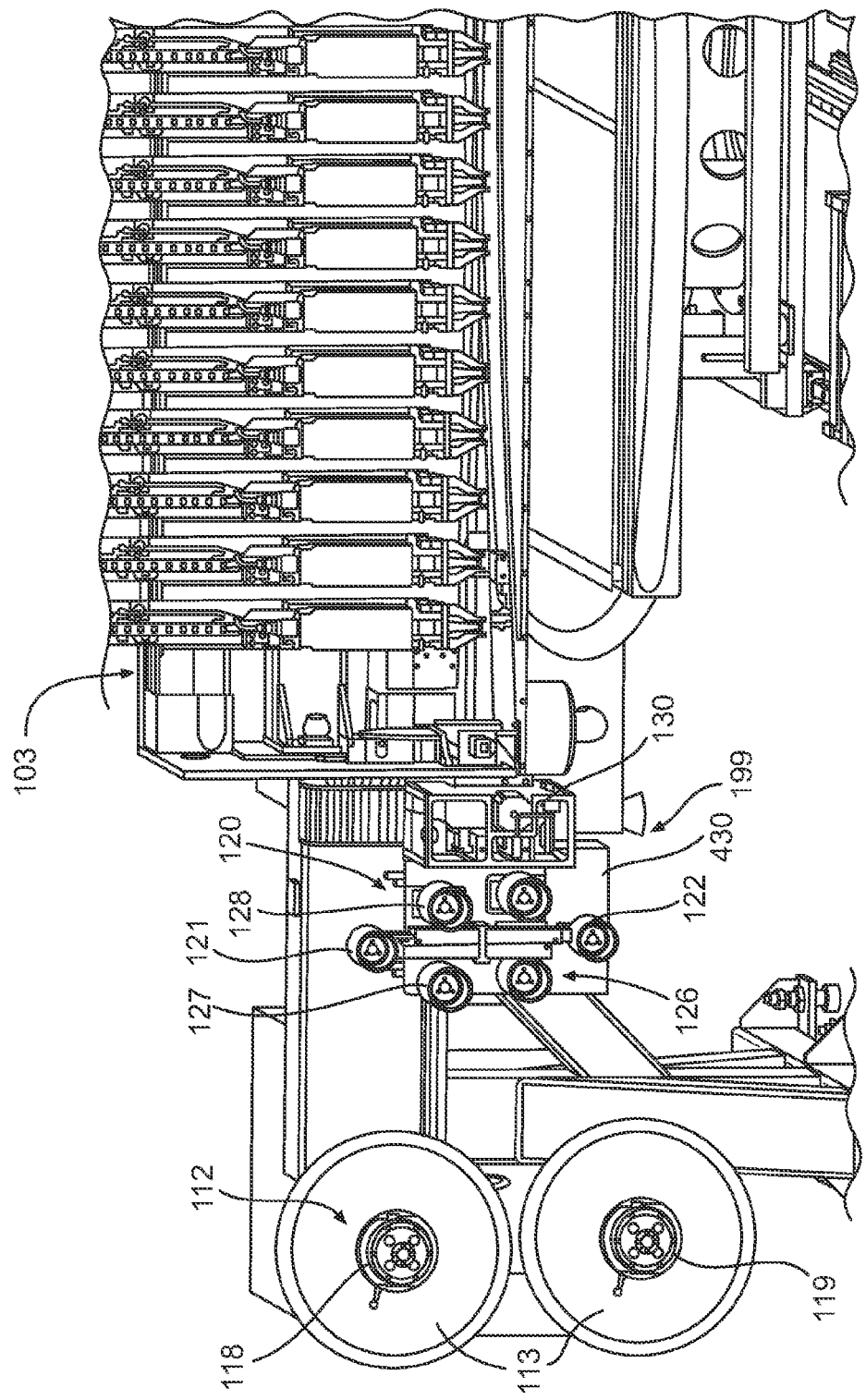
FIG. 30 is a schematic diagram illustrating an embodiment of a tape dispensing system.
Figure 31:
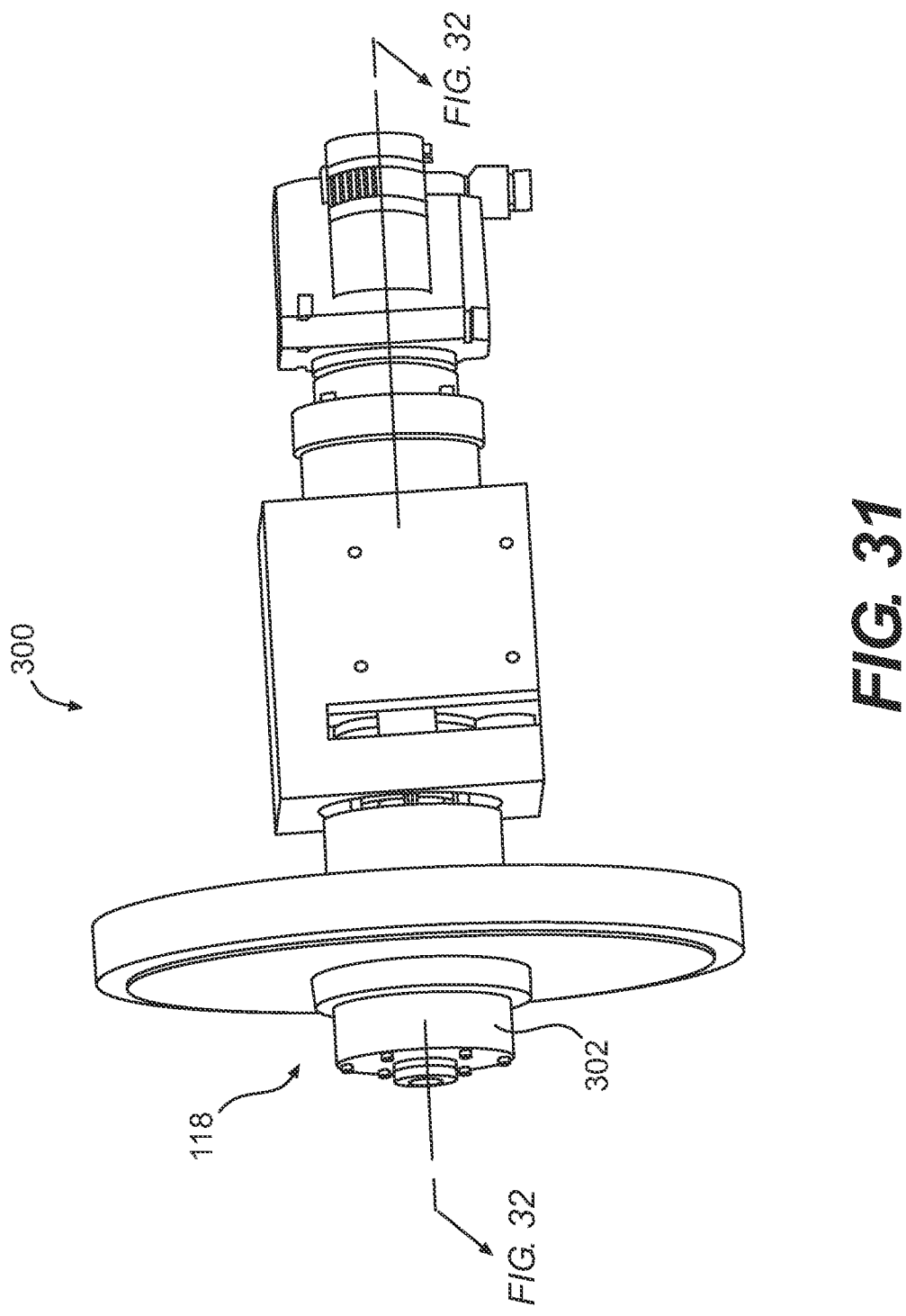
FIG. 31 is a schematic diagram illustrating an isometric view of an embodiment of a material drive system.

As shown, for example, in FIGS. 29 and 30, the material dispensing system 101 may include spindles 112. In this system, a roll of tape may be loaded onto spindles 112, including first spindle 118 and second spindle 119, and secured in place. In some cases, spool guards 113 could be used to keep the edges of the tape aligned. In other cases, spindles 112 could be used without any spool guards. The end of the tape may then be fed through automatic tape loading system 199, which may include roller assembly 120 as well as tape feed system 130 as discussed in further detail below. As described below, tape feed system 130 may include at least two separate tape feed assemblies, as well as corresponding motors.

FIGS. 31 through 34 illustrate various views of one possible embodiment of material drive system 300. Material drive system 300 may include spindle 118 as well as provisions for fixing the spool of tape to spindle 118. In some cases, the spool of tape may be placed onto chuck member 302 of material drive system 300. Chuck member 302 may be configured to hold the tape spool in place and have the capability to react to the high inertial acceleration and deceleration loads of the roll that may occur as the tape is unspooled.

Figure 32:
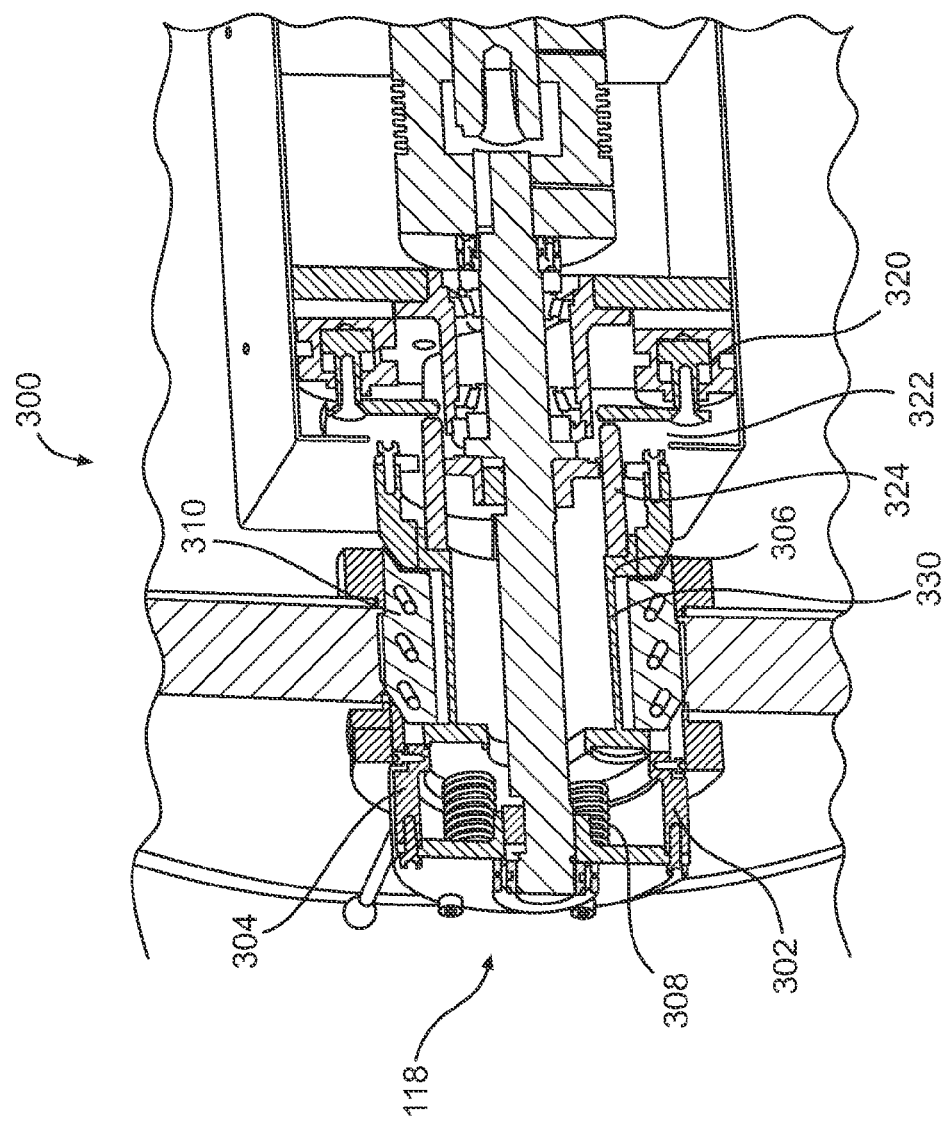
FIG. 32 is a schematic diagram illustrating a cut away view of the material drive system of FIG. 31.
Figures 33, 34:
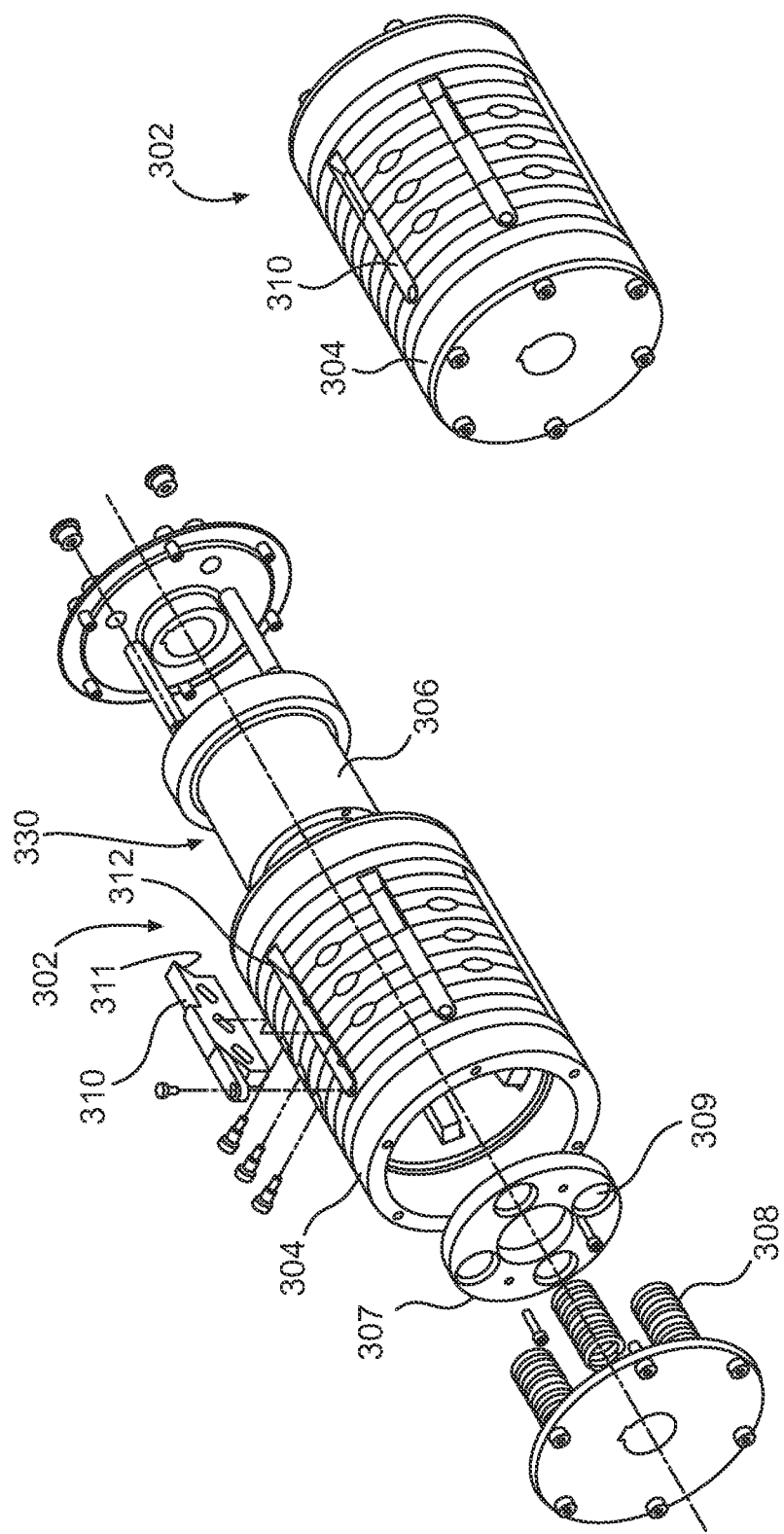
FIG. 33 is a schematic diagram illustrating an isometric exploded view of an embodiment of a chuck member for a material drive system.
FIG. 34 is a schematic diagram illustrating an isometric view of the chuck member of FIG. 33.

Referring to FIGS. 32 through 34, chuck member 302 may include spooling base 304 and sleeve member 306. In some cases, sleeve member 306 may further include plate 307 that contacts compression springs 308. Plate 307 is shown as exploded out from sleeve member 306 in FIG. 33 in order to show the alignment of various recessed portions 309 of plate 307 with compression springs 308. In some cases, compression springs 308 may bias sleeve member 306 in a default position. Wedge members 310 of chuck member 302 extend outwardly from slots 312, thereby applying an outward contact force for gripping the tape roll.

In some cases, in order to retract wedge members 310 and remove and/or replace the tape roll, sleeve member 306 may be moved axially within spooling base 304 so as to compress springs 308. This allows wedge members 310 to retract within slots 312, thereby relieving their grip on the tape spool. For example, in one embodiment, pneumatic actuators 320 extend pressure plate 322 to press against posts 324. The posts 324 may then in turn translate sleeve member 306 in an axially outward direction along spooling base 304 providing clearance for wedge members 310 to retract into recess 330 of sleeve member 306. Recess 330 may be a region of reduced diameter for sleeve member 306. With wedge members 310 retracted, a tape roll can be removed and/or installed. In situations where no tape roll is present, the wedge members 310 may contact a hard stop in order to limit their travel.

In order to extend the wedge members 310 and thereby lock the material roll in place on spindle 118, the pneumatic actuators may release the pressure and allow compression springs 308 to slide sleeve member 306 in an axially inward direction, until sleeve member 306 is returned to a default position. With sleeve member 306 in this default position, wedge members 310 may be displaced out of recess 330 and extend outwardly from spooling base 304. In some cases, wedge members 310 include angled portions 311 that facilitate guiding of both axial and radial translations of wedge members 310 relative to the axial motion of sleeve member 306.

In some embodiments, to enhance the contacting forces between chuck member 302 and a tape spool, wedge members 310 can include features that enhance traction or grip with the tape roll. For example, in some cases, wedge members 310 can include teeth and/or knurls in the surfaces that grip the tape spool. In still other cases, wedge members 310 can include pads or similar materials having relatively high coefficients of friction for the purpose of enhancing their capability to grip a tape spool.

This configuration for chuck member 302 may facilitate quick material loading and helps to keep the tape rolls aligned in a concentric manner along the axis of rotation. Additionally, this configuration can respond to the high torque loads that may need to be applied in order to quickly accelerate the spool of tape. Furthermore, this design may allow for compatibility with standard cardboard cores that may be commonly used and purchased from tape suppliers. By using compression springs to generate forces inside the spool, rather than air pressure, the current design may improve robustness and have more consistent performance over time.

Referring now to FIGS. 30, 35, 36, 48, and 49, an automatic tape loading system 199 may include roller assembly 120, which may comprise idler rollers 126 as well as first dancer roller 121 and second dancer roller 122. For example, tape from first spindle 118 may be fed around first idler roller 127, around first dancer roller 121 and around second idler roller 128 and then into tape feed system 130.

In order for tape feed system 130 to feed tape quickly, the tape may be configured to have very low back tension. Without active tension control, the inertia of the spool of material could resist the rapid acceleration and deceleration of the tape as the gripping assembly pulls the tape into position. To control back tension, the current embodiment may utilize first dancer roller 121 and second dancer roller 122, which may move in order to minimize back tension along the tape. Using dancer rollers to manage back tension may make loading the system with tape more convenient when compared to previous designs. Moreover, the dancer rollers may be used by the system to maintain constant tension while allowing for a difference in acceleration rates between the tape feeding through the pinch roller system and the material being unwound from the material spool by the chuck member.

Figure 35:
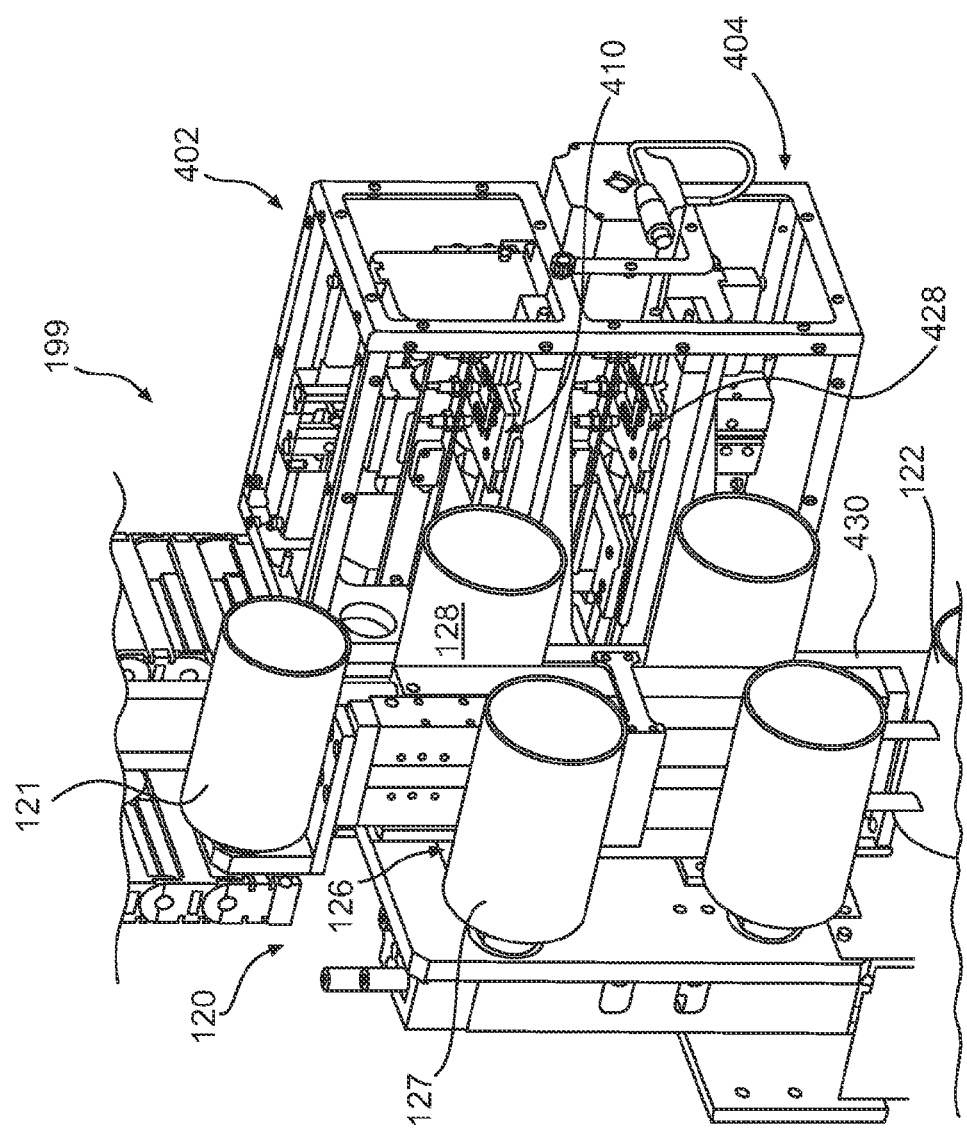
FIG. 35 is a schematic diagram of an isometric view of an embodiment of an automatic tape loading system.
Figure 36:
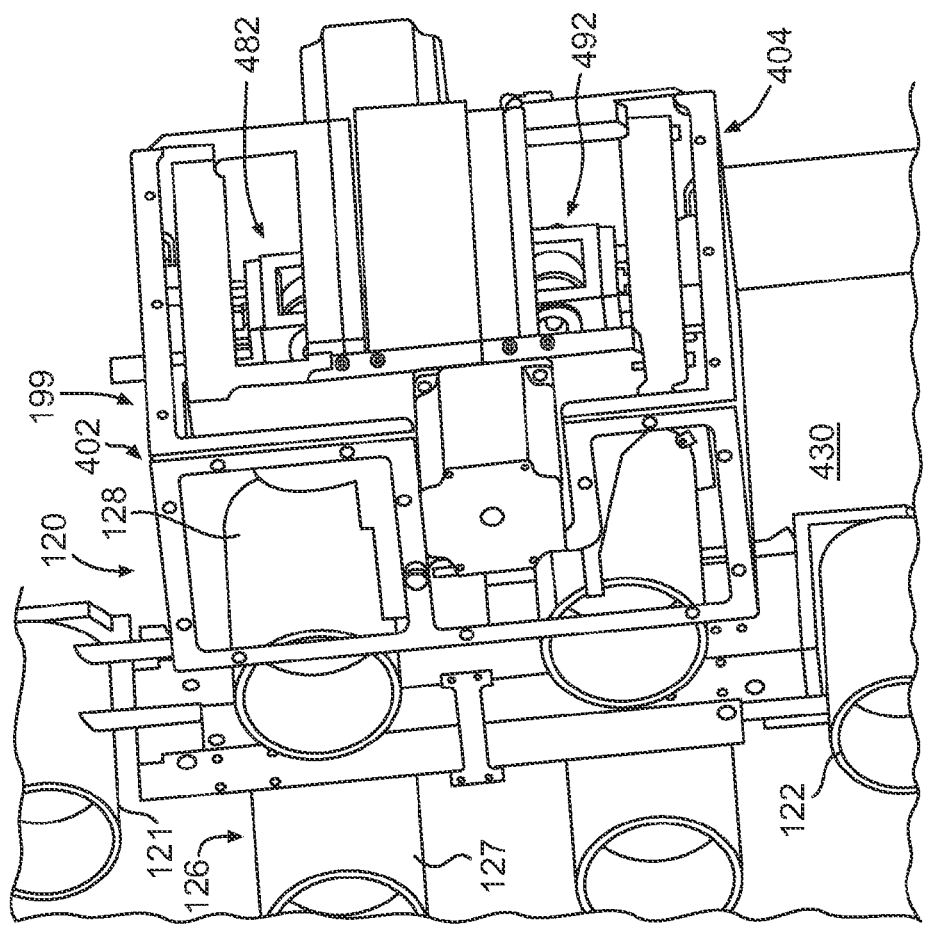
FIG. 36 is another isometric view of the automatic tape loading system of FIG. 35.
Figure 48:
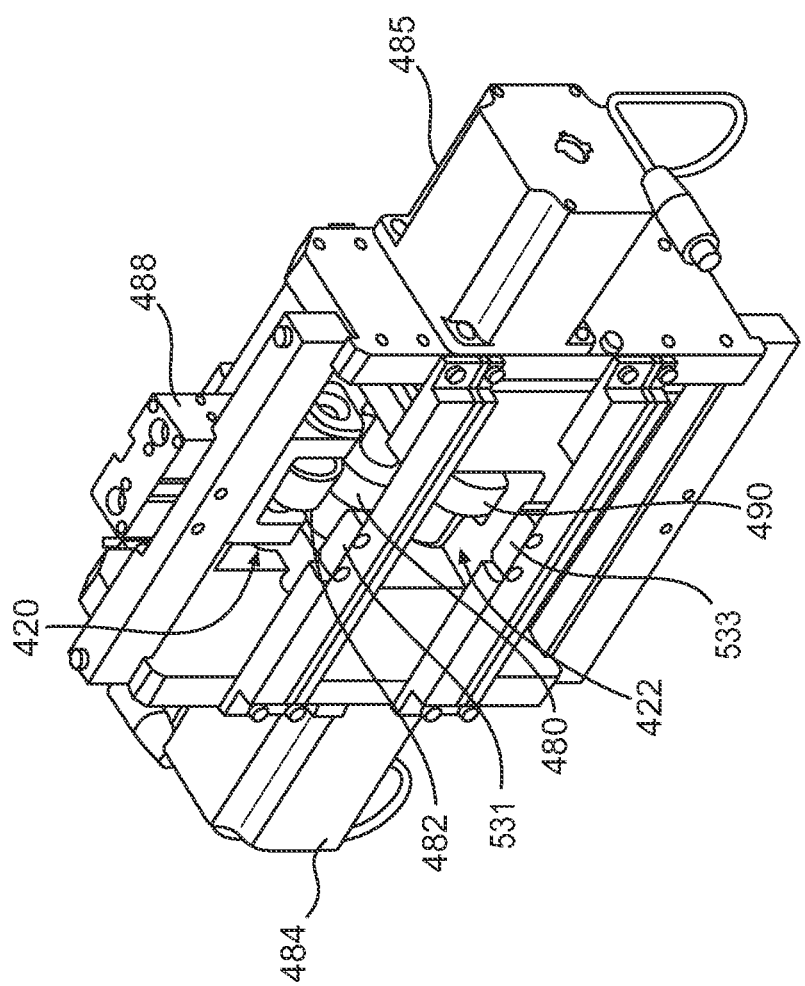
FIG. 48 illustrates a schematic view of an embodiment of driver roller assemblies and passive roller assemblies for tape feed units.
Figure 49:
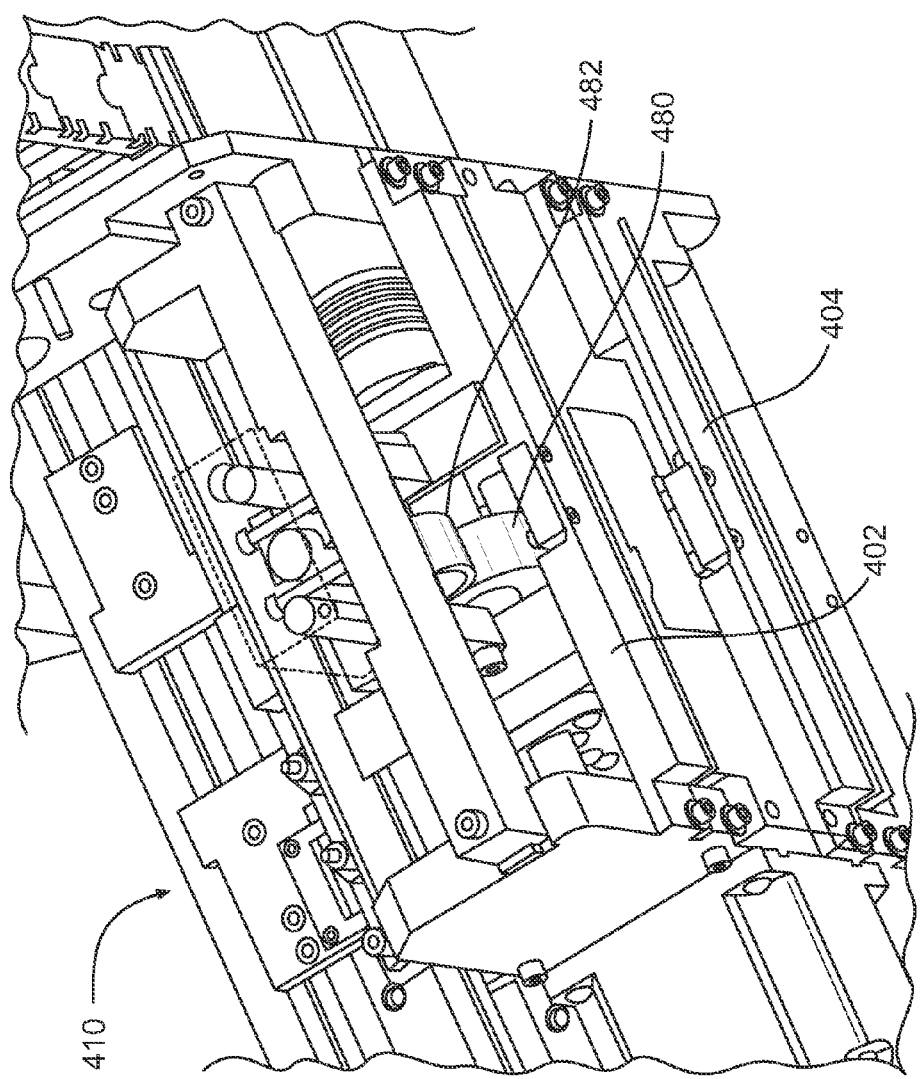
FIG. 49 illustrates a schematic view of some components of a tape feed unit.

Tape feed system 130 may further include first tape feed unit 402 and second tape feed unit 404. First tape feed unit 402 may include first pinch roller assembly 420 and second tape feed unit 404 may include second pinch roller assembly 422, which are most clearly illustrated in FIGS. 48 and 49. First pinch roller assembly 420 may include driver roller assembly 480 and passive roller assembly 482. Driver roller assembly 480 may be attached to motor 484, while passive roller assembly 482 may be associated with air cylinder assembly 488. In an unengaged position, passive roller assembly 482 is retracted and does not press against driver roller assembly 480. In an engaged position, air cylinder assembly 488 actuates so that passive roller assembly 482 is pressed against driver roller assembly 480. Second pinch roller assembly 422 may operate in a similar manner using driver roller assembly 490 and passive roller assembly 492. In some cases, for example, driver roller assembly 490 is powered using motor 485. Moreover, first pinch roller assembly 420 and second pinch roller assembly 422 may be associated with first tape feed guide 410 and second tape feed guide 428, respectively. In some cases, as seen in FIGS. 35, 36, and 49, first tape feed guide 410 and second tape feed guide 428 may be aligned with first pinch roller assembly 420 and second pinch roller assembly 422. With this arrangement, the tape may be fed through either first tape feed unit 402 or second tape feed unit 404 in order to be aligned with tape cutting system 150 (see FIGS. 38 and 39).

In some embodiments, components of automatic tape loading system 199 may be mounted to plate 430. In some cases, plate 430 may be translated vertically in order to align either first tape feed unit 402 or second tape feed unit 404 with cutting system 150, according to which spool is currently in use. This arrangement allows a single cutting system to be used with tape from either spindle.

Figure 37:
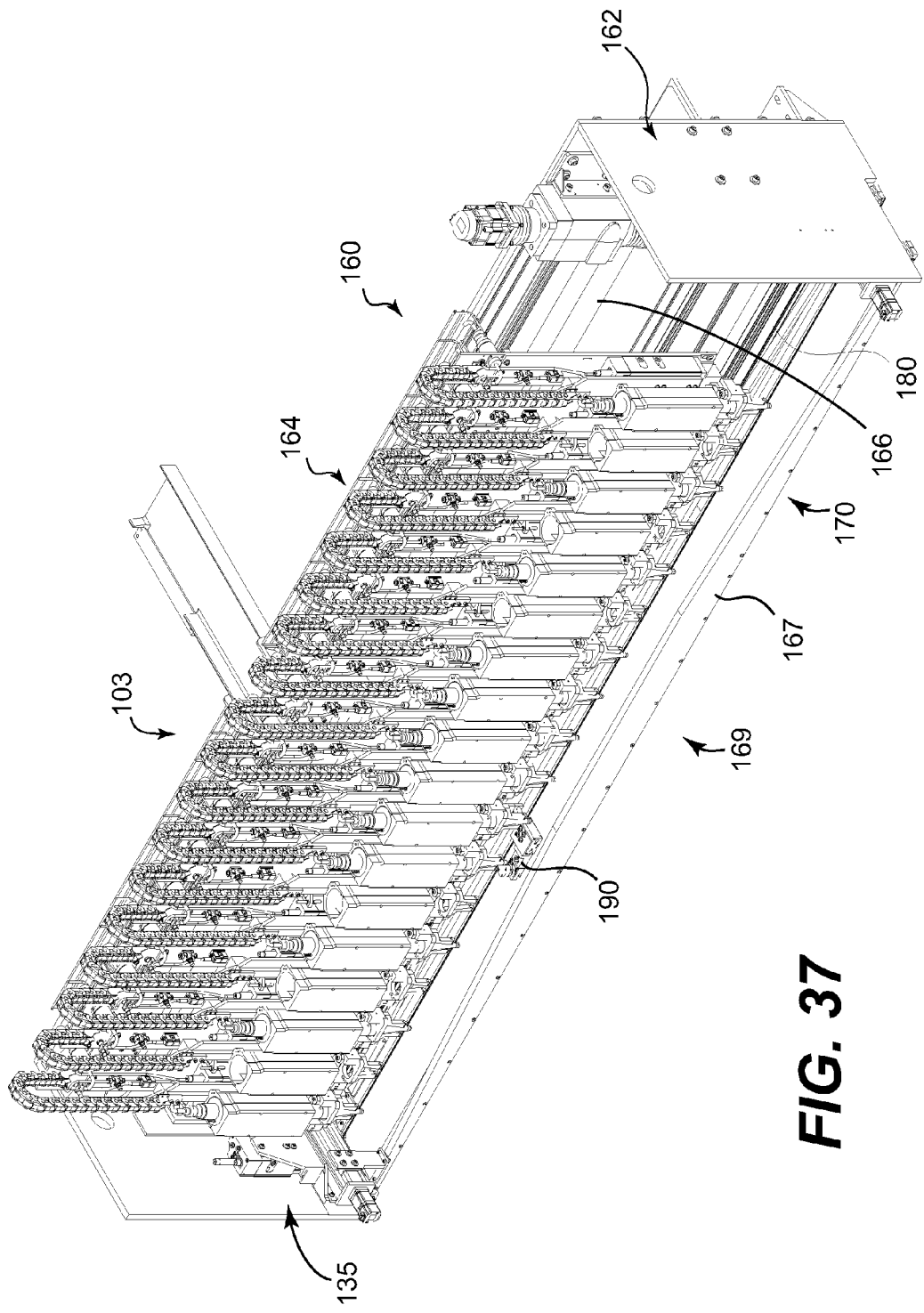
FIG. 37 is a schematic diagram illustrating an embodiment of a welding system.
Figure 38:
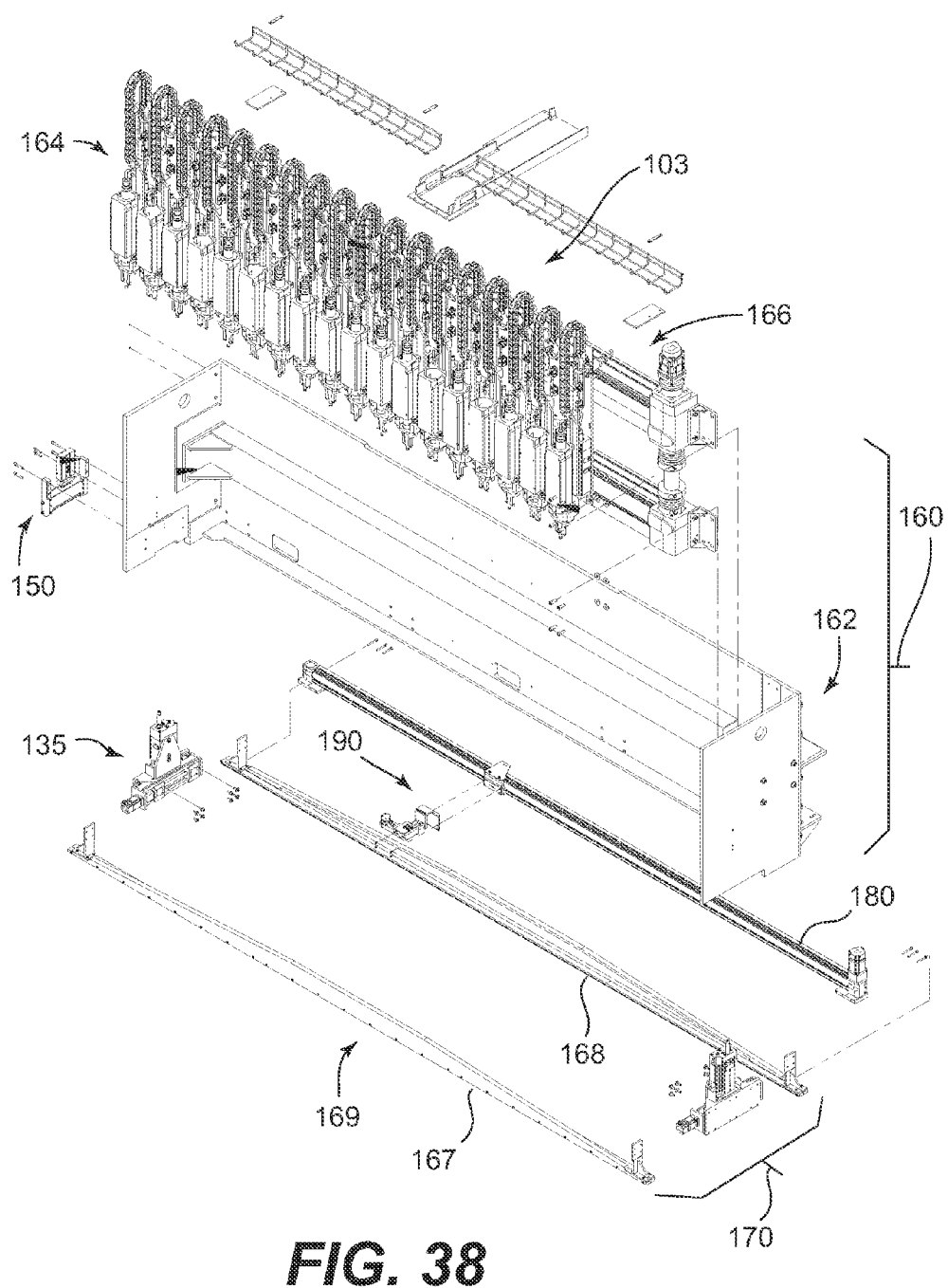
FIG. 38 is a schematic diagram illustrating an exploded isometric view of the welding system of FIG. 37.
Figure 39:
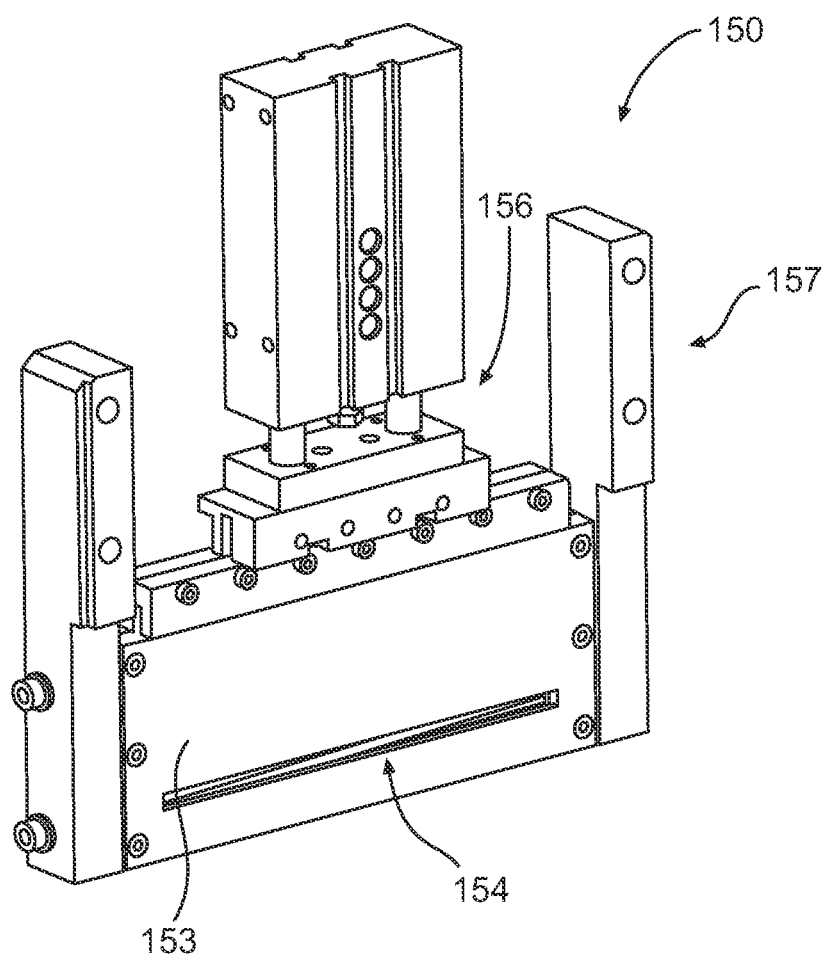
FIG. 39 is a schematic diagram illustrating an isometric view of an embodiment of a cutting system.

Referring now to FIGS. 37 through 39, tape placement head 103 may include several subsystems: cutting system 150, welding assembly 160, and tape section guide 170. Cutting system 150 could include any provisions for cutting tape. Cutting system 150 may comprise a blade and anvil between which the automatic tape loading system 199 feeds tape and whose movement is controlled such that when the blade shears past the anvil, the tape is cut into a tape section. As shown in FIG. 39, one embodiment of cutting system 150 may include cutting anvil 153, a cutting slot 154, a blade mounting 156, and anvil brackets 157. A blade may be configured to move through anvil 153 to cut tape inserted through slot 154. In some cases, a carbide cutting edge is associated with slot 154 in order to facilitate cutting. Alternative cutter embodiments could also be used, including for example, a rotary knife cutter, an ultrasonic knife, or a laser that could traverse a path across the width of the tape to cut it. With a traversing cutter, or similar device, the cut line could also be nonlinear, for example, curved, jagged, or serrated.

Referring back to FIGS. 37 and 38, welding assembly 160 can include welding frame assembly 162, welding units 164, and welder tracks 166. Welding units 164 may be movably attached to welder tracks 166, allowing welding units 164 to slide along welder tracks 166. Welding units 164 and welder tracks 166 are supported within welding frame assembly 162.

In different embodiments, the motion of one or more welding units could vary. In some embodiments, the welding units may be moved as a single unit along the welder track. As one example, the current embodiment includes eighteen welding units that all translate together along welder tracks 166. In other embodiments, the welding units may be configured in groupings of welding units, where each group is capable of moving independently of other groups. For example, in another embodiment, eighteen welding units may be configured in three groups of six welding units such that each group of welding units can be translated independently of the remaining two groups. In still other embodiments, each welding unit could be configured to move independently of all other welding units. Any methods known in the art could be used to move welding units. For example, in an embodiment where each welding unit moves independently from all other welding units, the welding units could each include a motor that drives the unit along a track or screw drive.

Figure 40:
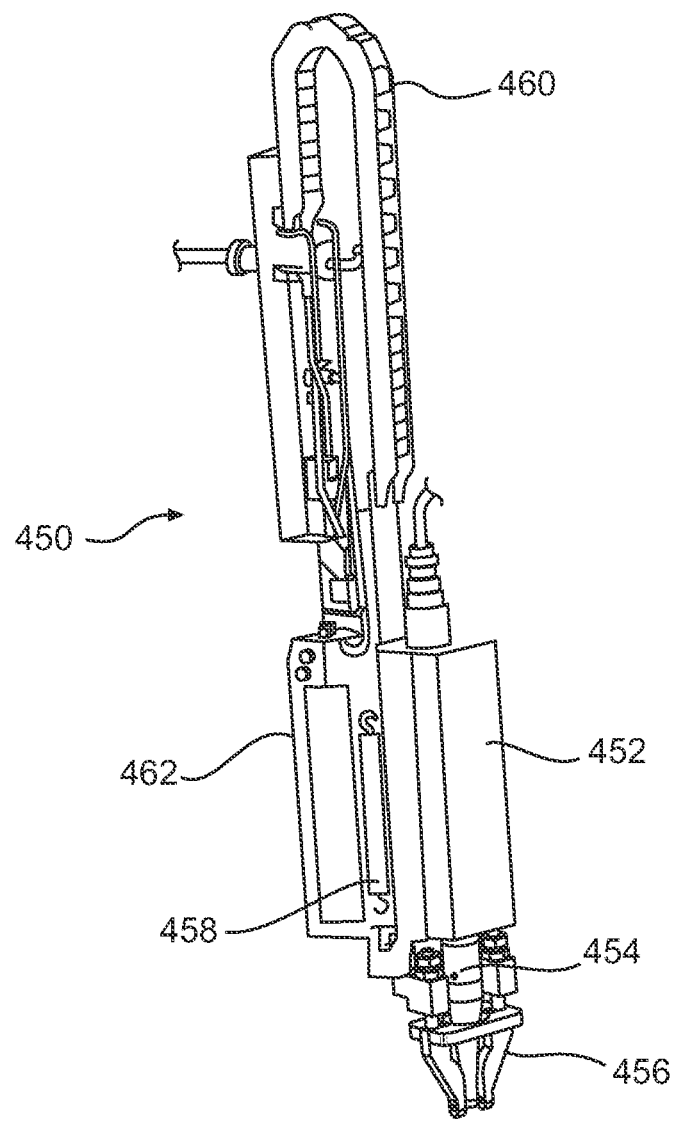
FIG. 40 is a schematic diagram illustrating an isometric view of an embodiment of a welding unit.
Figure 41:
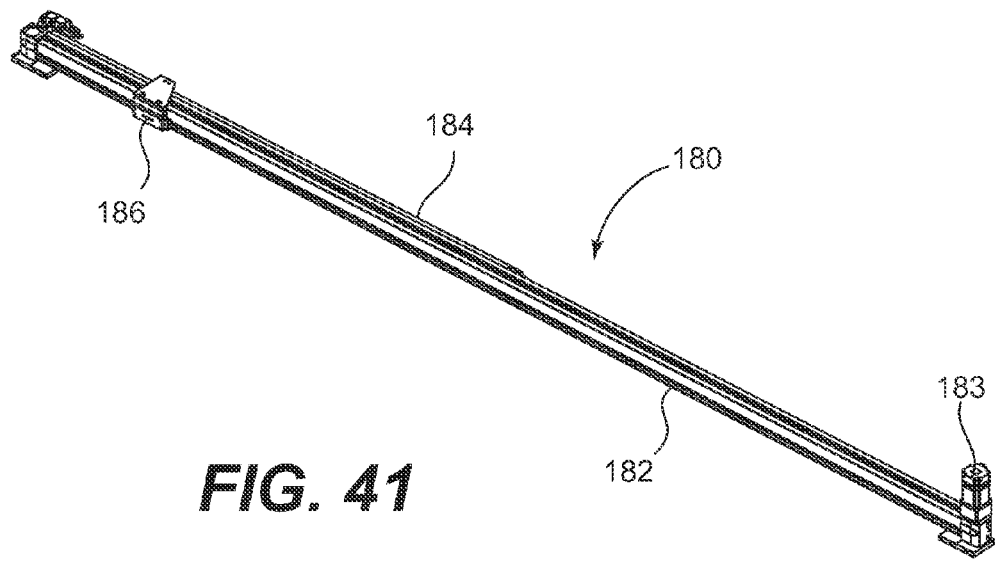
FIG. 41 is a schematic diagram illustrating a view of an embodiment of a gripping assembly.
Figure 42:
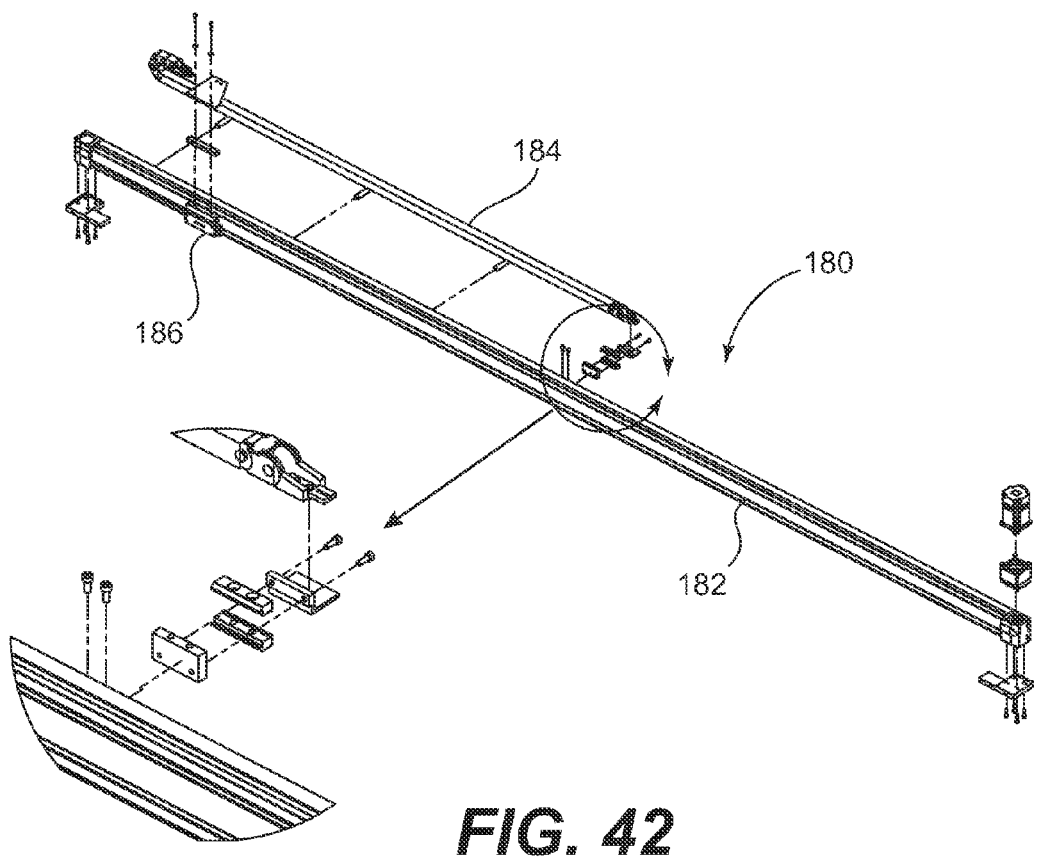
FIG. 42 is a schematic diagram illustrating an exploded isometric view of the gripping assembly of FIG. 41.

Referring to FIG. 40, an exemplary welding unit 450 is shown in isolation for purposes of illustration. Welding unit 450 may include welding device 452, which further includes welding tip 454. Welding unit 450 may also include pressure foot 456 that is arranged around welding tip 454. In some cases, welding unit 450 may also include backing plate 462 that is used to secure welding device 452 to a welding assembly. In order to facilitate vertical motion, welding unit 450 can include extension spring 458 that provides a restoring force to return welding device 452 to a default raised position following the extension of welding device 452. In some cases, welding unit 450 may be moved in a vertical direction using a pneumatic cylinder with an internal guide. Extension spring 458 may also help retain welding unit 450 in a raised position if air pressure in the system is lost. Additionally, in some cases, welding unit 450 can include tracks 460 that help manage wires and other utility connections as welding unit 450 translates in the vertical direction.

In some cases, to implement a weld using welding unit 450, welding device 452 may translate downwardly with respect to backing plate 462. As welding device 452 moves downwardly, pressure foot 456 may contact any underlying tape material in order to apply a contact pressure to the tape material and hold it against the vacuum table or previously laid tape sections. As welding tip 454 contacts the tape material, welding device 452 may energize and apply the weld at the contacting location. Following this, welding device 452, along with pressure foot 456, may be retracted with the assistance of spring 458. This arrangement for the welding units may integrate vertical movement of the pressure foot and welding device. Moreover, the arrangement of the pressure foot 456 in the current design may provide the ability to hold the tape in place on either side of the welding tip 454 during the ultrasonic weld.

The welding assembly of the embodiments described in this detailed description may provide improved operation over some alternative designs. For example, the customized welding units provide tighter tolerances, faster operation, and lower cost when compared to some traditional units.

As illustrated in FIG. 38, tape section guide 170 may include first guide support 167 and second guide support 168, collectively referred to as tape guide supports 169. Tape guide supports 169 may help direct tape sections along the length of welding assembly 160. In some embodiments, tape guide supports 169 may include grooves that receive the edges of a tape section and allow the tape section to be suspended over the vacuum table/tooling surface. An example of a suitable grooved design has already been disclosed above with reference to FIG. 13. However, alternative embodiments could incorporate other methods for holding the tape material between adjacent guide supports. In another embodiment, for example, the grooves could be removed and replaced with a plurality of small pinch rollers that line the edges of the tape support guides. These pinch rollers could grasp the side edges of the tape material in order to transport the tape material through tape section guide 170. In such an embodiment, an additional gripping system that grasps the leading edge of the tape material could be optional, as the tape could be moved within tape section guide 170 using only driven pinch rollers in some cases.

Tape section guide 170 may further include tape gripping assembly 180. Gripping assembly 180, shown in further detail in FIGS. 41 and 42, may include track member 182, cable tray 184, and track arm 186. Track member 182 may comprise a driven belt supported by a guide rail or track. The driven belt may be powered by motor 183. Power chain 184 moves with track arm 186 and delivers power and air to the gripper unit 190.

Figure 43:
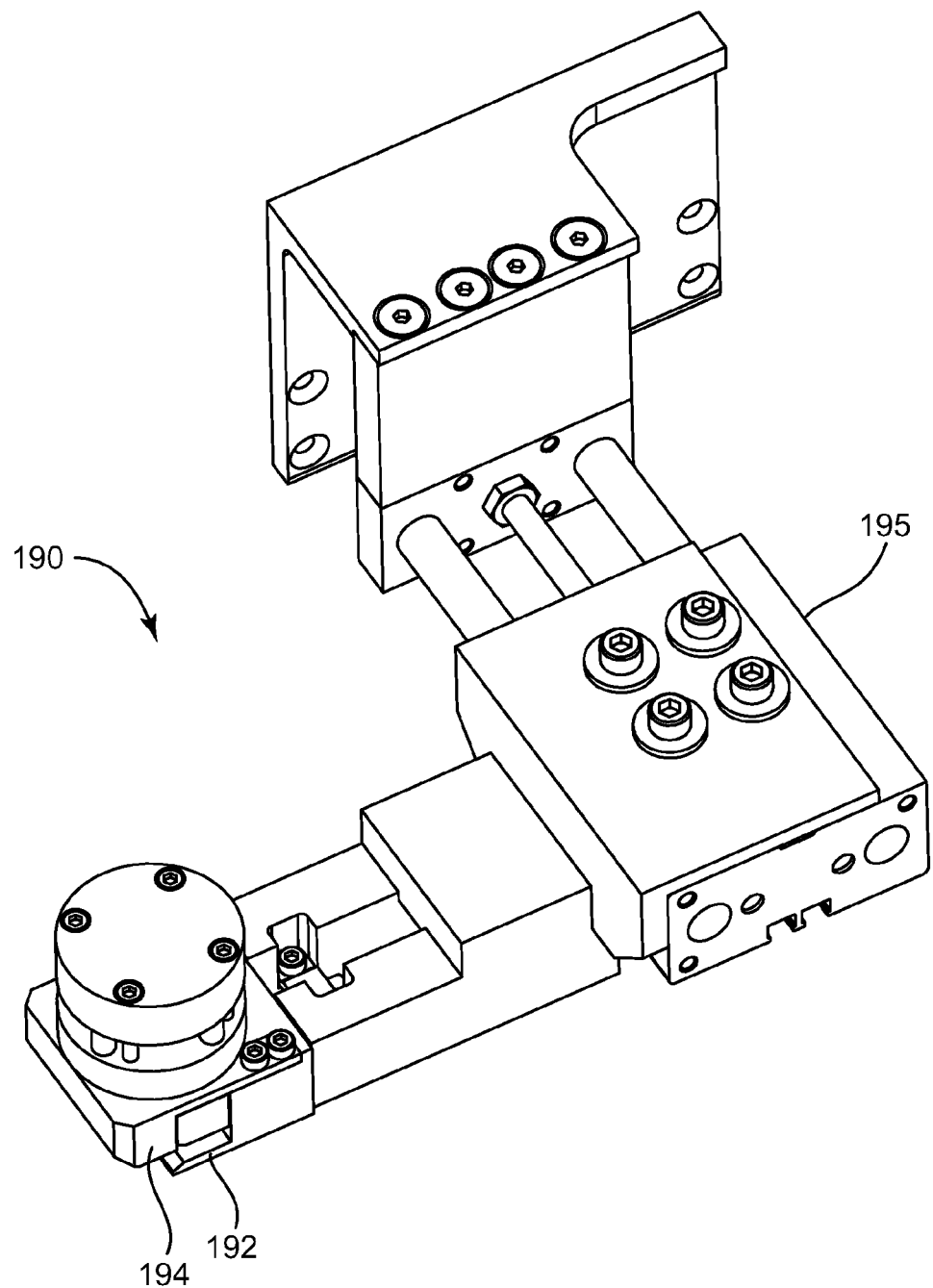
FIG. 43 is a schematic diagram illustrating an isometric view of an embodiment of a gripping member.
Figure 44:
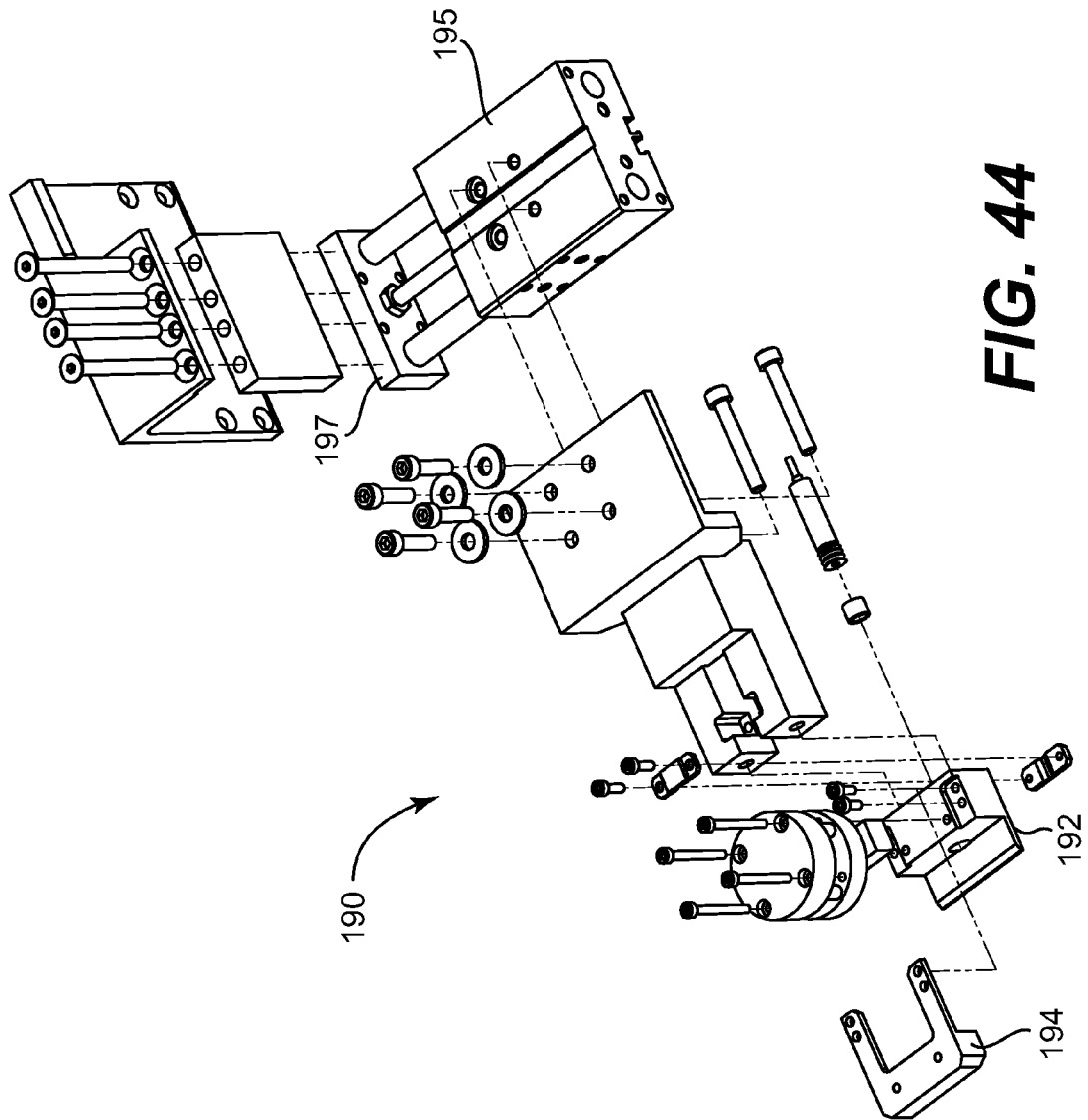
FIG. 44 is a schematic diagram illustrating an exploded isometric view of the gripping member of FIG. 43.

Gripping assembly 180 may further include gripping member 190. As shown in FIGS. 43 and 44, gripping member 190 is configured to grip an edge or other portion of the tape so that the tape can be pulled to various positions along tape section guide 170 and welding assembly 160. In some cases, gripping member 190 can include gripping foot 192 and gripping nose 194 for grasping a portion of tape. Moreover, gripping member 190 may be attached to track member 182 at track arm 186 so that gripping member 190 can slide along track member 182.

In some cases, the relative position of gripping member 190 with respect to tape material or a tape section could vary. For example, as the width of the tape is adjusted, gripping member 190 could change between different states corresponding to different tape widths. In particular, in one embodiment, gripping member 190 can move between a narrow state in which gripping foot 192 and gripping nose 194 are approximately aligned along a center of relatively narrow tape sections and a wide state in which gripping foot 192 and gripping nose 194 are approximately aligned along a center of relatively wide tape sections. This change in state could occur, for example, by extending pneumatic cylinder 195 outwardly from track arm 186, which in turn moves gripping foot 192 and gripping nose 194.

Tape sections may be created as tape is transported from automatic tape loading system 199 to tape placement head 103. As the end of the tape moves through cutting system 150 (e.g., pushed by pinch rollers), gripping member 190 may grip the tape. A mechanism that feeds the tape (e.g., pinch rollers) may release the tape after the gripping member 190 grips the tape. The gripping member 190 may then move the tape between, and in a direction generally parallel to, first guide support 167 and second guide support 168 (see FIG. 37) until the distance between the tape end and the cutting system 150 equals the desired strip length. Once this point has been reached, the gripping member 190 stops and holds the tape in place while the cutting system 150 cuts the tape. This creates a tape section of a known length suspended within tape section guide 170. Following this, the gripping member 190 can move the newly cut tape section to another position within guide supports 169. Alternatively, if the cutting system 150 is sufficiently rapid, the gripping member 190 may not have to stop for the cutting of the tape.

In some embodiments, first guide support 167 and second guide support 168 may include provisions for guiding, supporting, and/or suspending the tape between welding assembly 160 and vacuum table 104. In some cases, tape section guide 170 may include provisions for raising and lowering first guide support 167 and second guide support 168, such as guide motion devices 135 (see FIG. 38), which connect tape section guide 170 with welding frame assembly 162. Additionally, in some cases, the spacing, or width, between first guide support 167 and second guide support 168 can be automatically adjusted to accommodate varying tape widths. This automatic width adjustment could be achieved using guide motion devices 135 or any other devices or systems. In some cases, support guides 169 may be mounted to horizontal tracks of guide motion devices 135 that allow for horizontal or width-wise adjustment. In addition, in some cases, support guides 169 may be mounted to guide motion devices 135 in a manner that allows tape section guide 170 to be raised and lowered with respect to the vacuum table.

Automatic width adjustment of the guide system allows for the system to automatically switch between tape of different materials and widths without operator intervention, thus improving the efficiency and through-put time of the system. The configuration may also allow for automatic alignment of all components. In particular, this configuration may allow for improved consistency of placement by eliminating the inherent variations resulting from different operators setting up and adjusting the machinery. The configuration may also improve the ability of the system to run material with less stringent slitting tolerances. In other embodiments in which in-line width measurements may be added to the system, the machine could automatically adjust the guide supports to the actual tape width and automatically adjust the tape placement location to minimize gaps and overlaps between tape sections.

Figure 45:
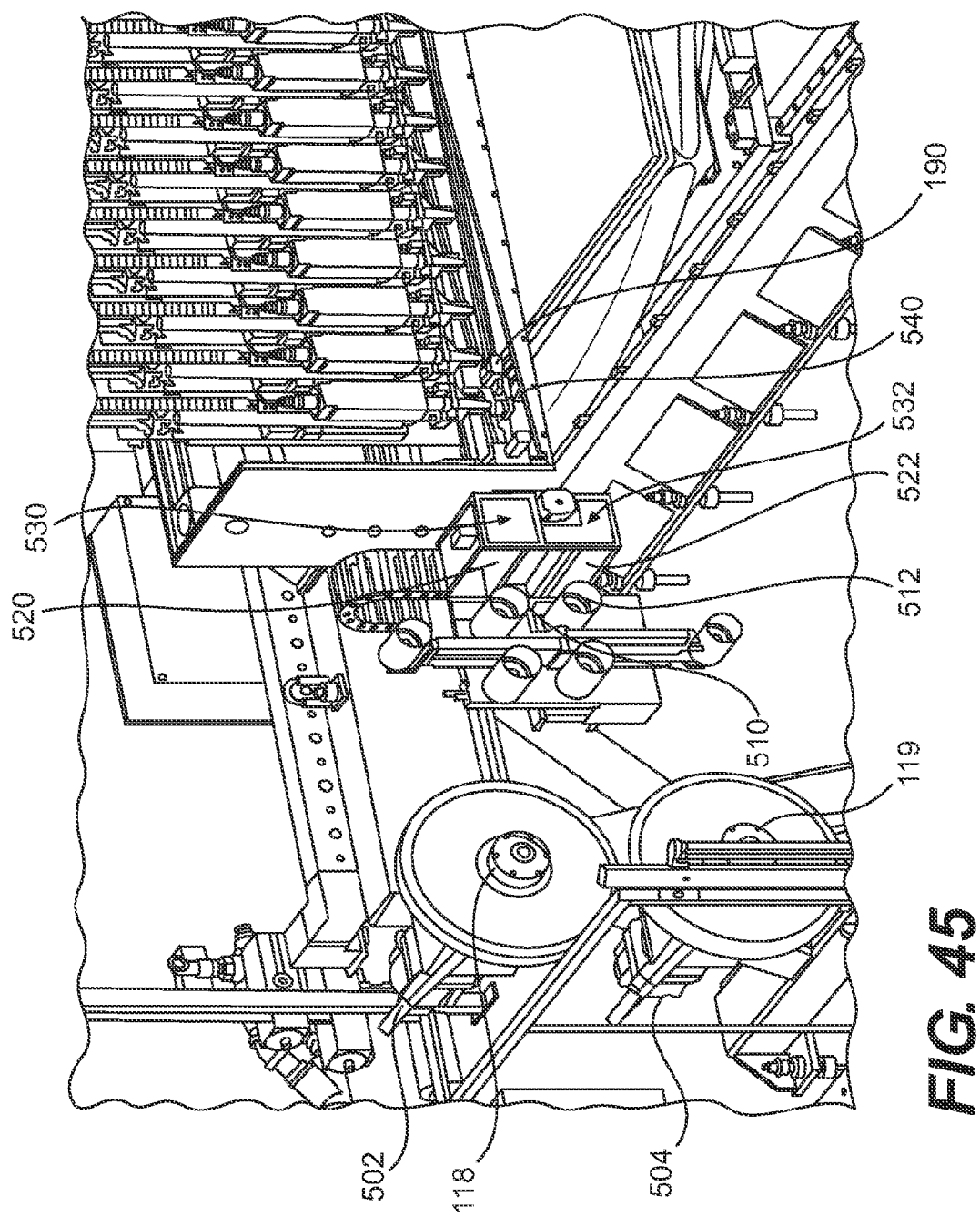
FIG. 45 is a schematic diagram illustrating the locations of some sensors according to an embodiment.

Referring now to FIG. 45, some embodiments may include provisions to monitor the operation of the system, including tape dispensing and tape loading aspects, as well as for monitoring the operation of a gripping system. For purposes of clarity, FIG. 45 is used to indicate the approximate locations of some sensors that could be used for these purposes. However, the particular locations of sensors may vary from one embodiment to another. First diameter sensor 502 and second diameter sensor 504 may be configured to monitor the operation of spindle 118 and spindle 119, respectively. In particular, these diameter sensors may be used to measure the tape roll diameter. In some cases, the tape roll diameter may be used for input to closed-loop control of driver roller assembly 480 and driver roller assembly 490. Additionally, in some cases, tape tension sensor 510 and tape tension sensor 512, which monitor tension in the idler rollers of roller assembly 120, may be used to adjust the unwind speed of the creel unit to achieve the desired back tension. In some cases, dancer roller 121 and dancer roller 122 could be operated to adjust tension levels in response to information gathered from the tension sensors.

The system can also include pre-feed roller sensor 520 and pre-feed roller sensor 522, associated with first tape feed unit 402 and second tape feed unit 404, respectively, which may detect when tape is loaded into the automatic tape loading system 199. In some cases, feed roller sensors may also detect when the end of the tape roll has been reached. In some embodiments, post feed roller sensor 531 and post feed roller sensor 533 (see FIG. 48) measure the presence of the tape after the corresponding feed rollers. The approximate locations of post feed roller sensor 531 and post feed roller sensor 533 are indicated generally as region 530 and region 532 in FIG. 45, while a more detailed view of exemplary locations for these sensors is shown in FIG. 48. Information from these sensors may be used to determine when the tape is retracted from the cutter unit before changing the active spool and to locate the front end of the tape. Knowing the location of the end of the tape ensures that the correct amount is fed forward to the gripper during the initial tape feed in order to avoid as much slow forward feed correction as possible.

Some embodiments can also include sensor 540 that is associated with gripping member 190. Information from sensor 540 can be used to determine if gripping member 190 is holding tape. This may be useful to detect possible tape dispensing problems, such as bunching or jamming, which may occur once the tape has entered tape section guide 170.

Referring to FIGS. 30, 35, 36, and 45, the automatic tape loading system 199 may provide a system for positioning the leading edge of a new roll of tape in the machine and for automatically switching between tape supply rolls. An exemplary situation in which tape material fed into the tape positioning head is changed from the first creel (or first spindle) to the second creel (or second spindle) is now described. The existing tape material from first spindle 118 is retracted past post pinch roller sensor 530 to ensure that there is no tape in the tape guides or cutter unit. Roller assembly 120 and tape feed system 130 may move vertically to align second tape feed unit 404 with cutting system 150 and the entrance to tape placement head 103. Simultaneous with the vertical movement, the width of tape section guide 170 may also be adjusted, if necessary, to accommodate the tape material of second spindle 119. The pinch rollers of second tape feed unit 404 may then move the tape from the second spindle 119 past post pinch roller sensor 532, through second tape feed unit 404 and through cutting system 150. At this point, the new tape material from spindle 119 may be positioned for the gripping member 190 to secure the tape and begin laying out the tape in the guide rails. It will be understood that the process described here may be used to change back and forth between materials from the first material spool and the material spool.

This configuration for automatic tape loading system 199 allows rolls to be switched without operator intervention, thus reducing the downtime of the system. This system also provides a means of automatically making blanks comprising multiple materials (such as a blank with both carbon fiber tape sections and glass reinforced tape sections) as well as a means of automatically making blanks with multiple width tapes (e.g., a blank comprising both 6 inch tape and 2 inch tape sections). Furthermore, the system provides a means for making blanks from materials of differing widths and materials.

FIGS. 46a-46g illustrate a schematic view of an exemplary system and method for handling, placing, and tacking a tape section to vacuum table 104 and/or other tape sections. For purposes of clarity, some of the components of the current system are shown schematically. For example, welding assembly 160 is shown here to include five welding units 205, while the embodiments shown in FIGS. 38 and 39 include eighteen welding units 164. Likewise, cutting system 150 is shown schematically here as cutting blade 204. Moreover, the welding units shown in FIGS. 46a-g and 47a and 47b are shown schematically. For a more detailed view of a welding unit, refer to FIG. 40.

Initially, as illustrated in FIG. 46a, gripping member 190 may be disposed in a first position 220 adjacent to cutting blade 204 and guide motion device 206. Gripping member 190 grasps the end of the tape which has been fed into tape placement head 103. In some cases, the pinch rollers of automatic tape loading system 199 may push the tape through cutting system 150 to gripping member 190. At this point, gripping member 190 may grasp the tape and the pinch rollers may release the tape before gripping member 190 begins to move. In some cases, the end of the tape may be gripped between the gripping foot 192 and the gripping nose 194 of gripping member 190 (see FIGS. 43 and 44).

Next, as illustrated in FIG. 46b, vacuum table 104 may be rotated and simultaneously translated along axis 210. In addition, welding units 205 may be moved on welder tracks 166 along axis 212. Axis 212 may be an axis approximately perpendicular to axis 210. Thus, the combined translational motion of welding units 205 along axis 212, the translational motion of vacuum table 104 along axis 210, the translational motion of the tape section within guide assembly 170, and the rotational motion of vacuum table 104 about a central table axis allows for any desired positioning and orientation of a tape section on vacuum table 104.

Figure 46C:
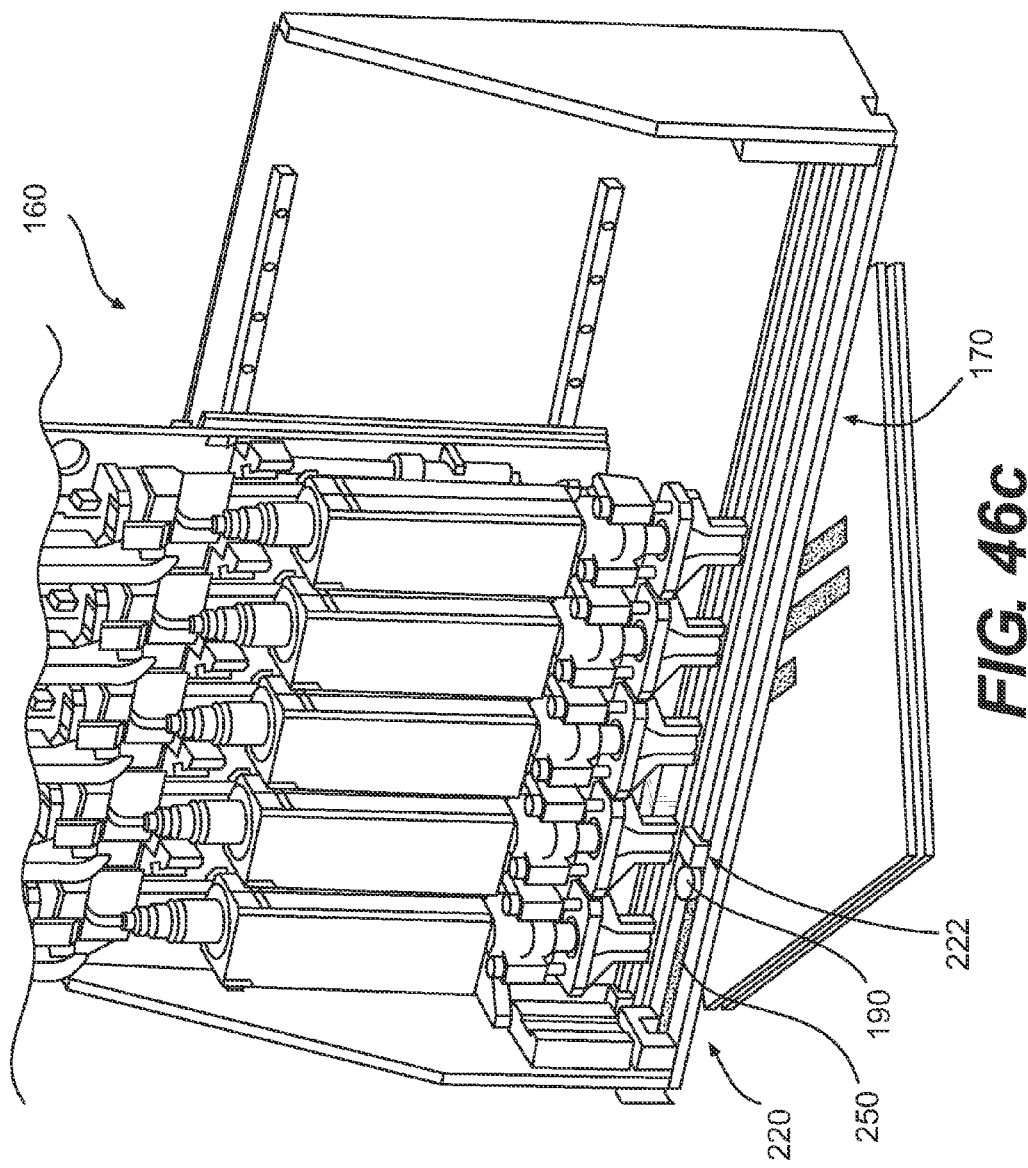
Figure 46D:
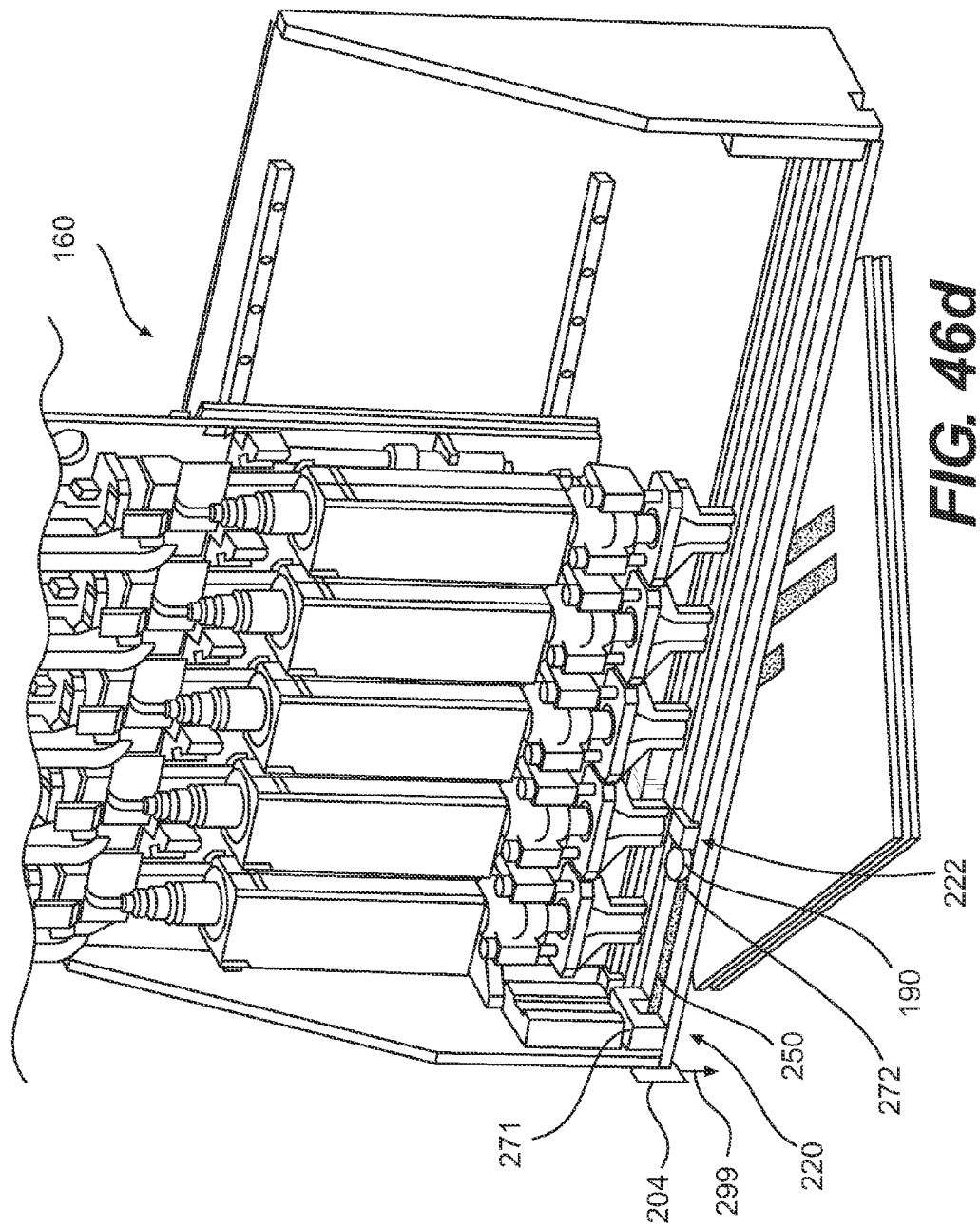

As shown in FIG. 46c, gripping member 190 may move from the first position 220 to the second position 222. The first position 220 and the second position 222 may demarcate positions relative to tape section guide 170 and/or welding assembly 160. The second position 222 is selected so that the distance between gripping member 190 and cutting blade 204 corresponds to a desired length for a tape section 250. Once gripping member 190 has moved to the second position 222, cutting blade 204 may cut the tape (as indicated by arrow 299) to form the desired tape section 250, as seen in FIG. 46*d*. At this point, the tape section 250 comprises a length of tape with a first end portion 271 disposed at the first position 220 and a second end portion 272 disposed at the second position 222 along tape section guide 170. In some cases, the pinch rollers may immediately clamp onto the tape material fed from automatic tape loading system 199 just prior to, simultaneously with, or very shortly after, when the tape section is cut, in order to prevent the tape material from retracting from the engaged driver roller assembly.

Figure 46E:
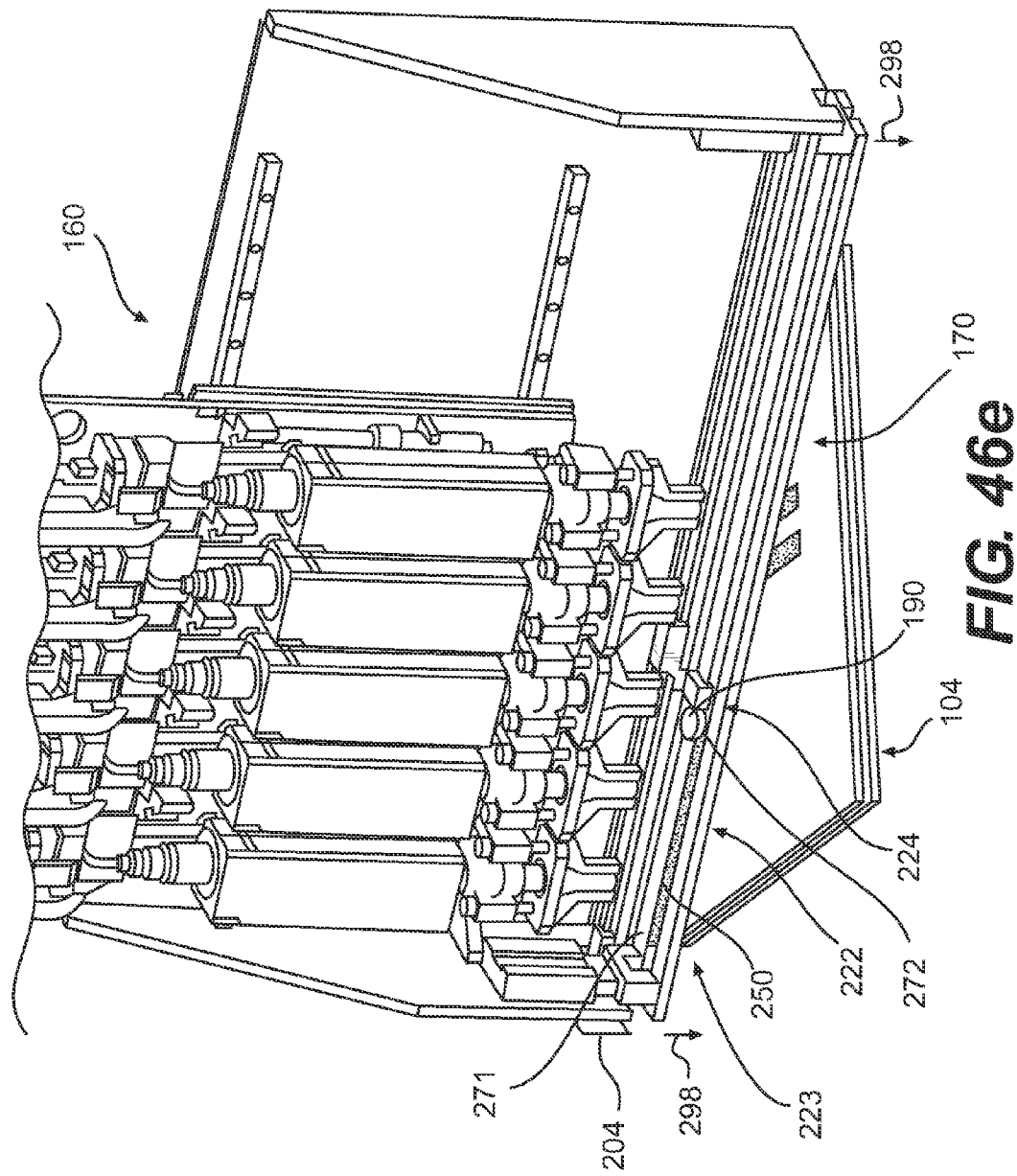

As shown in FIG. 46*e*, following the cutting of the tape into tape section 250, gripping member 190 may move from the second position 222 to a third position 224 in order to align the tape section 250 over the desired location on vacuum table 104. Thus, in this step, the tape section is pulled through tape section guide 170 by gripping member 190 so that first end portion 271 is at a fourth position 223 while second end portion 272 (which is held by gripping member 190) is at third position 224. Moreover, as gripping member 190 is moved to the third position 224, tape section guide 170 may be simultaneously lowered to vacuum table 104 to prepare the tape section for welding, as indicated by arrows 298.

Figure 47A:
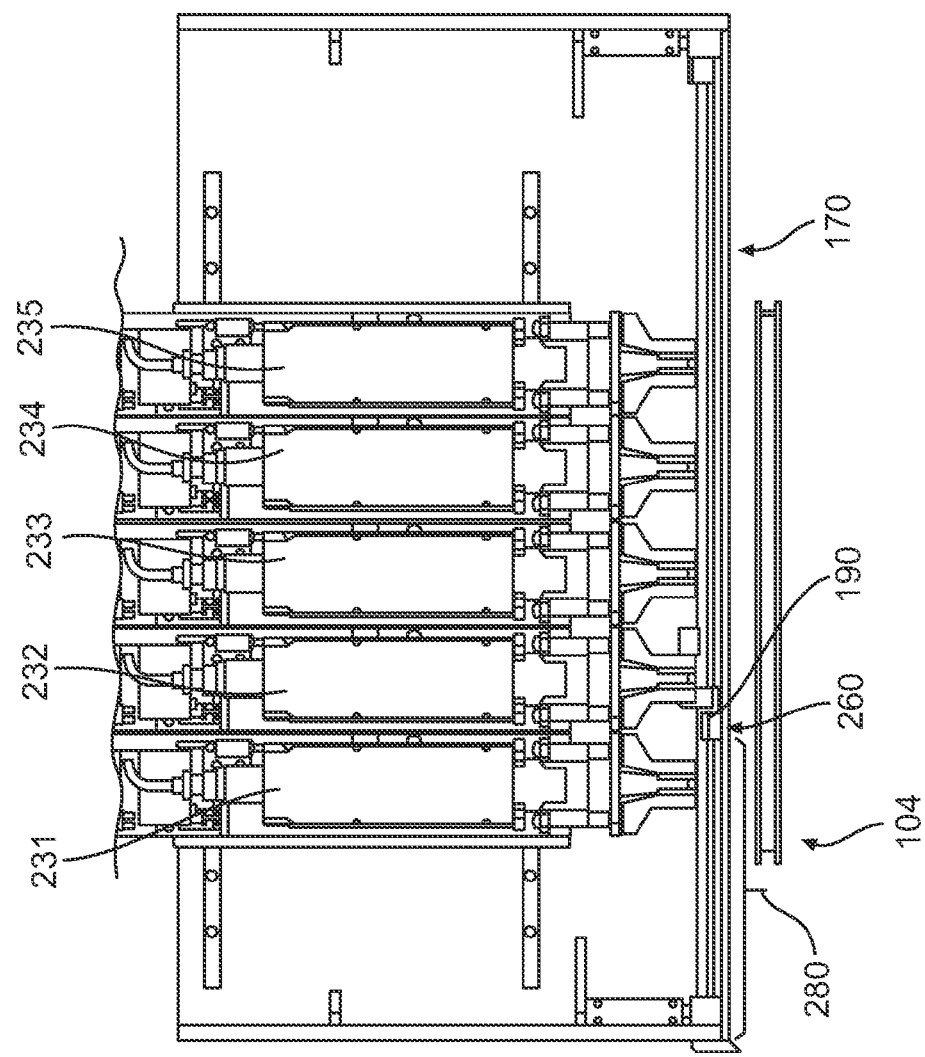
FIGS. 47a and 47b illustrate another sequence of steps in a process for applying tape sections to a tooling surface according to one embodiment.

Next, as seen in FIG. 46*f*, the tape section 250 may be tacked or welded onto vacuum table 104 or to any underlying tape sections. In particular, first welding unit 231 and second welding unit 232 are lowered so that first welding tip 241 and second welding tip 242 contact tape section 250 and tack the tape section 250 to vacuum table 104. Meanwhile, the remaining group of adjacent welding units (namely, third welding unit 233, fourth welding unit 234 and fifth welding unit 235, which are indicated in FIG. 47*a*) remains stationary and does not engage tape section 250. In some cases, the tape section 250 may directly contact the vacuum table 104 and in other cases it may contact previously placed tape sections. If the tape section underneath a welder tip is directly on the tooling surface, then that welder may not energize, since that portion of the tape section may be secured to the table with, for example, vacuum. In some cases, the gripping member 190 can release the tape during, or just prior to, the period when the welding units 205 are engaging the tape section. This may avoid any interference by the gripping member 190 in the welding of tape sections.

Figure 46G:
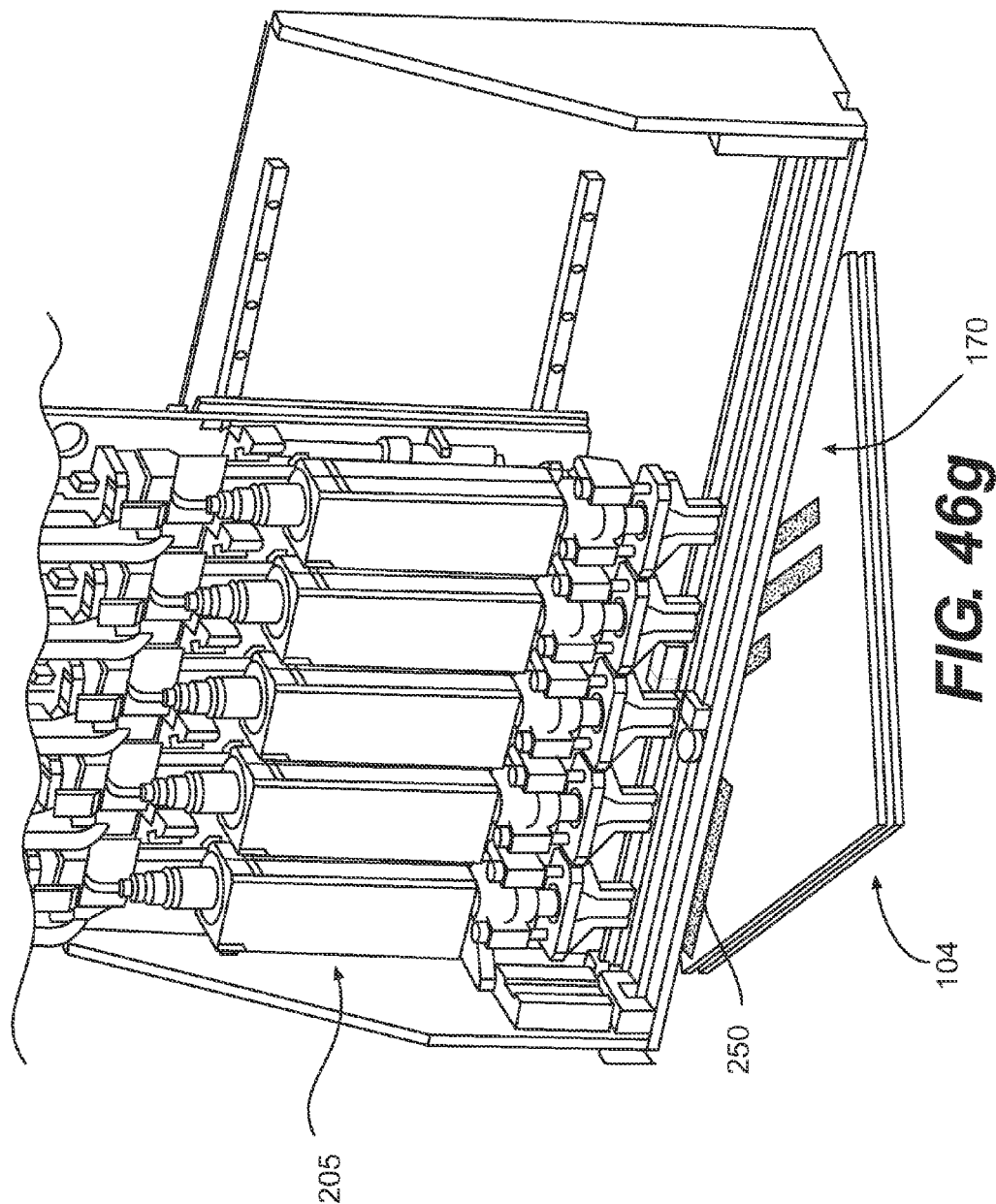

FIG. 46*g* shows an exemplary embodiment of the tape section tacked to vacuum table 104 after guide assembly 170 and welding units 205 have been raised away from vacuum table 104. Depending on the means by which the tape section 250 is suspended within guide assembly 170, different methods of releasing the tape section from guide assembly 170 can be used. For example, as disclosed with reference to the embodiments shown in FIG. 20, once the tape section has been welded to an underlying tape section, the guide rails 25 may be raised up with the pressure feet or welding tip still pressing on the tape. This causes the tape edges to be pulled out of the grooves of the guide rails 25, releasing the tape section from the guide rails 25. Once the tape section has released from the guide rails 25, the pressure feet of the welding units may retract. In embodiments where the width of a guide system can be automatically adjusted, the tape section could be released by extending the width between the guide supports and then raising the guide supports from the tooling surface.

Figure 47B:
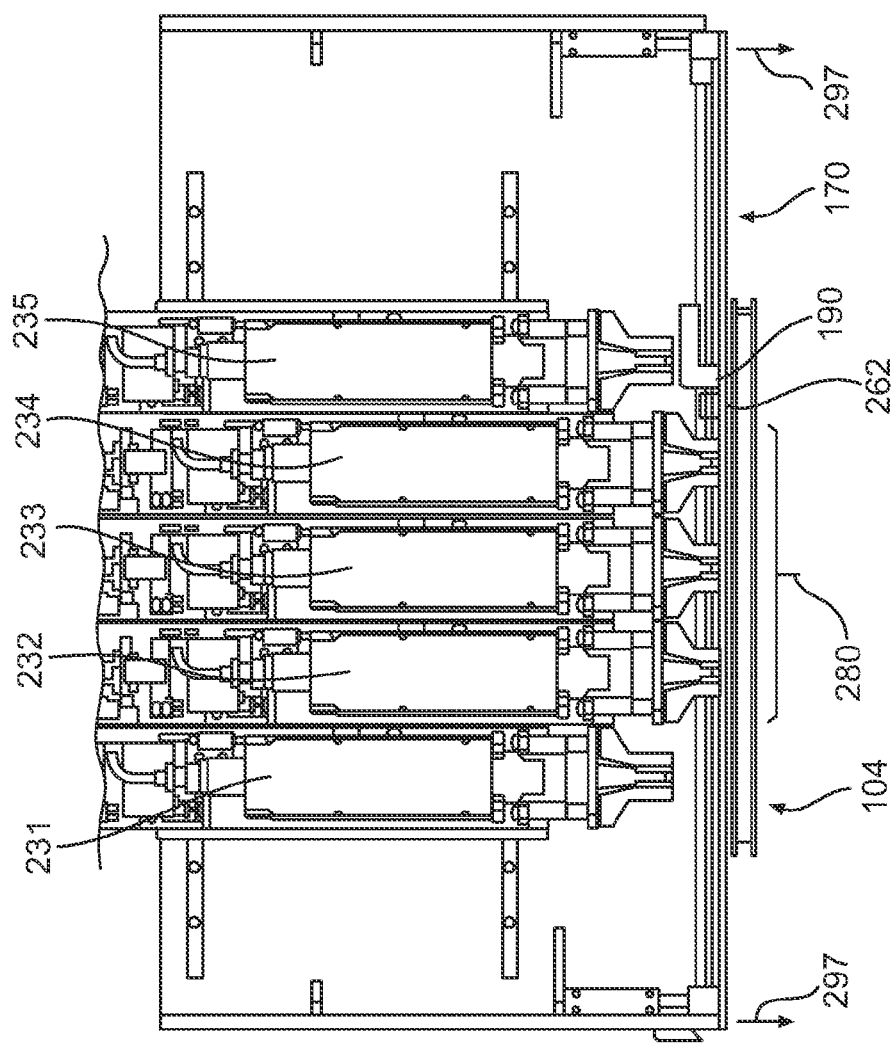

FIG. 47*a* illustrates another configuration where gripping member 190 is moved to position 260 to create a predetermined length for a tape section 280. The tape section may then be repositioned as gripping member 190 moves to position 262, as seen in FIG. 47*b*. Also, at the point of the process shown in FIG. 47*b*, tape section guide 170 has lowered to vacuum table 104 (represented by arrows 297) and some of welding units 205 have been lowered. In particular, second welding unit 232, third welding unit 233, and fourth welding unit 234 have been lowered to tack or weld the tape section while first welding unit 231 and fifth welding unit 235 remain in a raised position. This selective operation of the welding units, which is coordinated with the length and position of the tape section, may provide more rapid and efficient manufacture.

In other embodiments, the motions of welding units may not be restricted to vertical motions and motions along the length of a welding assembly. In another embodiment, for example, welding units could be configured to move in a direction perpendicular to the longitudinal direction associated with a tape section guide. Thus, in some cases, one or more welding units may move in the perpendicular direction, which could take them in and out of vertical alignment with the tape section guide. Such an embodiment could help in operating a single set of welding units for two or more different tape section guides arranged in parallel beneath a welding assembly.

As seen with reference to FIGS. 46*a*-*g* as well as FIGS. 47*a* and 47*b*, the system described herein provides for a wide variety of different relative motions between components and sub-systems. So, for example, the motions of welder units, the welding assembly 160, the tape section guide 170, the gripping member 190, vacuum table 104, cutting system 150 as well as other components and systems described in the embodiments, may be coordinated to achieve a desired manufacturing process and resulting manufactured parts. As one example, gripping member 190 may move along the length of welding assembly 160 substantially simultaneously with the motion of vacuum table 104, so that tape sections in the tape section guide 170 are aligned in the proper locations with respect to pre-existing tape sections on the vacuum table 104. As another example, the motion of the welding units may be coordinated with the motion of gripping member 190 to ensure that the welding units do not interfere with the path of gripping member 190 it pulls tape sections through tape section guide 170. Still further, in other embodiments, any sequence of relative motions between welding assembly 160, vacuum table 104, and a tape section within tape section guide 170 could be possible.

The vacuum table 104 may serve as the tooling surface upon which the part is built up. The vacuum table 104 may be attached to a platform 105 that precisely positions vacuum table 104 under tape placement head 103 via translational motion along an axis approximately perpendicular to the length of tape placement head 103 as well as using rotational motion. To facilitate precise alignment, welding units 164 can also be translated along an axis perpendicular to the translational axis of platform 105. Instructions from an off-line program may determine the length of tape and its position and orientation on the table.

The ability to move the gripping member and welding units may provide for increased placement accuracy since the tape and welders can be aligned after the tape section has been formed. This arrangement can also facilitate increased course lengths, with lengths of up to 2.82 meters or even greater being possible. In addition, this configuration helps increase through-put speed by relying on the gripping member to control the feeding of the tape and the speed of tape section movement, rather than the tape speed being reliant on intrinsic properties of the tape such as stiffness to be pushed through the rails. Having the tooling surface translate in only one linear direction as opposed to two perpendicular directions may also provide a cost reduction. Additionally, the overall machine footprint can be reduced over similar designs that incorporate two linear motion axes and rotation for the tooling surface.

The current configuration may also allow for multiple heads laying up tape simultaneously on the same ply. In an alternative embodiment, tape could be fed from either side of the tape placement head 103 to improve speed, for example, by providing material dispensers (spools and loading systems) on both first side 147 of tape placement head 103 (which is the configuration used in the illustrated embodiments) and second side 149 of tape placement head 103 (first side 147 and second side 149 of tape placement head 103 are shown in FIG. 27). In particular, a substantially similar configuration of spools and loading systems that are used to feed tape into first side 147 in the illustrated embodiments could be provided for feeding tape into second side 149 of tape placement head 103. In addition, tape placement head 103 could be configured with an additional cutting blade, gripping system as well as possibly other provisions for manipulating tape and tape sections fed into second side 149 of tape placement head 103. Moreover, the current configuration may also improve machine robustness by improving the ability of the system to handle a wider variety of tape without feed errors.

When the tape has been fed into the tape section guide 170 and cut from the roll into a section, the gripping member 190 has positioned the tape in the correct location along tape section guide 170, and the vacuum table 104 and welding units 164 have been positioned in the desired location, first guide support 167 and second guide support 168 may lower until the tape section is nearly touching a previously laid ply or the tooling surface. Then an array of one or more welding units 164 may lower from the welding assembly 160 and press the section of tape onto the tool.

When the welding/tacking step is complete, the welding units 164 may remain in contact with the tape, and the first guide support 167 and second guide support 168 may be raised to the initial load position. In some cases, the guides can be raised before the welding/tacking has been completed. Since the center of the tape remains secured to the tool and pinned down by the welder units, this causes the edges of the tape to be pulled out of tape section guide 170. Once the tape edges are free of the tape section guide 170, the welder units retract, leaving the tape section in place on the vacuum table tooling surface.

This procedure may be repeated for each section of material that will comprise the blank. After the final tape section has been placed, the table vacuum may be turned off, which allows the part to be removed easily from the table.

As previously discussed, the tape section guide 170 can be configured to automatically adjust the spacing between first guide support 167 and second guide support 168 in order to accommodate tape sections of varying widths. This allows preforms to be made with tape sections of at least two different widths, for example, by loading first spindle 118 and second spindle 119 with tape rolls of differing widths. Then, as tape sections from the different spindles are fed into tape placement head 103, tape section guide 170 can automatically adjust to accommodate the different tape section widths.

In an embodiment, either or both of the tooling surface and guide supports move to provide relative displacement with respect to each other. Such movement can be in any direction, such us horizontal, vertical, or combinations thereof, and can include movements such as translational, rotational, or pivotal movements.

Some embodiments can include provisions to enhance or otherwise fine tune aspects of welding tape sections together. Some embodiments can include provisions to prevent welds between multiple plies from being laid directly over each other, which may result in unwanted structural features for the completed composite material. In some cases, a program may be used to automatically adjust the locations of welds so that welds on different layers of the composite are staggered in the plane of the vacuum table and not positioned directly on one another in the vertical direction. Still other embodiments could include provisions for making continuous welds between two layers. For example, in one embodiment, a continuous rotary welder could be used that continuously contacts, and applies a weld, over various portions of a tape section. In one embodiment, a rotary welder comprises a wheel that is attached to a gripping member. Once the gripping member has positioned a tape section within the guide system and over the desired location on the vacuum table, the rotary welder could move over some or all of the length of the tape section to apply a substantially continuous weld.

Some embodiments can include provisions to reduce through-put time by reducing the time that the tape feed is stopped, or the time required to reposition a gripping member after a weld. For example, some embodiments could include provisions to cut tape material into tape sections while the tape material continues to be fed through the system. In some cases, for example, cutting could be performed without stopping the tape feed, which may result in increased through-put speeds for the system.

Some embodiments could include provisions that would allow a gripping member to move throughout the tape placement head even while one or more welding units are extended towards a vacuum table. For example, one embodiment could use a gripping member that is mounted to a track using a hinge-like mounting, so that the gripping member may swing up and out of the plane of the guide supports and tape section as welds are being applied. The gripping member could swing to a position that is disposed behind the welding units. This would allow the gripping member to move behind the welding units and towards the cutting system as welds are being applied.

In one embodiment, for example, a hinging connection (not shown) could be provided at portion 197 gripping member 190 (see FIG. 44). In some cases, portion 197 could be an inside edge of extender 195. In such an embodiment, extender 195, gripping foot 192 and gripping nose 184 may swing upwardly so that gripping member 190 is no longer in the path of the welding units. This would allow gripping member 190 to move to any position along track member 182 without interfering with any of the welding units 164 that may be lowered. It will be understood that the suggested location for a hinge described here is only intended to be exemplary. In other cases, a hinge or hinging connection could be disposed on any portion of gripping member 195.

With this arrangement, through-put times could be reduced as the gripping member could immediately grip and pull a new section of tape as soon as the welding units have been raised. This is in contrast to the current embodiment where the gripping member may not return to the default position until the welding units have been raised.

As another possible embodiment, the gripping member could be mounted to a track that moves along a region between the guide supports as well as a region outside of the guide supports. This would allow the gripping member to move the tape section to a predetermined location between the guide supports, release the tape section once the tape section has been engaged by at least one welding unit, and then continue to move along the track and loop around the guide supports to a position near the cutter before the welding has been completed. In one possible embodiment, the track would extend over a region located behind the welding units to allow the gripping member to move along the tape placement head without interfering with the welding units.

As one of ordinary skill in the art would appreciate, the guide system described herein, including guide supports, are only one of many means that could be used for suspending the tape above the tooling surface and positioning the tape once it has been fed and cut. Other methods that use vacuum to suspend the tape above the tooling surface, trays that release the tape by increasing the distance between the guide rails, retractable trays, or other mechanisms may be employed.

The systems and methods described above allow for the capability of placing materials of different materials in a single blank. For example, one spindle could be loaded with tape made of a first material, while a second spindle could be loaded with tape made of a second material. Both materials could be fed into the guide system for forming tape sections and welding the various tape sections together.

The foregoing disclosure of the embodiments has been presented for purposes of illustration and description. It is not intended to be exhaustive or to limit other embodiments to the precise forms disclosed. Many variations and modifications of the embodiments described herein will be apparent to one of ordinary skill in the art in light of the above disclosure. The scope of the embodiments is to be defined only by the claims appended hereto, and by their equivalents.

Further, in describing representative embodiments of the present embodiments, the specification may have presented the method and/or process of the present embodiments as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present embodiments should not be limited to the performance of their steps in the order written, and one skilled in the art can readily appreciate that the sequences may be varied and still remain within the spirit and scope of the present embodiments.

What is claimed is:

1. A method for manufacturing a composite preform from tape material, the method comprising:
   feeding a tape section into a tape section guide that suspends the tape section across a tooling surface so that a first end of the tape section is initially disposed at a first position in the tape section guide and a second end of the tape section is initially disposed at a second position in the tape section guide;
   providing relative movement between the tape section guide and the tooling surface to position the tape section at a desired location and orientation relative to the tooling surface;
   after the tape section is fed into the tape section guide, moving the tape section relative to the tape section guide so that the first end is moved from the first position to a third position in the tape section guide and the second end is moved from the second position to a fourth position in the tape section guide; and
   securing the tape section to at least one of the tooling surface and a pre-existing tape section.

2. The method according to claim 1, wherein moving the tape section includes gripping the tape section with a gripping member and moving the gripping member relative to the tape section guide and along the tape section guide in a longitudinal direction of the tape section guide.

3. The method according to claim 1, wherein feeding the tape section comprises pulling tape from a tape supply using a gripping member and cutting the tape into the tape section.

4. The method according to claim 1, wherein securing the tape section comprises tacking the tape section to the pre-existing tape section using a welding assembly that includes at least one welding unit.

5. The method according to claim 4, wherein the welding assembly includes a first welding unit, a second welding unit, and a third welding unit arranged along a longitudinal axis, wherein the second welding unit is disposed between the first welding unit and the third welding unit, and wherein the method further comprises:
   positioning the tape section in alignment with the second welding unit and along the longitudinal axis, with the first welding unit, the second welding unit, and the third welding unit in an initial position;
   moving the second welding unit from the initial position toward the tape section while maintaining the first welding unit and the third welding unit in the initial position; and
   tacking the tape section to the pre-existing tape section using the second welding unit.

6. A method for manufacturing a composite preform from tape material, the method comprising:
   feeding a portion of tape into a tape section guide;
   gripping an end of the portion of tape and pulling the portion of tape through the tape section guide;
   cutting the portion of tape to form a tape section when the end of the portion of tape has been pulled to a first location;
   after forming the tape section, moving the tape section within the tape section guide so that the tape section moves relative to the tape section guide and the end of the portion of tape is pulled to a second location beyond the first location; and
   securing the tape section to at least one of a tooling surface and a pre-existing tape section.

7. The method according to claim 6, wherein moving the tape section within the tape section guide comprises gripping a leading edge portion of the tape section and pulling the leading edge portion along a longitudinal axis of the tape section guide.

8. The method according to claim 7, wherein securing the tape section includes moving a tape tacking device toward the tape section to a predetermined position relative to the tape section, and wherein moving the tape tacking device and moving the tape section occur substantially simultaneously.

9. The method according to claim 6, wherein the method further includes moving the tooling surface, wherein the pre-existing tape section is disposed on the tooling surface.

10. The method according to claim 9, wherein securing the tape section to the pre-existing tape section includes moving a tape tacking device toward the tape section, and wherein the tape section and the tooling surface can be moved substantially simultaneously.

11. The method according to claim 6, wherein securing the tape section comprises tacking the tape section to the pre-existing tape section, wherein tacking the tape section to the pre-existing tape section includes activating a number of welding units from a set of welding units, and wherein the number of welding units activated depends on the length and position of the tape section.

12. The method according to claim 11, wherein a first group of adjacent welding units is lowered towards the tape section and a second group of adjacent welding units remains stationary with respect to the first group of adjacent welding units.

13. The method according to claim 11, wherein the set of welding units includes a first welding unit, a second welding unit and a third welding unit, wherein the second welding unit is disposed between the first welding unit and the third welding unit and wherein activating the welding units includes lowering the second welding unit relative to the first welding unit and the second welding unit.

14. The method according to claim 1, wherein moving the tape section relative to the tape section guide comprises gripping a leading edge portion of the first end of the tape section and pulling the leading edge portion to the third position in the tape section guide.

15. The method according to claim 14, wherein gripping the leading edge portion comprises grasping the leading edge portion between a gripping foot and a gripping nose of a gripping member.

16. The method according to claim 15, further comprising adjusting a lateral position of the gripping member with respect to a longitudinal axis of the tape section guide so that the gripping foot and the gripping nose grasp a center of the leading edge portion.

17. The method according to claim 1, wherein moving the tape section relative to the tape section guide comprises grasping the tape section with pinch rollers disposed on the tape section guide and moving the tape section with the pinch rollers.

18. The method according to claim 1, wherein the tape section guide defines a longitudinal axis, wherein the tape section extends along the longitudinal axis, wherein moving the tape section comprises gripping the first end of the tape section with a gripping member and moving the gripping member along the longitudinal axis from a first location to a second location so that the first end of the tape section moves from the first position to the third position, wherein securing the tape section comprises moving a welding unit onto the tape section and on the longitudinal axis, wherein the method further comprises, while securing the tape section, moving the gripping member laterally out of the longitudinal axis and moving the gripping member along an axis generally parallel to the longitudinal axis, past the welding unit, and back to the first location.

19. The method according to claim 18, wherein moving the gripping member laterally out of the longitudinal axis comprises swinging the gripping member on a hinge connection.

20. The method according to claim 18, wherein moving the gripping member laterally out of the longitudinal axis comprises moving the gripping member along a track that loops the gripping member back to the first location.

21. The method according to claim 1, providing the relative movement between the tape section guide and the tooling surface while simultaneously moving the tape section relative to the tape section guide.

22. The method according to claim 6, further comprising providing relative movement between the tape section guide and the tooling surface while simultaneously providing relative movement between the tape section and the tape section guide.

* * * * *